US012472241B2

(12) United States Patent
Horowitz et al.

(10) Patent No.: US 12,472,241 B2
(45) Date of Patent: Nov. 18, 2025

(54) TREATMENT OF RESPIRATORY DISORDERS WITH ARACHIDONATE 15-LIPOXYGENASE (ALOX15) INHIBITORS

(71) Applicant: Regeneron Pharmaceuticals, Inc., Tarrytown, NY (US)

(72) Inventors: Julie Horowitz, Tarrytown, NY (US); Aris Baras, Tarrytown, NY (US)

(73) Assignee: Regeneron Pharmaceuticals, Inc., Tarrytown, NY (US)

( * ) Notice: Subject to any disclaimer, the term of this patent is extended or adjusted under 35 U.S.C. 154(b) by 442 days.

(21) Appl. No.: 16/725,309

(22) Filed: Dec. 23, 2019

(65) Prior Publication Data

US 2020/0254070 A1    Aug. 13, 2020

Related U.S. Application Data

(60) Provisional application No. 62/785,899, filed on Dec. 28, 2018.

(51) Int. Cl.
*A61P 11/02* (2006.01)
*A61K 38/46* (2006.01)
*C12N 15/113* (2010.01)
*G01N 33/68* (2006.01)

(52) U.S. Cl.
CPC ............ *A61K 38/465* (2013.01); *A61P 11/02* (2018.01); *C12N 15/1137* (2013.01); *G01N 33/6815* (2013.01); *G01N 33/6818* (2013.01)

(58) Field of Classification Search
None
See application file for complete search history.

(56) References Cited

U.S. PATENT DOCUMENTS 6,686,502 B1    2/2004  Cai et al.
10,132,809 B2   11/2018 Resnick et al.

FOREIGN PATENT DOCUMENTS

EP    2959899      12/2015
WO   2014205365    12/2014
WO   2019157304     8/2019

OTHER PUBLICATIONS

Horn, T., et al. 2013 Redox Biology 1: 566-577. (Year: 2013).*
Fahrenholz, J.M. 2003 Clinical Reviews in Allergy and Immunology 24: 113-124. (Year: 2003).*
Qiao, Y., et al. 2016 Molecular Human Reproduction 22(5): 364-372. (Year: 2016).*
Horn et al. S.3 1000Genome databases LOX SNPdata, Nov. 2013, available at https://www.researchgate.net/publication/258993415_S3_1000Genome_database_LOX_SNPdata; (21 pages). (Year: 2013).*
Andersson et al., "Mice Lacking 12/15-Lipoxygenase Have Attenuated Airway Allergic Inflammation and Remodeling", American Journal of Respiratory Cell and Molecular Biology, 2008, 39(6), pp. 648-656.
Chen et al., "1,6-0,0-Diacetylbritannilactone Inhibits Eotaxin-1 and ALOX15 Expression Through Inactivation of STAT6 in A549 Cells", Inflammation, 2017, 40(6), p. 1967-1974.
Cingi et al., "Antileukotrienes in Upper Airway Inflammatory Diseases", Current Allergy and Asthma Reports, 2015, 15(11), pp. 1-11.
Claesson et al., "On the biosynthesis and biological role of eoxins and 15-lipoxygenase-1 in airway inflammation and Hodgkin lymphoma", Prostaglandins and Other Lipid Mediators, 2009, 89(3-4), pp. 120-125.
Czapski et al., "Evaluation of the antioxidative properties of lipoxygenase inhibitors", Pharmacological Reports, 2012, 64(5), pp. 1179-1188.
Dahlen et al., "Benefits from Adding the 5-Lipoxygenase Inhibitor Zileuton to Conventional Therapy in Aspirin-Intolerant Asthmatics", American Journal of Respiratory and Critical Care Medicine, 1998, 157(4), pp. 1187-1194.
Kristjansson et al., "A loss-of-function variant in ALOX15 protects against nasal polyps and chronic rhinosinusotis", Nature Genetics, 2019, 51(2), pp. 267-276.
Laprise et al., "Functional classes of bronchial mucosa genes that are differentially expressed in asthma", BMC Genomics, 2004, 5(1), pp. 21.
Mabalirajan et al., "Effects of vitamin E on mitochondrial dysfunction and asthma features in an experimental allergic murine model", Journal of Applied Physiology, 2009, 107(4), p. 1285-1292.
Modena et al., "Emerging concepts: mast cell involvement in allergic diseases", Translational Research, 2016, 174, pp. 98-121.
Rossaint et al., "Eliminating or blocking 12/15-lipoxygenase reduces neutrophil recruitment in mouse models of acute lung injury", Critical Care, 2012, 16(5), pp. R166.
Rostkowska-Nadolska et al., "A microarray study of gene expression profiles in nasal polyps", Auris Nasus Larynx, 2011, 38(1), pp. 58-64.
Steinke et al., "Leukotriene synthesis inhibitors versus antagonists: The pros and cons", Current Allergy and Asthma Reports, 2007, 7(2), pp. 126-133.
Yan et al., "Expression and corticosteroid inhibtiion of archidonate 15-lipoxygenase in chronic rhinosinusitis with nasal polyps", 2017, http://www.airitilibrary.com/Publication/alDetailedMesh?docid=sdykdxxb201705011.
Yan et al., "Inhibition of arachidonate 15-lipoxygenase reduces the epithelial-mesenchymal transition in eosinophilic chronic rhinosinusitis with nasal polyps", International Forum of Allergy and Rhinology, 2018, 9(3), pp. 270-280.
Zhao et al., "Interleukin-13-induced MUC5AC Is Regulated by 15-Lipoxygenase 1 Pathway in Human Bronchial Epithelial Cells", American Journal of Respiratory and Critical Care Medicine, 2009, 179(9), pp. 782-790.

(Continued)

*Primary Examiner* — Marsha Tsay
(74) *Attorney, Agent, or Firm* — Armstrong Teasdale LLP

(57) ABSTRACT

The present disclosure provides methods of treating patients having a respiratory disorder, methods of identifying subjects having an increased risk of developing a respiratory disorder, and methods of detecting human Arachidonate 15-Lipoxygenase (ALOX15) variant nucleic acid molecules and variant polypeptides.

7 Claims, 9 Drawing Sheets
Specification includes a Sequence Listing.

(56) References Cited

OTHER PUBLICATIONS

International Search Report and Written Opinion for PCT Application PCT/US2019/068328.
Armstrong et al., "A Potent and Selective Inhibitor Targeting Human and Murine 12/15-Lox", Bioorg Med Chem, 2016, 24(6), pp. 1183-1190.
Kuznetsova et al., "Structural dynamics, stability and folding of proteins", Tsitologiia, 2005, 47(11), pp. 943-952. Machine Translation.
Singer et al., "Genes and Genomes A changing Perspective", 1998, vol. 1, pp. 68-69.
Hersberger et al., "No association of two functional polymorphisms in human ALOX15 with myocardial infarction", Atherosclerosis, 2009, 205(1), pp. 192-196.
Ye et al., "Genetic associations with coronary heart disease: Meta-analyses of 12 candidate genetic variants", Gene, 2013, 531(1), pp. 71-77.
Assimes et al., "A near null variant of 12/15-LOX encoded by a novel SNP in ALOX15 and the risk of coronary artery disease", Atherosclerosis, 2008, 198, pp. 136-144.
Schurmann et al., "Molecular Basis for the Reduced Catalytic Activity of the Naturally Occurring T560M Mutant of Human 12/15-Lipoxygenase That Has Been Implicated in Coronary Artery Disease", Journal of Biological Chemistry, 2011, 286(27), pp. 23920-23927.

* cited by examiner rs34210653 significantly associates with reduced eosinophils in UK Biobank 50K exomes

| Variant | Hgvs c. | Hgvs p. | Number individuals | Number Carriers (Ref/Ref\|Ref/Alt\|Alt/Alt) |
|---|---|---|---|---|
| 17:4632019:G:A | c.1679C>T | p.Thr560Met | 44,147 | 42,305\|1,816\|26 |

| Variant | Effect (SD units) | Trait Mean Ref/Ref | Trait Mean Ref/Alt | Trait Mean Alt/Alt | AAF | p-value |
|---|---|---|---|---|---|---|
| 17:4632019:G:A | -0.1528 | 0.1665 | 0.1495 | 0.1658 | 0.021 | 3.49E-11 |

Figure 1 rs34210653 significantly associates with reduced eosinophils in UK Biobank 500K genotyping

| Variant | Hgvs c. | Hgvs p. | Number individuals | Number Carriers (Ref/Ref;Ref/Alt;Alt/Alt) | Effect (SD units) | AAF | p-value |
|---|---|---|---|---|---|---|---|
| 17-4632019-G-A | c.1679C>T | p.Thr560Met | 440,966 | 422,660;18,165;141 | -0.1716 | 0.021 | 3.81E-117 |

Figure 2 rs34210653 significantly associates with decreased odds of nasal polyp and allergic rhinitis and associates with doctor diagnosed asthma in UK Biobank 500K genotyping

| Phenotype | Variant | Cases Ref/Ref\|Ref/Alt\|Alt/Alt | Controls Ref/Ref\|Ref/Alt\|Alt/Alt |
|---|---|---|---|
| Nasal polyp | 17:4632019:G:A | 2,971\|33\|0 | 429,401\|18,503\|14 |
| Doctor diagnosed hayfever or allergic rhinitis | 17:4632019:G:A | 25,189\|913\|7 | 85,228\|3,822\|33 |
| Doctor diagnosed asthma | 17:4632019:G:A | 47,143\|1,828\|10 | 396,069\|17,138\|135 |

Figure 3 rs34210653 significantly associates with decreased odds of nasal polyp and allergic rhinitis and associates with doctor diagnosed asthma in UK Biobank 500K genotyping

| Phenotype | Variant | Het OR (95% CI) | Hom OR (95% CI) | AAF | p-value |
|---|---|---|---|---|---|
| Nasal polyp | 17:4632019:G:A | 0.258 (0.183, 0.363) | NA | 0.021 | 5.27E-15 |
| Doctor diagnosed hayfever or allergic rhinitis | 17:4632019:G:A | 0.808 (0.751, 0.870) | 0.718 (0.317, 1.623) | 0.021 | 2.99E-8 |
| Doctor diagnosed asthma | 17:4632019:G:A | 0.896 (0.853, 0.941) | 0.622 (0.327, 1.183) | 0.021 | 4.41E-6 |

Figure 3 (cont.)

rs34210653 significantly associates with decreased eosinophils in GHS 90K exomes

| Variant | Hgvs c. | Hgvs p. | Number individuals | Number Carriers (Ref/Ref\|Ref/Alt\|Alt/Alt) |
|---|---|---|---|---|
| 17:4632019:G:A | c.1679C>T | p.Thr560Met | 69,469 | 67,320\|2,132\|17 |

| Variant | Effect (SD units) | Trait Mean Ref/Ref | Trait Mean Ref/Alt | Trait Mean Alt/Alt | AAF | p-value |
|---|---|---|---|---|---|---|
| 17:4632019:G:A | -0.0904 | 0.1827 | 0.1750 | 0.1596 | 0.016 | 4.24E-3 |

Figure 4

ALOX15 associates with decreased odds of nasal polyp in GHS 90K exomes

| Phenotype | Cases<br>Ref/Ref\|Ref/Alt\|Alt/Alt | Controls<br>Ref/Ref\|Ref/Alt\|Alt/Alt |
|---|---|---|
| Nasal polyp | 533\|13\|0 | 66,373\|3,085\|19 |

| Phenotype | Het OR (95% CI) | Hom OR (95% CI) | AAF | p-value |
|---|---|---|---|---|
| Nasal polyp | 0.536 (0.309, 0.930) | NA | 0.022 | 2.99E-2 |

Figure 5

```
                        SEQUENCE LISTING

<160> NUMBER OF SEQ ID NOS: 43

<210> SEQ ID NO 1
<211> LENGTH: 11017
<212> TYPE: DNA
<213> ORGANISM: homo sapien

<400> SEQUENCE: 1
ctgcgtgttt  tcggtccaaa  tccttttctt  tttctccctc  ccgtcaagat  agtggtttcc      60
actccctgct  ctcgccagga  caccgccttt  tggactgggg  ctgaattctg  ccccttgaag     120
ctctgctcct  tggagctggg  ggccccagcg  gtaggcggag  ttgattggag  acctgccacc     180
cacattccga  ccccaagcga  cctccgagag  ggcggggtct  caggctgggt  tatttagctc     240
gtccacccct  ctccaccaga  aggagcgaaa  catctttgag  caagatgggt  ctctaccgca     300
tccgcgtgtc  cactgggggcc  tcgctctatg  ccggttccaa  caaccaggtg  cagctgtggc     360
tggtcggcca  gcacggggag  gcggcgctcg  ggaagcgact  gtggcccgca  cggggcaagg     420
tgagctcccc  agagccgggc  ggggtgggct  gcgcccctgg  ctccgagtca  gtcaaatacc     480
ggggaggaca  tgcgccccccg  ttggcctctg  gccgattctc  tttgccaagg  gcccgcgcat     540
tgggctcaaa  gcgcgcggag  gccacggggg  tgggggggctt  tagggcagtc  ggtggcacac     600
agtaagcgct  caataaatgt  tgccgctacc  cgatctcctt  ggaattgagg  gcatgctcct     660
gtgcgcccct  cattgcacaa  agctcccttg  tctgaaaact  cagcagtcac  tggagccgcc     720
gtcggtcctc  tcgctttctc  tattttaaaa  accgtttcaa  ccgctagcgc  tgttggatct     780 ctaccttca  ggctttatca  cctggggtgg  agtgggtggt  gagagggaag  ggatggggag     840
tcaagacagg  agaacgctct  cgatttcccg  acccacctcc  cgtcatatct  catgtcacat     900
ctaccgggtg  ttctacccgg  tcctgttaac  ttttttttctt  ccgcgaaagc  ccaaattccc     960
```

```
atcactgctc tagctctctc ccagatcccc aaatccggat gtctgtctca gggaacgtca    1020
aagcaacatg cccggatgag gtcctcccct ctccccacct cccagccctc tcctcctgcc    1080
tcccccggtg tcacccgcgc ctccttcctc tcttcacctc cctctaaaca agaatccggc    1140
gcagtcagtt ctagaccctg agcatctccc gcgtccctgc caatatccg tcccgccccc     1200 gaccgcccgc gtcctcttga acctgcggag ccctgctccc cgcactccac gcccttgctc    1260
cgagcttccg agaaagcggg gcaaaggag ccaggaagag agaaaatgcg cacggagcag     1320
gtggccccgc gactccatgg tgagggacg gggcacggaa ggtggaaagg cgcgctccct    1380 cctcccttt ttcctcccta tggtgggcag ttggtgacac acagtaaagg ctcaataaat     1440
gttcccgcta ctcgatctcc ttggaattaa ggggatgctc ctgagcgccc ctcattccac    1500
acagctctgg tgcctggaaa ctgcggtcgc cggagcggtc gtcggtcctc ccggtttctc    1560
tattttaaaa gccatttcaa acctccagcg gcctcgccac ctctgctgca gaccttccaa    1620
gcccttctga agccggaatg atttctcctt aattcactcc ccctgcttaa cacattcgaa    1680
cggctcccgc ttgttctcgg gaccaaatcc aaagcccctg gcgccacctt cgagagcctc    1740
cggacctgct gaccccccac acctgggctc tgagctccag ctccaagatg ctgctcgccc    1800 tccttcccc gccgctctct ttctgcgcgc ctttcccctg ccttcccttt ctgtcactct     1860
ccctggctga gccctctccg cctccaggtc tccgggaagg ttgtccccag gccggtgggg    1920
cccctgcagg tcctcagcct cgggcggggt ggggtggggg gtcgcacagc gggaattgcc    1980
accagcgcgt ccgggctcca cagcgcgctc gtccagggcg cggcagcgct cagcccagcg    2040
cttggcacag tcagtgacca cagggaggag aaagtgaagg caggagcgca ccttcccacc    2100
tgccgtcccc gtcccctcag aaccgagtcc tggggccacc tgctcggcgc ggtccctctc    2160
tctctggctc agtcccgca ccccgatacg tctcctcctc tcagaggctc cgaggaaggg     2220
cgtgggcgct ggagggagca gggctcagcc gggtgcccct cccgccaggc cccaccgggg    2280
ctgagcctct tctgtcgccc gcaggagaca gaactcaagg tggaagtacc ggagtatctg    2340
gggccgctgc tgtttgtgaa actgcgcaaa cggcacctcc ttaaggacga cgcctggttc    2400
tgcaactgga tctctgtgca gggccccgga gccggggacg aggtcaggtt cccttgttac    2460
cgctgggtgg agggcaacgg cgtcctgagc ctgcctgaag gcaccggtaa gcgcggggct    2520
gagggtgtca ggaggcctct gggctgtgtg agaagctggg gggatgcgcg tgtgagaag     2580 agggcgcagg atgggggtgc tggaacctgg agcgccgggg tctttgggg tgtcgaaggg     2640 gcggtggctg cagctggcac aaagtggctg gagcctgggg gagggcgtg atgctgaagg     2700 ggcagaggcc acacagaagg acggggtgct gaggctctcc tggcagagac aagaagaggc    2760
gctcaccaaa agtcactggc caagtcctcc tctgtccttc taggccgcac tgtgggcgag    2820
gaccctcagg gcctgttcca gaaacaccgg gaagaagagc tggaagagag aaggaagttg    2880
taccggtgag ccctcctccc ctgaccccac gtgagctgct gatgcttcca gcacccatac    2940
ttgatttcct tcctgcccca caggtgggga aactggaagg acgggttaat tctgaatatg    3000
gctggggcca aactatatga cctccctgtg gatgagcgat ttctggaaga caagagagtt    3060
gactttgagt tttcgctggc caaggggtga gagcaagggg aggctgggtg agagggaggt    3120
gtcctggtct agtggaagcc aaggggctta tgggctgcac tgcattggac tggcccagga    3180
tcggtgcctg tggtcgtcat gttagagcct cagaatgatg ctcaaaccct ttgccccatc    3240
ctgccctgaa ggctggccga cctcgctatc aaagactctc taaatgttct gacttgctgg    3300
aaggatctag atgacttcaa ccggatttttc tggtgtggtc agagcaagct ggctggtcag    3360
```

```
tcccccaccc cagtatgtct cccaaccccc cagatcccac ccagatccca cccaacccag    3420
gggaattgaa agaagcaggg tggggagacc agagacttgg gtccctctgg tgggctggag    3480
tcaaggaggc atggttggtg gggttggaag gaccaagagc tcagatccca caacttgctc    3540
aacaactgcc ttccccagag cgcgtgcggg actcctggaa ggaagatgcc ttatttgggt    3600
accagtttct taatggcgcc aaccccgtgg tgctgaggcg ctctgctcac cttcctgctc    3660
gcctagtgtt ccctccaggc atggaggaac tgcaggccca gctggagaag gagctggagg    3720
tatggacatc agagccctga ggaagctcag cagtgaagtg gggtggccta gtgccaatga    3780
tgctgctgcg ggacccactg tgggcctggc ttgctgccag ccagcaagga cggattctgc    3840
aggagaggtc ctgagggacc ctggagaagc tcagctgctc ggcctccttc ctacacgaga    3900
gtagctgcgg agggagggcg tgcaagatgg aatggttgat agaaacaagg tcaaatgaag    3960
aaatgtgact ggcccctggt gctagggatt cggggagtgt gcagagtaag agagtcagga    4020
tcagagtgct gtggctgttc atcaggaggc gatatggaac aacagagagg aaattcatgg    4080
gattaagggc agataggctt ggatgtgaat cctggttctg ctatttgtaa gctgtgtgac    4140
ctcaggcaaa atacccaacc tctctgatta tctgtttcct cttctgtaaa attgaggctc    4200
attcaactag gtataaaaat tataaggctg agcacagtga ctcacacctg taatcccagc    4260
actttgggag gctgcaggag gatcacctga gcccaggagt tggagaccag cctaggcaac    4320
gtggtgaaac cctgtctcta caaaagtaca aaaattatca cctgtaatct tggtgtagt    4380 ggcatgcacc tgtagtccca gctacttggg aggctgaggt gggaggatca cctgggccca    4440
aggaagtcaa ggctgcagtg agccgtggtg atcctgccac gcactccagc ctgggcagca    4500
cggtaagacc ctgattaaaa aaaaaaatga tatgaggaag taagcacatg atccattacc    4560
tggtataaag tagatgatgg agacgagtta gctccactct cttccccctt ggaggaatcc    4620
gagtaggaag aagatgcttt atgttgatag cagcccttga cctcttcccc cacccaggga    4680
ggcacactgt tcgaagctga cttctccctg ctggatggga tcaaggccaa cgtcattctc    4740
tgtagccagc agcacctggc tgcccctcta gtcatgctga aattgcagcc tgatgggaaa    4800
ctcttgccca tggtcatcca ggtgagagga ctcaggattt ctgctcccag tctctggctt    4860
ttgagaaagc tcagccccatt atcaaaattt actgagcacc atctgcaaag gcactgggct    4920
```

-continued

```
actgaaaggg gaagtggagg ctggaggagg caccagaaga gcagtttctg cagaatgctg    5760
gaggcaaagc agcttgcagg gtgctaatgc actgagcggg caggaagggg aggggaggaa    5820
acgggagccg tagggagcgg caggagtgag atggggaaag cagaacaggt ttggaggacg    5880
aagggtgagg ttaacatgca aggggggcgg gaatcgctga gtgcctggca ctcatgcctt    5940
ctctccccac acttgtccct gctccagctc cagctgcccc gcacaggatc cccaccacct    6000 cccctttct tgcctacgga tcccccaatg gcctggcttc tggccaaatg ctgggtgcgc    6060
agctctgact tccagctcca tgagctgcag tctcatcttc tgaggggaca cttgatggct    6120
gaggtcattg ttgtggccac catgaggtgc ctgccgtcga tacatcctat cttcaaggta    6180
actccttatc cccttctctc ttgcctgcca ctatctctgc cccagggcac gttccgacct    6240
ctggaggctc cctctctgtg gggtctcggg gtacagagag aaacaatgaa tggacaatgt    6300
gagagcaaca gagaatgagc agggctggcc atgcatttc aaaggggata gcacctccca    6360
cctgggaaag tggcgaaaat aatcttactc tttttatatg taaagcacag tacatgcaaa    6420
tgaccaagga ttccatccaa caagaggaac ccgtgaaata acgttaaaaa gatcttttcc    6480
agacattgat ttttttttt tttttgagat ggagtctccc tttgcccaga ctggagtgca    6540
gtgatgcgat ctcggctcac tgcaacctct gcctcctggg tttaagcaat ctcccactt    6600 cagcctcccc agtagctggg attacagtcg cgcaccacca ggcctggcta attttttttg    6660 tattttaat agagacagga tttcaccatg ttggccaggc tggtctcgaa tgcctgacct    6720
cagatgatct gcttgtctag gtctcccaaa gtgctgggat tacaggcgtg agtcactgtg    6780
cctggtccaa gtttgtcttc tttaaagaac tgaaagaagc ctagtgtaat ggatgaagga    6840
gagagggagg agaccaggct ctggagggag gcagtggtta gaacatccat tctcagtggg    6900
ggcacaatgt cccccaaggg atgaagatgg ttggaaaatg tgtgtgaaaa atattattat    6960
tattattatt attattgctg cccaggctgg agtgcagtgt cacgatcttg gctcactgca    7020
acctctgcct cctgggttca gcaattctc ctgcttcagc ctcccgagta gctgggattc    7080
aggtgcctgc caccatgcct ggctaatttt tgtattttta gtagagatga ggttttgcca    7140
tgttggtcag gctggtctga aactcctgac ctcaggtgat ccgcccacct cggcctccca    7200
aagtgttggg attacaggcg tgagccaccg tggccggcca atcttatta ctttatatag    7260 cacagatata atgtgatata tatctatata aagcacagat ataatgcaat acatagacag    7320
atatacagta tatgtgtagc attaatattt aatgaggtgg agtgagatta ggaaaaaaca    7380
tctcaaaagg gtacttagtg ggtgattaaa aaaaaaaaag ttgagaaatc ttggtctaga    7440
cctatgaaaa aatatgaaaa gaaaaggagg ccaggcacgg tggttcacgc ctgtaatccc    7500
agctactcgg gaggctgagg caggagaatc gcgtgaaccc agaagacgga ggttgcagtg    7560
agccgagatc acaccactgt acttcagcct gggaaacaga gcaagactcc atctcaaaac    7620
aaaacaacaa caacaaagaa tgatttcttt caattatcat aaagcactaa gtctggtttg    7680
tggaatggaa atagttgatg caaatcaact gaaagctcag tggttttatt tttatgtatt    7740 tattttaac tttaattta ggttcaagga tacatgggca ggtttgttct gtaagtaaat    7800
tgtgtgtcat ggggcttggt gtacagatta ttttgtcacc aggtaataag catggtaccc    7860
cataggtagt ttttggatcc cctcactcct tccaccctct gtccacaagt agatgctggt    7920
gtctgttgtt cccttatttg tgtccatgtg tactcaatgt ttagctctca cttataagta    7980
agaacatacc atatttggct ttctgttcca gtgttagtgc acttaggatt atggcctcca    8040
gctccatcca tgttgctgca gagaacatga tcttgttctt cttcatggct gcatagtatt    8100
```

```
ccacagcata tgtctaccac attttcttta cctggtctat tgttgatggg catttaggtt    8160
gattccatat ctttgctatt gtgagtagtg ctggatgaac atccgtgagc atgtgtgttt    8220
atagtaaggc gatttatatt ttgggaggta tatatccagt aatgggattg ctgggttgaa    8280
tggtacttct gaaaactcac tgttgagagg ccactgaact ttacgtctgt gctttttctg    8340
aagacctggt gcctttcctg ctgtcagccc ttgtttcctg cagggatctt gcagctctcc    8400
tctgactctg cccttccctg tgtttctccc tctagcttat aattccccac ctgcgataca    8460
ccctggaaat taacgtccgg gccaggactg ggctggtctc tgacatggga attttcgacc    8520
aggtatggga agagaaaggg agattctggg tctgtctttt ttccagctct ggattcaggg    8580
caggtcgatt cgcctgaccc tgctcaccct cacttctcag ataatgagca ctggtggggg    8640
aggccacgtg cagctgctca agcaagctgg agccttccta acctacagct ccttctgtcc    8700
ccctgatgac ttggccgacc gggggctcct gggagtgaag tcttccttct atgcccaaga    8760
tgcgctgcgg ctctgggaaa tcatctatcg gtgaggcaag cgggaaggcc agtgggggtg    8820
caagtggggg tggagaagac atgtaggaga gcaggaggtc tgcgtctggt tgggggcctg    8880
gggccctgac ctggccatgt gagcaggggc agagctggct tcagctccct ggccctgctc    8940
cgttggttgg taggtatgtg gaaggaatcg tgagtctcca ctataagaca gacgtggctg    9000
tgaaagacga cccagagctg cagacctggt gtcgagagat cactgaaatc gggctgcaag    9060
gggcccagga ccgaggtaag aggagcccct gccctgagat ctcagacaca aagcccaaga    9120
gatcttccca gaatcccctg tgcttctgtg aaatctccca gaagcatttt caacacctat    9180
gagaactcca gaggccttct cagattccac tccctgtcac ctagagacag gtccccgtcc    9240
tacacactga gaacctctag gtgccagatg cagcgggacc agtggctgct cataaatgtt    9300
taacaactga ctctcgggaa gaaccgtcct gatttgtagc ttttgcacat ttccatggta    9360
taaatatttt tactgtgact accaaggtga tgctgaccag cttgctaaac acctaacgtc    9420
atggactgac tcttgcgagc cagtgtgagt cagcagcagc accccactga gtgggaccct    9480
cccggcagag ctccccactc ccccacccca acctgctgtc atggtaattc ctgtaagagt    9540
taactgagca ttcctgccgc tctttctcgc ccttgttctc ctctcttggc ctcttcctct    9600
gagcgctgcc ctactcctgc cttcgcagct tctaactctc ttcacсccctt gcagggtttc    9660
ctgtctcttt acaggctcgg gaccaggttt gccactttgt caccatgtgt atcttcacct    9720
gcaccggcca acacgcctct gtgcacctgg gccaggtact taccagagat gggcagctgg    9780
gaatttgggg cctggagtga gggaggggtc tgtgtgcagg tggaccacgg ggctcgcgtg    9840
cttggtaggc actgactctg gatccctgcc cttccttagc tggactggta ctcttgggtg    9900
cctaatgcac cctgcacgat gcggctgccc ccgccaacca ccaaggatgc aacgctggag    9960
acagtgatgg cgacactgcc caacttccac caggcttctc tccagatgtc catcacttgg   10020
cagctgggca gacgccagcc cgttatggtg agagctgagt gccagggcc ctaaggaagg   10080
aggcagctgt ggggacgtgt ggcatcccag actgggggtc ataaggctct cagccacctt   10140
ttcctctccc tcccaggtgg ctgtgggcca gcatgaggag gagtattttt cgggccctga   10200
gcctaaggct gtgctgaaga agttcaggga ggagctggct gccctggata aggaaattga   10260
gatccggaat gcaaagctgg acatgcccta cgagtacctg cggcccagcg tggtggaaaa   10320
cagtgtggcc atctaagcgt cgccaccctt tggttatttc agcccccatc acccaagcca   10380
caagctgacc ccttcgtggt tatagccctg ccctcccaag tcccaccctc ttcccatgtc   10440
```

```
ccaccctccc tagaggggca ccttttcatg gtctctgcac ccagtgaaca cattttactc    10500
tagaggcatc acctgggacc ttactcctct ttccttcctt cctcctttcc tatcttcctt    10560
cctctctctc ttcctctttc ttcattcaga tctatatggc aaatagccac aattatataa    10620
atcatttcaa gactagaata gggggatata atacatatta ctccacacct tttatgaatc    10680
aaatatgatt tttttgttgt tgttaagaca gagtctcact ttgacaccca ggctggagtg    10740
cagtggtgcc atcaccacgg ctcactgcag cctcagcgtc ctgggctcaa atgatcctcc    10800
cacctcagcc tcctgagtag ctgggactac aggctcatgc catcatgccc agctaatatt    10860
tttttatttt cgtggagacg gggcctcact atgttgccta ggctgaaat aggattttga     10920 acccaaattg agtttaacaa taataaaaag ttgttttacg ctaaagatgg aaaagaacta    10980
ggactgaact attttaaata aaatattggc aaaagaa                              11017
```

<210> SEQ ID NO 2
<211> LENGTH: 11017
<212> TYPE: DNA
<213> ORGANISM: homo sapien

<400> SEQUENCE: 2

```
ctgcgtgttt tcggtccaaa tccttttctt tttctccctc ccgtcaagat agtggtttcc      60
actccctgct ctcgccagga caccgccttt tggactgggg ctgaattctg ccccttgaag     120
ctctgctcct tggagctggg ggccccagcg gtaggcggag ttgattggag acctgccacc     180
cacattccga ccccaagcga cctccgagag ggcggggtct caggctgggt tatttagctc     240 gtccacccctt ctccaccaga aggagcgaaa catctttgag caagatgggt ctctaccgca    300
tccgcgtgtc cactggggcc tgctctatg ccggttccaa caaccaggtg cagctgtggc      360
tggtcggcca gcacggggag gcggcgctcg ggaagcgact gtggcccgca cggggcaagg    420
tgagctcccc agagccgggc ggggtgggct gcgcccctgg ctccgagtca gtcaaatacc    480
ggggaggaca tgcgccccg ttggcctctg gccgattctc tttgccaagg gcccgcgcat     540
tgggctcaaa gcgcgcggag gccacggggg tgggggcgtt tagggcagtc ggtggcacac     600
agtaagcgct caataaatgt tgccgctacc cgatctcctt ggaattgagg gcatgctcct    660
gtgcgcccct cattgcacaa agctcccttg tctggaaact cagcagtcac tggagccgcc    720
gtcggtcctc tcgctttctc tatttttaaaa accgttcaa ccgctagcgc tgttggatct    780
ctacctttca ggctttatca cctggggtgg agtgggtggt gagagggaag ggatggggag     840
tcaagacagg agaacgctct cgatttcccg acccacctcc cgtcatatct catgtcacat    900
ctaccgggtg ttctacccgg tcctgttaac tttttttctt ccgcgaaagc ccaaattccc    960
atcactgctc tagctctctc ccagatcccc aaatccggat gtctgtctca gggaacgtca    1020
aagcaacatg cccggatgag gtcctccect ctccccacct cccagccctc tcctcctgcc     1080
tcccccggtg tcaccgcgc ctccttcctc tcttcacctc cctctaaaca agaatccggc      1140
gcagtcagtt ctagaccctg agcatctccc gcgtccctgc ccaatatccg tcccgccccc    1200
gaccgcccgc gtcctcttga acctgcggag ccctgctccc cgcactccac gcccttgctc    1260
cgagcttccg agaaagcggg gcaaaggag ccaggaagag agaaaatgcg cacgagcag      1320 gtggcccgc gactccatgg tgaggggacg gggcacggaa ggtggaaagg cgcgctccct     1380 cctcccttt ttcctccta tggtgggcag ttggtgacac acagtaaagg ctcaataaat      1440
gttcccgcta ctcgatctcc ttggaattaa ggggatgctc ctgagcgccc ctcattccac    1500
acagctctgg tgcctggaaa ctgcggtcgc cggagcggtc gtcggtcctc ccggttctc     1560
```

```
tattttaaaa gccatttcaa acctccagcg gcctcgccac ctctgctgca gaccttccaa    1620
gcccttctga agccggaatg atttctccct aattcactcc ccctgcttaa cacattcgaa    1680
cggctcccgc ttgttctcgg gaccaaatcc aaagcccctg gcgccacctt cgagagcctc    1740
cggacctgct gaccccccac acctgggctc tgagctccag ctccaagatg ctgctcgccc    1800
tcccttcccc gccgctctct ttctgcgcgc cttcccctg ccttcccttt ctgtcactct     1860
ccctggctga gccctctccg cctccaggtc tccgggaagg ttgtcccag gccggtgggg     1920 cccctgcagg tcctcagcct cgggcgggt ggggtggggg gtcgcacagc gggaattgcc     1980
accagcgcgt ccgggctcca cagcgcgctc gtccagggcg cggcagcgct cagcccagcg    2040
cttggcacag tcagtgacca cagggaggag aaagtgaagg caggagcgca ccttcccacc    2100
tgccgtcccc gtccctcag aaccgagtcc tggggccacc tgctcggcgc ggtccctctc     2160
tctctggctc agtccccgca ccccgatacg tctcctcctc tcagaggctc cgaggaaggg    2220
cgtgggcgct ggaggagca gggctcagcc gggtgcccct cccgccaggc cccaccgggg     2280
ctgagcctct tctgtcgccc gcaggagaca gaactcaagg tggaagtacc ggagtatctg    2340
gggccgctgc tgtttgtgaa actgcgcaaa cggcacctcc ttaaggacga cgcctggttc    2400
tgcaactgga tctctgtgca gggccccgga gccggggacg aggtcaggtt cccttgttac    2460
cgctgggtgg agggcaacgg cgtcctgagc ctgcctgaag gcaccggtaa gcgcggggct    2520
gagggtgtca ggaggcctct gggctgtgtg agaagctggg gggatgcgcg tgtggagaag    2580
agggcgcagg atgggggtgc tggaacctgg agcgccgggg tctttggggg tgtcgaaggg    2640
gcggtggctg cagctggcac aaagtggctg gagcctgggg gaggggcgtg atgctgaagg    2700
ggcagaggcc acacagaagg acggggtgct gaggctctcc tggcagagac aagaagaggc    2760
gctcaccaaa agtcactggc caagtcctcc tctgtccttc taggccgcac tgtgggcgag    2820
gaccctcagg gcctgttcca gaaacaccgg gaagaagagc tggaagagag aaggaagttg    2880
taccggtgag ccctcctccc ctgaccccac gtgagctgct gatgcttcca gcacccatac    2940
ttgatttcct tcctgcccca caggtgggga aactggaagg acgggttaat tctgaatatg    3000
gctggggcca aactatatga cctccctgtg gatgagcgat ttctggaaga caagagagtt    3060
gactttgagg tttcgctggc caaggggtga gagcaagggg aggctgggtg agaggaggt     3120 gtcctggtct agtggaagcc aaggggctta tgggctgcac tgcattggac tggcccagga    3180
tcggtgcctg tggtcgtcat gttagagcct cagaatgatg ctcaaaccct tgccccatc     3240 ctgcccctgaa ggctggccga cctcgctatc aaagactctc taaatgttct gacttgctgg   3300
aaggatctag atgacttcaa ccggatttc tggtgtggtc agagcaagct ggctggtcag     3360
tccccacccc cagtatgtct cccaacccc cagatcccac ccagatccca cccaacccag     3420
gggaattgaa agaagcaggg tggggagacc agagacttgg gtccctctgg tgggctggag    3480
tcaaggaggc atggttggtg gggttggaag gaccaagagc tcagatccca caacttgctc    3540
aacaactgcc ttccccagag cgcgtgcggg actcctggaa ggaagatgcc ttattttggt    3600 accagttttct taatggcgcc aaccccgtgg tgctgaggcg ctctgctcac cttcctgctc    3660
gcctagtgtt ccctccaggc atggaggaac tgcaggccca gctggagaag gagctggagg    3720
tatggacatc agagccctga ggaagctcag cagtgaagtg gggtggccta gtgccaatga    3780
tgctgctgcg ggaccactg tgggcctggc ttgctgccag ccagcaagga cggattctgc      3840
aggagaggtc ctgagggacc ctggagaagc tcagctgctc ggcctccttc ctacacgaga    3900
```

-continued

```
gtagctgcgg agggagggcg tgcaagatgg aatggttgat agaaacaagg tcaaatgaag    3960
aaatgtgact ggccCctggt gctagggatt cggggagtgt gcagagtaag agagtcagga    4020
tcagagtgct gtggctgttc atcaggaggc gatatggaac aacagagagg aaattcatgg    4080
gattaagggc agataggctt ggatgtgaat cctggttctg ctatttgtaa gctgtgtgac    4140
ctcaggcaaa atacccaacc tctctgatta tctgtttcct cttctgtaaa attgaggctc    4200
attcaactag gtataaaaat tataaggctg agcacagtga ctcacacctg taatcccagc    4260
actttgggag gctgcaggag gatcacctga gcccaggagt tggagaccag cctaggcaac    4320
gtggtgaaac cctgtctcta caaaagtaca aaaattatca cctgtaatct ttggtgtagt    4380
ggcatgcacc tgtagtccca gctacttggg aggctgaggt gggaggatca cctgggccca    4440
aggaagtcaa ggctgcagtg agccgtggtg atcctgccac gcactccagc ctgggcagca    4500
cggtaagacc ctgattaaaa aaaaaaatga tatgaggaag taagcacatg atccattacc    4560
tggtataaag tagatgatgg agacgagtta gctccactct cttccccctt ggaggaatcc    4620
gagtaggaag aagatgcttt atgttgatag cagcccttga cctcttcccc cacccaggga    4680
ggcacactgt tcgaagctga cttctccctg ctggatggga tcaaggccaa cgtcattctc    4740
tgtagccagc agcacctggc tgcccctcta gtcatgctga aattgcagcc tgatgggaaa    4800
ctcttgccca tggtcatcca ggtgagagga ctcaggattt ctgctcccag tctctggctt    4860
ttgagaaagc tcagccccctt atcaaaattt actgagcacc atctgcaaag cactgggct     4920
aaggcacctg ggagacgcga aaggaggaaa tgcgccaagt ctctattcga aggccttgca    4980
gtgtagctgg agagacagac tgggccagtc tgcagaagct ccaggactga ggaagtccct    5040
gaggacagag acagcccagg agggattggg gaggtggggt gtcacgagct ttggaggagg    5100
gccaggtctc agacaagcag gagggagagg aaggaccggt cctcagggc aagacagact      5160
gggcagaggc tgaggtagag gagtcaggca attcctaggg gacagttgga ccagaagcca    5220
gactaagcca ggctaaggag tatgaggtgg gaagctggag aaggccgtga tgaaacgtgc    5280
tgtgggcacg cggtgtgggc agtggtgttt agggtgggtt ggagagggga gatgctagaa    5340
ataggggactg gggcaacatg ccccagcact gaccccagga ggaggggagc tcggatgtgg    5400
gtagtgacca tcaggatgga gaggacaggt ggatgcgagt gcagagggag atcaaggaga    5460
ggggaaaggg gagccaggcc agttgcctgc agaaatagca ccgataaaga gaacagggtg    5520
cccaggtgga ttttgtctg gccaatgttg aggtaacggg aagacactta aattatccag     5580
caggcagctg agaacaagag attcagtcat ttgtgtagag gtggggccaa agatgagtt     5640
ttcaaaaaac agtgtgggat ggaggaagca ggtggtttga atcttgtcca cactgtggga    5700
actgaaaggg gaagtggagg ctggaggagg caccagaaga gcagtttctg cagaatgctg    5760
gaggcaaagc agcttgcagg gtgctaatgc actgagcggg caggaagggg aggggaggaa    5820
acggagccg tagggagcgg caggagtgag atggggaaag cagaacaggt ttggaggacg      5880
aagggtgagg ttaacatgca aggggggcgg gaatcgctga gtgcctggca ctcatgcctt    5940
ctctccccac acttgtccct gctccagctc cagctgcccc gcacaggatc cccaccacct    6000
cccctttct tgcctacgga tcccccaatg gcctggcttc tggccaaatg ctgggtgcgc     6060
agctctgact tccagctcca tgagctgcag tctcatcttc tgaggggaca cttgatggct    6120
gaggtcattg ttgtggccac catgaggtgc ctgccgtcga tacatcctat cttcaaggta    6180
actccttatc cccttctctc ttgcctgcca ctatctctgc cccagggcac gttccgacct    6240
ctggaggctc cctctctgtg gggtctcggg gtacagagag aaacaatgaa tggacaatgt    6300
```

```
gagagcaaca gagaatgagc agggctggcc atgcattttc aaaggggata gcacctccca    6360
cctgggaaag tggcgaaaat aatcttactc tttttatatg taaagcacag tacatgcaaa    6420
tgaccaagga ttccatccaa caagaggaac ccgtgaaata acgttaaaaa gatcttttcc    6480
agacattgat ttttttttt ttttttgagat ggagtctccc tttgcccaga ctggagtgca    6540
gtgatgcgat ctcggctcac tgcaacctct gcctcctggg tttaagcaat tctcccactt    6600
cagcctcccc agtagctggg attacagtcg cgcaccacca ggcctggcta attttttttg    6660
tatttttaat agagacagga tttcaccatg ttggccaggc tggtctcgaa tgcctgacct    6720
cagatgatct gcttgtctag gtctcccaaa gtgctgggat tacaggcgtg agtcactgtg    6780
cctggtccaa gtttgtcttc tttaaagaac tgaaagaagc ctagtgtaat ggatgaagga    6840
gagagggagg agaccaggct ctggagggag gcagtggtta aacatccat tctcagtggg    6900 ggcacaatgt cccccaaggg atgaagatgg ttggaaaatg tgtgtgaaaa atattattat    6960
tattattatt attattgctg cccaggctgg agtgcagtgt cacgatcttg gctcactgca    7020
acctctgcct cctgggttca agcaattctc ctgcttcagc ctcccgagta gctgggattc    7080
aggtgcctgc caccatgcct ggctaatttt tgtatttta gtagagatga ggttttgcca    7140
tgttggtcag gctggtctga aactcctgac ctcaggtgat ccgcccacct cggcctccca    7200
aagtgttggg attacaggcg tgagccaccg tggccggcca atcttatta ctttatatag    7260 cacagatata atgtgatata tatctatata aagcacagat ataatgcaat acatagacag    7320
atatacagta tatatgtagc attaatattt aatgaggtgg agtgagatta ggaaaaaaca    7380
tctcaaaagg gtacttagtg ggtgattaaa aaaaaaaag ttgagaaatc ttggtctaga    7440
cctatgaaaa aatatgaaaa gaaaaggagg ccaggcacgg tggttcacgc ctgtaatccc    7500
agctactcgg gaggctgagg caggagaatc gcgtgaaccc agaagacgga ggttgcagtg    7560
agccgagatc acaccactgt acttcagcct gggaaacaga gcaagactcc atctcaaaac    7620
aaaacaacaa caacaaagaa tgatttcttt caattatcat aaagcactaa gtctggtttg    7680
tggaatggaa atagttgatg caaatcaact gaaagctcag tggttttatt tttatgtatt    7740
tatttttaac tttaatttta ggttcaagga tacatgggca ggtttgttct gtaagtaaat    7800
tgtgtgtcat ggggcttggt gtacagatta ttttgtcacc aggtaataag catggtaccc    7860
cataggtagt ttttggatcc cctcactcct tccaccctct gtccacaagt agatgctggt    7920
gtctgttgtt cccttatttg tgtccatgtg tactcaatgt ttagctctca cttataagta    7980
agaacatacc atatttggct ttctgttcca gtgttagtgc acttaggatt atggcctcca    8040
gctccatcca tgttgctgca gagaacatga tcttgttctt cttcatggct gcatagtatt    8100
ccacagcata tgtctaccac attttcttta cctggtctat tgttgatggg catttaggtt    8160
gattccatat ctttgctatt gtgagtagtg ctggatgaac atccgtgagc atgtgtgttt    8220
atagtaaggc gatttatatt tgggaggta tatatccagt aatgggattg ctgggttgaa    8280
tggtacttct gaaaactcac tgttgagagg ccactgaact ttacgtctgt gcttttctg    8340 aagacctggt gcctttcctg ctgtcagccc ttgtttcctg cagggatctt gcagctctcc    8400
tctgactctg cccttccctg tgtttctccc tctagcttat aattccccac ctgcgataca    8460
ccctggaaat taacgtccgg gccaggactg ggctggtctc tgacatggga attttcgacc    8520
aggtatggga agagaaaggg agattctggg tctgtctttt ttccagctct ggattcaggg    8580
caggtcgatt cgcctgaccc tgctcaccct cacttctcag ataatgagca ctggtggggg    8640
```

-continued

| | |
|---|---|
| aggccacgtg cagctgctca agcaagctgg agccttccta acctacagct ccttctgtcc | 8700 |
| ccctgatgac ttggccgacc gggggctcct gggagtgaag tcttccttct atgcccaaga | 8760 |
| tgcgctgcgg ctctgggaaa tcatctatcg gtgaggcaag cgggaaggcc agtggggtg | 8820 |
| caagtggggg tggagaagac atgtaggaga gcaggaggtc tgcgtctggt tgggggcctg | 8880 |
| gggccctgac ctggccatgt gagcagggc agagctggct tcagctccct ggccctgctc | 8940 |
| cgttggttgg taggtatgtg gaaggaatcg tgagtctcca ctataagaca gacgtggctg | 9000 |
| tgaaagacga cccagagctg cagacctggt gtcgagagat cactgaaatc gggctgcaag | 9060 |
| gggcccagga ccgaggtaag aggagcccct gccctgagat ctcagacaca agcccaaga | 9120 |
| gatcttccca gaatcccctg tgcttctgtg aaatctccca gaagcatttt caacacctat | 9180 |
| gagaactcca gaggccttct cagattccac tccctgtcac ctagagacag gtccccgtcc | 9240 |
| tacacactga gaacctctag gtgccagatg cagcgggacc agtggctgct cataaatgtt | 9300 |
| taacaactga ctctcgggaa gaaccgtcct gatttgtagc ttttgcacat ttccatggta | 9360 |
| taaatatttt tactgtgact accaaggtga tgctgaccag cttgctaaac acctaacgtc | 9420 |
| atggactgac tcttgcgagc cagtgtgagt cagcagcagc accccactga gtgggaccct | 9480 |
| cccggcagag ctccccactc ccccacccca acctgctgtc atggtaattc ctgtaagagt | 9540 |
| taactgagca ttcctgccgc tcttttctcgc ccttgttctc ctctcttggc ctcttcctct | 9600 |
| gagcgctgcc ctactcctgc cttcgcagct tctaactctc ttcacccctt gcagggtttc | 9660 |
| ctgtctcttt acaggctcgg gaccaggttt gccactttgt caccatgtgt atcttcacct | 9720 |
| gcaccggcca acacgcctct gtgcacctgg gccaggtact taccagagat gggcagctgg | 9780 |
| gaatttgggg cctggagtga gggagggtc tgtgtgcagg tggaccacgg ggctcgcgtg | 9840 |
| cttggtaggc actgactctg gatccctgcc cttcctagc tggactggta ctcttgggtg | 9900 |
| cctaatgcac cctgcatgat gcggctgccc ccgccaacca ccaaggatgc aacgctggag | 9960 |
| acagtgatgg cgacactgcc caacttccac caggcttctc tccagatgtc catcacttgg | 10020 |
| cagctgggca gacgccagcc cgttatggtg agagctgagt gcccagggcc ctaaggaagg | 10080 |
| aggcagctgt ggggacgtgt ggcatcccag actgggggtc ataaggctct cagccacctt | 10140 |
| ttcctctccc tcccaggtgg ctgtgggcca gcatgaggag gagtatttttt cgggccctga | 10200 |
| gcctaaggct gtgctgaaga agttcaggga ggagctggct gccctggata aggaaattga | 10260 |
| gatccggaat gcaaagctgg acatgcccta cgagtacctg cggcccagcg tggtggaaaa | 10320 |
| cagtgtggcc atctaagcgt cgccacccctt tggttatttc agcccccatc acccaagcca | 10380 |
| caagctgacc ccttcgtggt tatagccctg ccctcccaag tcccaccctc ttcccatgtc | 10440 |
| ccaccctccc tagagggca cctttttcatg gtctctgcac ccagtgaaca cattttactc | 10500 |
| tagaggcatc acctgggacc ttactcctct ttccttcctt cctcctttcc tatcttcctt | 10560 |
| cctctctctc ttcctctttc ttcattcaga tctatatggc aaatagccac aattatataa | 10620 |
| atcatttcaa gactagaata gggggatata atacatatta ctccacacct tttatgaatc | 10680 |
| aaatatgatt tttttgttgt tgttaagaca gagtctcact ttgacaccca ggctggagtg | 10740 |
| cagtggtgcc atcaccacgg ctcactgcag cctcagcgtc ctgggctcaa atgatcctcc | 10800 |
| cacctcagcc tcctgagtag ctgggactac aggctcatgc catcatgccc agctaatatt | 10860 |
| ttttattt cgtggagacg gggcctcact atgttgccta ggctggaaat aggattttga | 10920 |
| acccaaattg agtttaacaa taataaaaag ttgttttacg ctaaagatgg aaagaactca | 10980 |
| ggactgaact attttaaata aaatattggc aaaagaa | 11017 |

<210> SEQ ID NO 3
<211> LENGTH: 2707
<212> TYPE: DNA
<213> ORGANISM: homo sapien

<400> SEQUENCE: 3

| | | | | |
|---|---|---|---|---|
| caucuuugag | caagaugggu | cucuaccgca | uccgcguguc | cacuggggcc | ucgcucuaug | 60 |
| ccgguuccaa | caaccaggug | cagcugugge | uggucggcca | gcacgggag | gcggcgcucg | 120 |
| ggaagcgacu | guggcccgca | cggggcaagg | agacagaacu | caaggugaa | uaccggagu | 180 |
| aucuggggcc | gcugcuguuu | gugaaacugc | gcaaacggca | ccuccuuaag | gacgacgccu | 240 |
| gguucugcaa | cuggaucucu | gugcagggcc | ccggagccgg | ggacgagguc | agguucccuu | 300 |
| guuaccgcug | gguggagggc | aacgcguccu | ugagccugcc | ugaaggcacc | ggccgcacug | 360 |
| ugggcgagga | cccucagggc | cuguuccaga | acaccgggga | agaagagcug | aagagagaa | 420 |
| ggaaguugua | ccgguggga | aacuggaagg | acgguuaau | ucugaauaug | gcuggggcca | 480 |
| aacuauauga | ccucccugug | gaugagcgau | ucuggaaga | caagagaguu | gacuuugagg | 540 |
| uuucgcuggc | caaggggcug | gccgaccucg | cuaucaaaga | cucucuaaau | guucugacuu | 600 |
| gcuggaagga | ucuagaugac | uucaaccgga | uuuucgggug | uggucagagc | aagcuggcug | 660 |
| agcgcgugcg | ggacuccugg | aaggaagaug | ccuuauuugg | guaccaguuu | cuuaauggcg | 720 |
| ccaaccccgu | ggugcugagg | cgcucugcuc | accuuccugc | ucgccuagug | uucccuccag | 780 |
| gcauggagga | acugcaggcc | agcuggagga | aggagcugga | gggaggcaca | cuguucgaag | 840 |
| cugacuucuc | ccugcuggau | gggaucaagg | ccaacgucau | ucucuguagc | cagcagcacc | 900 |
| uggcugcccc | ucuagucaug | cugaaauugc | agccugaugg | gaaacucuug | cccaugguca | 960 |
| uccagcucca | gcugccccgc | acaggauccc | caccacaccc | ccuuuucuug | ccuacggauc | 1020 |
| ccccaauggc | cuggcuucug | gccaaaugcu | gggugcgcag | cucugacuuc | cagcucccaug | 1080 |
| agcugcagu | ucaucuucug | aggggacacu | ugauggcuga | ggucauuguu | guggccacca | 1140 |
| ugaggugccu | gccgcgauca | cauccuaucu | caagcuuau | aauucccac | cugcgauaca | 1200 |
| cccuggaaau | uaacguccgg | gccaggacug | ggcuggucuc | ugacaugga | auuucgaccc | 1260 |
| agauaaugag | cacugguggg | ggaggccacg | ugcagcugcu | caagcaagcu | ggagccuucc | 1320 |
| uaaccuacag | cucuuucgu | ccccugaug | acuggccga | cgggggcuc | cuggagauga | 1380 |
| agucuuccuu | cuaugcccaa | gaugcgcugc | ggcucuggga | aucaucuau | cgguaugugg | 1440 |
| aaggaaucgu | gagucuccac | uauaagacag | acgugggcugu | gaaagacgac | ccagagcugc | 1500 |
| agaccuggug | ucgagagauc | acugaaaucg | ggcugcaagg | ggcccaggac | cgaggguuc | 1560 |
| cugucucuuu | acaggcucgg | gaccagguuu | gccacuuugu | caccaugugu | aucuucaccu | 1620 |
| gcaccggcca | acacgccucu | gugcaccugg | gccagcugga | cugguacucu | ugggugccua | 1680 |
| augcaccugg | cacgaugcgg | cugccccgc | caaccaccaa | ggaugcaacg | cuggagacag | 1740 |
| ugauggcgac | acugcccaac | uuccaccagg | cuucucucca | gaugcccauc | acuuggcagc | 1800 |
| ugggcagacg | ccagcccguu | auggugguu | gggccagca | ugaggaggag | uauuuuucgg | 1860 |
| gcccugagcc | uaaggcugug | cugaagaagu | ucagggaggag | gcuggcugcc | cuggauaagg | 1920 |
| aaauugagau | ccggaaugca | aagcuggaca | ugcccuacga | guaccugcgg | cccagcguag | 1980 |
| uggaaaacag | uguggccauc | uaagcgucgc | cacccuuugg | uuauuucagc | ccccaucacc | 2040 |
| caagccacaa | gcugaccccu | ucgugguau | agcccugccc | uccaagucc | cacccucuuc | 2100 |

| | |
|---|---|
| ccaugucccca cccucccuag aggggcaccu uuucaugguc ucugcaccca gugaacacau | 2160 |
| uuuacucuag aggcaucacc ugggaccuua cuccucuuuc cuuccuuccu ccuuuccuau | 2220 |
| cuuccuuccu cucucucuuc cucuuucuuc auucagaucu auauggcaaa uagccacaau | 2280 |
| uauauaaauc auuucaagac uagaauaggg ggauauaaua cauauuacuc cacaccuuuu | 2340 |
| augaaucaaa uaugauuuuu uuguuguugu aaagacagag ucucacuuug acacccaggc | 2400 |
| uggagugcag uggugccauc accacggcuc acugcagccu cagcguccug ggcucaaaug | 2460 |
| auccucccac cucagccucc ugaguagcug ggacuacagg cucaugccau caugcccagc | 2520 |
| uaauauuuuu uuauuuucgu ggagacgggg ccucacaug uugccuaggc uggaaauagg | 2580 |
| auuuugaacc caaauugagu uuaacaauaa uaaaaaguug uuuuacgcua aagauggaaa | 2640 |
| agaacuagga cugaacuauu uuaaauaaaa uauuggcaaa agaaaaaaaa aaaaaaaaa | 2700 |
| aaaaaaa | 2707 |

<210> SEQ ID NO 4
<211> LENGTH: 2707
<212> TYPE: DNA
<213> ORGANISM: homo sapien

<400> SEQUENCE: 4

| | |
|---|---|
| caucuuugag caagaugggu cucuaccgca uccgcguguc cacuggggcc ucgcucuaug | 60 |
| ccgguuccaa caaccaggug cagcuguggc uggucggcca gcacggggag gcggcgcucg | 120 |
| ggaagcgacu guggcccgca cggggcaagg agacagaacu caagguggaa guaccggagu | 180 |
| aucuggggcc gcugcuguuu gugaaacugc gcaaacggca ccuccuuaag gacgacgccu | 240 |
| gguucugcaa cuggaucucu gugcagggcc ccggagccgg ggacgagguc agguucccuu | 300 |
| guuaccgcug ggugagggc aacgcguccu ugagccugcc ugaaggcacc ggccgcacug | 360 |
| ugggcgagga cccucagggc cuguuccaga acaccgggga agaagagcug gaagagagaa | 420 |
| ggaaguugua ccggugggga aacuggaagg acggguuaau ucugaauaug cuggggcca | 480 |
| aacuauauga ccucccugug gaugagcgau ucuggaaga caagagaguu gacuuugagg | 540 |
| uuucgcuggc caaggggcug gccgaccucg cuaucaaaga cucucuaaau guucugacuu | 600 |
| gcuggaagga ucuagaugac uucaaccgga uuucugguug uggucagagc aagcuggcug | 660 |
| agcgcgugcg ggacuccugg aaggaagaug ccuuauuugg guaccaguuu cuuaauggcg | 720 |
| ccaacccgu ggugcugagg cgcucugcuc accuccugc ucgccuagug uucccuccag | 780 |
| gcauggagga acugcaggcc cagcuggaga aggagcugga gggaggcaca cuguuucgaag | 840 |
| cugacuucuc ccugcuggau gggaucaagg ccaacgucau ucucuguagc cagcagcacc | 900 |
| uggcugcccc ucuagucaug cugaaauugc agccugaugg gaaacucuug cccauggyca | 960 |
| uccagcucca gcugccccgc acaggauccc caccaccucc ccuuuucuug ccuacggauc | 1020 |
| ccccaauggc cuggcuucug gccaaaugcu gggugcgcag cucugacuuc cagcuccaug | 1080 |
| agcugcaguc ucaucuucug aggggacacu ugauggcuga ggucauuguu guggccacca | 1140 |
| ugagguugccu gccgucgaua caucuauucu ucaagcuuau aauucccccac cugcgauaca | 1200 |
| cccuggaaau uaacguccgg gccaggacug ggcuggucuc ugacugggga auuuucgacc | 1260 |
| agauaaugag cacugugggg ggaggccacg ugcagcugcu caagcaagcu ggagccuucc | 1320 |
| uaaccuacag cuccuucugu ccccugaug acuuggccga ccgggggcuc cuggagauga | 1380 |
| agucuuccuu cuaugcccaa gaugcgcugc ggcucuggga aaucaucau cgguauguggg | 1440 |
| aaggaaucgu gagcucccac uauaagacag acguggcugu gaaagacgac ccagagcugc | 1500 |

```
agaccuggug ucgagagauc acugaaaucg ggcugcaagg ggcccaggac cgagggunuuc    1560 cugucucuuu acaggcucgg gaccagguuu gccacuuugu caccaugugu aucuucaccu    1620
gcaccggcca acacgccucu gugcaccugg gccagcugga cugguacucu ugggugccua    1680
augcacccug caugaugcgg cugcccccgc caaccaccaa ggaugcaacg cuggagacag    1740
ugauggcgac acugcccaac uuccaccagg cuucucucca gaugaccauc acuuggcagc    1800
ugggcagacg ccagcccguu auggugggcug ugggccagca ugaggaggag uauuuucgg     1860 gcccugagcc uaaggcugug cugaagaagu cagggagga gcuggcugcc cuggauaagg    1920
aaauugagau ccggaaugca aagcuggaca ugcccuacga guaccugcgg cccagcgugg    1980
uggaaaacag uguggccauc uaagcgucgc cacccuuugg uuauuucagc ccccaucacc    2040
caagccacaa gcugaccccu cguggguuau agcccugccc ucccaaguc cacccucuuc    2100 ccaugucccca cccucccuag aggggcaccu uuucaugguc ucugcaccca gugaacacau    2160
uuuacucuag aggcaucacc ugggaccuua cucucucuuc cuuccuuccu ccuuccuau      2220 cuuccuuccu cucucucuuc cucuuucuuc auucagaucu auauggcaaa uagccacaau    2280
uauauaaauc auucaagac uagaauaggg ggauauaaua cauauuacuc cacaccuuuu    2340
augaaucaaa uaugauuuuu uuguuguugu uaagacagag ucucacuuug cacccaggc     2400 uggagugcag uggugccauc accacggcuc acugcagccu cagcguccug ggcucaaaug    2460
auccucccac cucagccucc ugaguagcug gacuacagg cucaugccau caugcccagc    2520
uaauauuuuu uuauuuucgu ggagacgggg ccucacuaug uugccuaggc uggaaauagg    2580
auuuugaacc caaauugagu uuaacaauaa uaaaaaguug uuuuacgcua aagauggaaa    2640
agaacuagga cugaacuauu uuaaauaaaa uauuggcaaa agaaaaaaaa aaaaaaaaa     2700 aaaaaaa                                                              2707
```

<210> SEQ ID NO 5
<211> LENGTH: 2707
<212> TYPE: DNA
<213> ORGANISM: homo sapien

<400> SEQUENCE: 5

```
catcuuugag caagauggg cucuaccgca uccgcgugu cacugggcc ucgcucuaug       60 ccgguuccaa caaccaggug cagcugugg cugguccggcca gcacgggag gcggcgcucg   120 ggaagcgacu gugggcccgca cggggcaagg agacagaacu caaggugaa guaccggagu    180 aucugggcc gcugcugu ugaaacugc gcaaacggcca ccuccuuaag gacgacgccu      240
gguucugcaa cuggaucucu gugcaggcc ccggagccgg ggacgaggc aagguuccuu    300 guuaccgcug gguggaggc aacgcgucc ugagccugcc ugaaggcacc ggccgcacug    360
ugggcgagga cccucagggc cuguuccaga acaccgggga agaagcugug gaagagagaa    420
ggaaguugua ccggugggga aacuggaagg acgggggau ucugaauaug gcuggggcca    480
aacuauauga ccucccugug gaugagcgau uucuggaaga caagagaguu gacuuugagg    540
uuucgcuggc caaggggcug gccgaccucg cuaucaaaga cucucuaaau guucugacuu    600
gcuggaagga ucuagaugac uucaaccgga uuuucuggug ugguccagagc aagcugcug   660 agcgcgugcg ggacuccugg aaggaagaug ccuuauuugg guaccagguu cuaaauggcg    720
ccaaccccgu gguugcugagg cgcucucugcuc accuuccugc ucgcccuagug uucccuccag    780 gcauggagga acucgaggcc cagcuggaga aggagcugga gggaggcaca cuguucgaag    840
```

```
ctgacttctc cctgctggat gggatcaagg ccaacgtcat tctctgtagc cagcagcacc      900
tggctgcccc tctagtcatg ctgaaattgc agcctgatgg gaaactcttg cccatggtca      960
tccagctcca gctgccccgc acaggatccc caccacctcc cctttttcttg cctacggatc     1020 ccccaatggc ctggcttctg gccaaatgct gggtgcgcag ctctgacttc cagctccatg     1080
agctgcagtc tcatcttctg aggggacact tgatggctga ggtcattgtt gtggccacca     1140
tgaggtgcct gccgtcgata catcctatct tcaagcttat aattccccac ctgcgataca     1200
ccctggaaat taacgtccgg gccaggactg ggctggtctc tgacatggga attttcgacc     1260
agataatgag cactggtggg ggaggccacg tgcagctgct caagcaagct ggagccttcc     1320
taacctacag ctccttctgt cccctgatg acttggccga ccgggggctc ctgggagtga     1380
agtcttcctt ctatgcccaa gatgcgctgc ggctctggga aatcatctat cggtatgtgg     1440
aaggaatcgt gagtctccac tataagacag acgtggctgt gaaagacgac ccagagctgc     1500
agacctggtg tcgagagatc actgaaatcg gctgcaagg ggcccaggac cgagggtttc     1560
ctgtctcttt acaggctcgg gaccaggttt gccactttgt caccatgtgt atcttcacct     1620
gcaccggcca acacgcctct gtgcacctgg gccagctgga ctggtactct gggtgccta     1680 atgcaccctg cacgatgcgg ctgcccccgc caaccaccaa ggatgcaacg ctggagacag     1740
tgatggcgac actgcccaac ttccaccagg cttctctcca gatgtccatc acttggcagc     1800
tgggcagacg ccagcccgtt atggtggctg tgggccagca tgaggaggag tatttttcgg     1860
gccctgagcc taaggctgtg ctgaagaagt tcagggagga gctggctgcc ctggataagg     1920
aaattgagat ccggaatgca aagctggaca tgccctacga gtacctgcgg cccagcgtgg     1980
tggaaaacag tgtggccatc taagcgtcgc cacccttttgg ttatttcagc ccccatcacc     2040
caagccacaa gctgacccct tcgtggttat agccctgccc tcccaagtcc cacccctcttc     2100 ccatgtccca ccctccctag aggggcacct tttcatggtc tctgcaccca gtgaacacat     2160
tttactctag aggcatcacc tgggaccta ctcctctttc cttccttcct cctttcctat     2220
cttccttcct ctctctcttc ctcttttctct attcagatct atatggcaaa tagccacaat     2280
tatataaatc atttcaagac tagaatggg ggatataata catattactc cacacctttt     2340
atgaatcaaa tatgattttt ttgttgttgt taagacagag tctcactttg cacccaggc     2400 tggagtgcag tggtgccatc accacggctc actgcagcct cagcgtcctg ggctcaaatg     2460
atcctcccac ctcagcctcc tgagtagctg ggactacagg ctcatgccat catgcccagc     2520 taatatttt ttattttcgt ggagacgggg cctcactatg ttgcctaggc tggaaatagg     2580
attttgaacc caaattgagt ttaacaataa taaaaagttg ttttacgcta aagatggaaa     2640
agaactagga ctgaactatt ttaaataaaa tattggcaaa agaaaaaaaa aaaaaaaaa     2700 aaaaaaa                                                                2707

<210> SEQ ID NO 6
<211> LENGTH: 2707
<212> TYPE: DNA
<213> ORGANISM: homo sapien

<400> SEQUENCE: 6
catctttgag caagatgggt ctctaccgca tccgcgtgtc cactggggcc tcgctctatg       60
ccggttccaa caaccaggtg cagctgtggc tggtcggcca gcacggggag cggcgctcg      120 ggaagcgact gtggcccgca cggggcaagg agacagaact caaggtggaa gtaccggagt     180
atctggggcc gctgctgttt gtgaaactgc gcaaacggca cctccttaag gacgacgcct     240
```

-continued

```
ggttctgcaa ctggatctct gtgcagggcc ccggagccgg ggacgaggtc aggttccctt     300
gttaccgctg ggtggagggc aacggcgtcc tgagcctgcc tgaaggcacc ggccgcactg     360
tgggcgagga ccctcagggc ctgttccaga acaccggga agaagagctg aagagagaa      420 ggaagttgta ccgtgggga aactggaagg acgggttaat tctgaatatg ctggggcca      480 aactatatga cctccctgtg gatgagcgat ttctggaaga caagagagtt gactttgagg     540
tttcgctggc caaggggctg ccgacctcg ctatcaaaga ctctctaaat gttctgactt       600
gctggaagga tctagatgac ttcaaccgga ttttctggtg tggtcagagc aagctggctg     660
agcgcgtgcg ggactcctgg aaggaagatg ccttatttgg gtaccagttt cttaatggcg     720
ccaaccccgt ggtgctgagg cgctctgctc accttcctgc tcgcctagtg ttccctccag     780
gcatggagga actgcaggcc cagctggaga aggagctgga gggaggcaca ctgttcgaag     840
ctgacttctc cctgctggat gggatcaagg ccaacgtcat tctctgtagc cagcagcacc     900
tggctgcccc tctagtcatg ctgaaattgc agcctgatgg gaaactcttg ccatggtca      960 tccagctcca gctgccccgc acaggatccc caccacctcc ccttttcttg cctacggatc    1020
ccccaatggc ctggcttctg gccaaatgct gggtgcgcag ctctgacttc cagctccatg    1080
agctgcagtc tcatcttctg aggggacact tgatggctga ggtcattgtt gtggccacca    1140
tgaggtgcct gccgtcgata catcctatct tcaagcttat aattccccac ctgcgataca    1200
ccctggaaat taacgtccgg gccaggactg ggctggtctc tgacatggga attttcgacc    1260
agataatgag cactggtggg ggaggccacg tgcagctgct caagcaagct ggagccttcc    1320
taacctacag ctccttctgt cccctgatg acttggccga ccgggggctc ctgggagtga    1380
agtcttcctt ctatgcccaa gatgcgctgc ggctctggga aatcatctat cggtatgtgg    1440
aaggaatcgt gagtctccac tataagacag acgtggctgt gaaagacgac ccagagctgc    1500
agacctggtg tcgagagatc actgaaatcg gctgcaagg ggcccaggac cgagggtttc     1560
ctgtctcttt acaggctcgg gaccaggttt gccactttgt caccatgtgt atcttcacct    1620
gcaccggcca acacgcctct gtgcacctgg gccagctgga ctggtactct gggtgcccta    1680
atgcaccctg catgatgcgg ctgccccgc caaccaccaa ggatgcaacg ctggagacag    1740
tgatggcgac actgcccaac ttccaccagg cttctctcca gatgtccatc acttggcagc    1800
tgggcagacg ccagcccgtt atggtggctg tgggccagca tgaggaggag tattttcgg    1860 gccctgagcc taaggctgtg ctgaagaagt tcagggagga gctggctgcc ctggataagg    1920
aaattgagat ccggaatgca aagctggaca tgccctacga gtacctgcgg cccagcgtgg    1980
tggaaaacag tgtggccatc taagcgtcgc cacccttgg ttatttcagc ccccatcacc    2040
caagccacaa gctgaccct tcgtggttat agccctgccc tcccaagtcc cacccctcttc    2100 ccatgtccca ccctccctag aggggcacct tttcatggtc tctgcaccca gtgaacacat    2160
tttactctag aggcatcacc tgggaccttta ctcctctttc cttccttcct cctttcctat    2220
cttccttcct ctctctcttc ctctttcttc attcagatct atatggcaaa tagccacaat    2280
tatataaatc atttcaagac tagaataggg ggatataata catattactc cacacctttt    2340
atgaatcaaa tatgattttt ttgttgttgt taagacagag tctcactttg acacccaggc    2400
tggagtgcag tggtgccatc accacggctc actgcagcct cagcgtcctg ggctcaaatg    2460
atcctcccac ctcagcctcc tgagtagctg ggactacagg ctcatgccat catgcccagc    2520
taatattttt ttattttcgt ggagacgggg cctcactatg ttgcctaggc tggaaatagg    2580
```

-continued

```
attttgaacc caaattgagt ttaacaataa taaaaagttg ttttacgcta aagatggaaa    2640
agaactagga ctgaactatt ttaaataaaa tattggcaaa agaaaaaaaa aaaaaaaaaa    2700
aaaaaaa                                                              2707
```

<210> SEQ ID NO 7
<211> LENGTH: 662
<212> TYPE: PRT
<213> ORGANISM: homo sapien

<400> SEQUENCE: 7

```
Met Gly Leu Tyr Arg Ile Arg Val Ser Thr Gly Ala Ser Leu Tyr Ala
1               5                   10                  15

Gly Ser Asn Asn Gln Val Gln Leu Trp Leu Val Gly Gln His Gly Glu
            20                  25                  30

Ala Ala Leu Gly Lys Arg Leu Trp Pro Ala Arg Gly Lys Glu Thr Glu
        35                  40                  45

Leu Lys Val Glu Val Pro Glu Tyr Leu Gly Pro Leu Leu Phe Val Lys
    50                  55                  60

Leu Arg Lys Arg His Leu Leu Lys Asp Asp Ala Trp Phe Cys Asn Trp
65                  70                  75                  80

Ile Ser Val Gln Gly Pro Gly Ala Gly Asp Glu Val Arg Phe Pro Cys
                85                  90                  95

Tyr Arg Trp Val Glu Gly Asn Gly Val Leu Ser Leu Pro Glu Gly Thr
            100                 105                 110

Gly Arg Thr Val Gly Glu Asp Pro Gln Gly Leu Phe Gln Lys His Arg
        115                 120                 125

Glu Glu Glu Leu Glu Glu Arg Arg Lys Leu Tyr Arg Trp Gly Asn Trp
    130                 135                 140

Lys Asp Gly Leu Ile Leu Asn Met Ala Gly Ala Lys Leu Tyr Asp Leu
145                 150                 155                 160

Pro Val Asp Glu Arg Phe Leu Glu Asp Lys Arg Val Asp Phe Glu Val
                165                 170                 175

Ser Leu Ala Lys Gly Leu Ala Asp Leu Ala Ile Lys Asp Ser Leu Asn
            180                 185                 190

Val Leu Thr Cys Trp Lys Asp Leu Asp Asp Phe Asn Arg Ile Phe Trp
        195                 200                 205

Cys Gly Gln Ser Lys Leu Ala Glu Arg Val Arg Asp Ser Trp Lys Glu
    210                 215                 220

Asp Ala Leu Phe Gly Tyr Gln Phe Leu Asn Gly Ala Asn Pro Val Val
225                 230                 235                 240

Leu Arg Arg Ser Ala His Leu Pro Ala Arg Leu Val Phe Pro Pro Gly
                245                 250                 255

Met Glu Glu Leu Gln Ala Gln Leu Lys Glu Leu Glu Gly Gly Thr
            260                 265                 270

Leu Phe Glu Ala Asp Phe Ser Leu Leu Asp Gly Ile Lys Ala Asn Val
        275                 280                 285

Ile Leu Cys Ser Gln Gln His Leu Ala Ala Pro Leu Val Met Leu Lys
    290                 295                 300

Leu Gln Pro Asp Gly Lys Leu Leu Pro Met Val Ile Gln Leu Gln Leu
305                 310                 315                 320

Pro Arg Thr Gly Ser Pro Pro Pro Leu Phe Leu Pro Thr Asp Pro
                325                 330                 335

Pro Met Ala Trp Leu Leu Ala Lys Cys Trp Val Arg Ser Ser Asp Phe
            340                 345                 350
```

Gln Leu His Glu Leu Gln Ser His Leu Leu Arg Gly His Leu Met Ala
        355                 360                 365

Glu Val Ile Val Val Ala Thr Met Arg Cys Leu Pro Ser Ile His Pro
        370                 375                 380

Ile Phe Lys Leu Ile Ile Pro His Leu Arg Tyr Thr Leu Glu Ile Asn
385                 390                 395                 400

Val Arg Ala Arg Thr Gly Leu Val Ser Asp Met Gly Ile Phe Asp Gln
                405                 410                 415

Ile Met Ser Thr Gly Gly Gly His Val Gln Leu Leu Lys Gln Ala
                420                 425                 430

Gly Ala Phe Leu Thr Tyr Ser Ser Phe Cys Pro Pro Asp Asp Leu Ala
        435                 440                 445

Asp Arg Gly Leu Leu Gly Val Lys Ser Ser Phe Tyr Ala Gln Asp Ala
        450                 455                 460

Leu Arg Leu Trp Glu Ile Ile Tyr Arg Tyr Val Glu Gly Ile Val Ser
465                 470                 475                 480

Leu His Tyr Lys Thr Asp Val Ala Val Lys Asp Asp Pro Glu Leu Gln
                485                 490                 495

Thr Trp Cys Arg Glu Ile Thr Glu Ile Gly Leu Gln Gly Ala Gln Asp
        500                 505                 510

Arg Gly Phe Pro Val Ser Leu Gln Ala Arg Asp Gln Val Cys His Phe
        515                 520                 525

Val Thr Met Cys Ile Phe Thr Cys Thr Gly Gln His Ala Ser Val His
        530                 535                 540

Leu Gly Gln Leu Asp Trp Tyr Ser Trp Val Pro Asn Ala Pro Cys Thr
545                 550                 555                 560

Met Arg Leu Pro Pro Pro Thr Thr Lys Asp Ala Thr Leu Glu Thr Val
                565                 570                 575

Met Ala Thr Leu Pro Asn Phe His Gln Ala Ser Leu Gln Met Ser Ile
                580                 585                 590

Thr Trp Gln Leu Gly Arg Arg Gln Pro Val Met Val Ala Val Gly Gln
        595                 600                 605

His Glu Glu Glu Tyr Phe Ser Gly Pro Glu Pro Lys Ala Val Leu Lys
        610                 615                 620

Lys Phe Arg Glu Glu Leu Ala Ala Leu Asp Lys Glu Ile Glu Ile Arg
625                 630                 635                 640

Asn Ala Lys Leu Asp Met Pro Tyr Glu Tyr Leu Arg Pro Ser Val Val
                645                 650                 655

Glu Asn Ser Val Ala Ile
                660

<210> SEQ ID NO 8
<211> LENGTH: 662
<212> TYPE: PRT
<213> ORGANISM: homo sapien

<400> SEQUENCE: 8

Met Gly Leu Tyr Arg Ile Arg Val Ser Thr Gly Ala Ser Leu Tyr Ala
1               5                   10                  15

Gly Ser Asn Asn Gln Val Gln Leu Trp Leu Val Gly Gln His Gly Glu
                20                  25                  30

Ala Ala Leu Gly Lys Arg Leu Trp Pro Ala Arg Gly Lys Glu Thr Glu
        35                  40                  45

Leu Lys Val Glu Val Pro Glu Tyr Leu Gly Pro Leu Leu Phe Val Lys

```
                50                  55                  60
Leu Arg Lys Arg His Leu Leu Lys Asp Asp Ala Trp Phe Cys Asn Trp
 65                  70                  75                  80

Ile Ser Val Gln Gly Pro Gly Ala Gly Asp Glu Val Arg Phe Pro Cys
                     85                  90                  95

Tyr Arg Trp Val Glu Gly Asn Gly Val Leu Ser Leu Pro Glu Gly Thr
                    100                 105                 110

Gly Arg Thr Val Gly Glu Asp Pro Gln Gly Leu Phe Gln Lys His Arg
                115                 120                 125

Glu Glu Glu Leu Glu Glu Arg Arg Lys Leu Tyr Arg Trp Gly Asn Trp
                130                 135                 140

Lys Asp Gly Leu Ile Leu Asn Met Ala Gly Ala Lys Leu Tyr Asp Leu
145                 150                 155                 160

Pro Val Asp Glu Arg Phe Leu Glu Asp Lys Arg Val Asp Phe Glu Val
                165                 170                 175

Ser Leu Ala Lys Gly Leu Ala Asp Leu Ala Ile Lys Asp Ser Leu Asn
                180                 185                 190

Val Leu Thr Cys Trp Lys Asp Leu Asp Asp Phe Asn Arg Ile Phe Trp
                195                 200                 205

Cys Gly Gln Ser Lys Leu Ala Glu Arg Val Arg Asp Ser Trp Lys Glu
210                 215                 220

Asp Ala Leu Phe Gly Tyr Gln Phe Leu Asn Gly Ala Asn Pro Val Val
225                 230                 235                 240

Leu Arg Arg Ser Ala His Leu Pro Ala Arg Leu Val Phe Pro Pro Gly
                245                 250                 255

Met Glu Glu Leu Gln Ala Gln Leu Glu Lys Glu Leu Glu Gly Gly Thr
                260                 265                 270

Leu Phe Glu Ala Asp Phe Ser Leu Leu Asp Gly Ile Lys Ala Asn Val
                275                 280                 285

Ile Leu Cys Ser Gln Gln His Leu Ala Ala Pro Leu Val Met Leu Lys
                290                 295                 300

Leu Gln Pro Asp Gly Lys Leu Leu Pro Met Val Ile Gln Leu Gln Leu
305                 310                 315                 320

Pro Arg Thr Gly Ser Pro Pro Pro Leu Phe Leu Pro Thr Asp Pro
                325                 330                 335

Pro Met Ala Trp Leu Leu Ala Lys Cys Trp Val Arg Ser Ser Asp Phe
                340                 345                 350

Gln Leu His Glu Leu Gln Ser His Leu Leu Arg Gly His Leu Met Ala
                355                 360                 365

Glu Val Ile Val Val Ala Thr Met Arg Cys Leu Pro Ser Ile His Pro
                370                 375                 380

Ile Phe Lys Leu Ile Ile Pro His Leu Arg Tyr Thr Leu Glu Ile Asn
385                 390                 395                 400

Val Arg Ala Arg Thr Gly Leu Val Ser Asp Met Gly Ile Phe Asp Gln
                405                 410                 415

Ile Met Ser Thr Gly Gly Gly His Val Gln Leu Leu Lys Gln Ala
                420                 425                 430

Gly Ala Phe Leu Thr Tyr Ser Ser Phe Cys Pro Pro Asp Asp Leu Ala
                435                 440                 445

Asp Arg Gly Leu Leu Gly Val Lys Ser Ser Phe Tyr Ala Gln Asp Ala
                450                 455                 460

Leu Arg Leu Trp Glu Ile Ile Tyr Arg Tyr Val Glu Gly Ile Val Ser
465                 470                 475                 480
```

```
Leu His Tyr Lys Thr Asp Val Ala Val Lys Asp Asp Pro Glu Leu Gln
            485                 490                 495

Thr Trp Cys Arg Glu Ile Thr Glu Ile Gly Leu Gln Gly Ala Gln Asp
        500                 505                 510

Arg Gly Phe Pro Val Ser Leu Gln Ala Arg Asp Gln Val Cys His Phe
        515                 520                 525

Val Thr Met Cys Ile Phe Thr Cys Thr Gly Gln His Ala Ser Val His
530                 535                 540

Leu Gly Gln Leu Asp Trp Tyr Ser Trp Val Pro Asn Ala Pro Cys Met
545                 550                 555                 560

Met Arg Leu Pro Pro Thr Thr Lys Asp Ala Thr Leu Glu Thr Val
            565                 570                 575

Met Ala Thr Leu Pro Asn Phe His Gln Ala Ser Leu Gln Met Ser Ile
            580                 585                 590

Thr Trp Gln Leu Gly Arg Arg Gln Pro Val Met Val Ala Val Gly Gln
        595                 600                 605

His Glu Glu Tyr Phe Ser Gly Pro Glu Pro Lys Ala Val Leu Lys
        610                 615                 620

Lys Phe Arg Glu Glu Leu Ala Ala Leu Asp Lys Glu Ile Glu Ile Arg
625                 630                 635                 640

Asn Ala Lys Leu Asp Met Pro Tyr Glu Tyr Leu Arg Pro Ser Val Val
            645                 650                 655

Glu Asn Ser Val Ala Ile
            660

<210> SEQ ID NO 9
<211> LENGTH: 59
<212> TYPE: DNA
<213> ORGANISM: artificial sequence
<220> FEATURE:
<223> OTHER INFORMATION: ALOX15 shRNA

<400> SEQUENCE: 9
ccgggaaact ggaaggacgg gttaactcga gttaacccgt ccttccagtt tctttttg      59

<210> SEQ ID NO 10
<211> LENGTH: 58
<212> TYPE: DNA
<213> ORGANISM: artificial sequence
<220> FEATURE:
<223> OTHER INFORMATION: ALOX15 shRNA

<400> SEQUENCE: 10
ccgggctatc aaagactctc taaatctcga gatttagaga gtctttgata gcttttg       58

<210> SEQ ID NO 11
<211> LENGTH: 58
<212> TYPE: DNA
<213> ORGANISM: artificial sequence
<220> FEATURE:
<223> OTHER INFORMATION: ALOX15 shRNA

<400> SEQUENCE: 11
ccggtgggaa atcatctatc ggtatctcga gataccgata gatgatttcc cattttg       58

<210> SEQ ID NO 12
<211> LENGTH: 58
<212> TYPE: DNA
<213> ORGANISM: artificial sequence
<220> FEATURE:
```

<223> OTHER INFORMATION: ALOX15 shRNA

<400> SEQUENCE: 12
ccggcctgga aggaagatgc cttatctcga gataaggcat cttccttcca ggttttttg   58

<210> SEQ ID NO 13
<211> LENGTH: 58
<212> TYPE: DNA
<213> ORGANISM: artificial sequence
<220> FEATURE:
<223> OTHER INFORMATION: ALOX15 shRNA

<400> SEQUENCE: 13
ccggccagtt tcttaatggc gccaactcga gttggcgcca ttaagaaact ggttttttg   58

<210> SEQ ID NO 14
<211> LENGTH: 58
<212> TYPE: DNA
<213> ORGANISM: artificial sequence
<220> FEATURE:
<223> OTHER INFORMATION: ALOX15 shRNA

<400> SEQUENCE: 14
ccgggccgtc gatacatcct atcttctcga gaagatagga tgtatcgacg gcttttttg   58

<210> SEQ ID NO 15
<211> LENGTH: 59
<212> TYPE: DNA
<213> ORGANISM: artificial sequence
<220> FEATURE:
<223> OTHER INFORMATION: ALOX15 shRNA

<400> SEQUENCE: 15
ccggtagatg acttcaaccg gatttctcga gaaatccggt tgaagtcatc tatttttg    59

<210> SEQ ID NO 16
<211> LENGTH: 59
<212> TYPE: DNA
<213> ORGANISM: artificial sequence
<220> FEATURE:
<223> OTHER INFORMATION: ALOX15 shRNA

<400> SEQUENCE: 16
ccggtggtac tcttgggtgc ctaatctcga gattaggcac ccaagagtac catttttg    59

<210> SEQ ID NO 17
<211> LENGTH: 170
<212> TYPE: PRT
<213> ORGANISM: artificial sequence
<220> FEATURE:
<223> OTHER INFORMATION: PP1 inhibitory peptide

<400> SEQUENCE: 17

Met Glu Pro Asp Asn Ser Pro Arg Lys Ile Gln Phe Thr Val Pro Leu
1               5                   10                  15

Leu Glu Pro His Leu Asp Pro Glu Ala Ala Glu Gln Ile Arg Arg Arg
                20                  25                  30

Arg Pro Thr Pro Ala Thr Leu Val Leu Thr Ser Asp Gln Ser Ser Pro
            35                  40                  45

Glu Ile Asp Glu Asp Arg Ile Pro Asn Ser Leu Leu Lys Ser Thr Leu
    50                  55                  60

Ser Met Ser Pro Arg Gln Arg Lys Lys Met Thr Arg Thr Thr Pro Thr
65                  70                  75                  80

```
Met Lys Glu Leu Gln Thr Met Val His His Leu Gly Gln Gln Lys Gln
                85                  90                  95

Gly Glu Glu Pro Glu Gly Ala Thr Glu Ser Thr Gly Asn Gln Glu Ser
            100                 105                 110

Cys Pro Pro Gly Ile Pro Asp Thr Gly Ser Ala Ser Arg Pro Asp Thr
            115                 120                 125

Pro Gly Thr Ala Gln Lys Ser Ala Glu Ser Asn Pro Lys Thr Gln Glu
        130                 135                 140

Gln Cys Gly Val Glu Pro Arg Thr Glu Asp Ser Ser Ala His Met Leu
145                 150                 155                 160

Pro Leu Asp Ser Gln Gly Ala Ser Leu Val
                165                 170
```

<210> SEQ ID NO 18
<211> LENGTH: 205
<212> TYPE: PRT
<213> ORGANISM: artificial sequence
<220> FEATURE:
<223> OTHER INFORMATION: PP1 inhibitory peptide

<400> SEQUENCE: 18

```
Met Ala Ala Ser Thr Ala Ser His Arg Pro Ile Lys Gly Ile Leu Lys
1               5                   10                  15

Asn Lys Thr Ser Ser Thr Ser Ser Arg Val Ala Ser Ala Glu Gln Pro
            20                  25                  30

Arg Gly Ser Val Asp Glu Glu Leu Ser Lys Lys Ser Gln Lys Trp Asp
        35                  40                  45

Glu Met Asn Ile Leu Ala Thr Tyr His Pro Ala Asp Lys Asp Tyr Gly
    50                  55                  60

Leu Met Lys Ile Asp Glu Pro Ser Thr Pro Tyr His Ser Met Ile Gly
65                  70                  75                  80

Asp Asp Asp Asp Ala Tyr Ser Asp Thr Glu Thr Thr Glu Ala Met Thr
                85                  90                  95

Pro Asp Thr Leu Ala Lys Lys Leu Ala Ala Ala Glu Gly Ser Glu Pro
            100                 105                 110

Lys Tyr Arg Ile Arg Glu Gln Glu Ser Ser Gly Glu Glu Asp Ser Asp
        115                 120                 125

Leu Ser Pro Glu Glu Arg Glu Lys Lys Arg Gln Phe Glu Met Lys Arg
    130                 135                 140

Lys Leu His Tyr Asn Glu Gly Leu Asn Ile Lys Leu Ala Arg Gln Leu
145                 150                 155                 160

Ile Ser Lys Asp Leu His Asp Asp Glu Asp Glu Glu Met Ser Glu
                165                 170                 175

Thr Ala Asp Gly Glu Ser Met Asn Thr Glu Glu Ser Asn Gln Gly Ser
            180                 185                 190

Thr Pro Ser Asp Gln Arg Gln Asn Lys Ser Gln Ser Ser
        195                 200                 205
```

<210> SEQ ID NO 19
<211> LENGTH: 23
<212> TYPE: DNA
<213> ORGANISM: artificial sequence
<220> FEATURE:
<223> OTHER INFORMATION: ALOX15 gRNA recognition sequence

<400> SEQUENCE: 19
taccaagcac gcgagccccg tgg                                        23

```
<210> SEQ ID NO 20
<211> LENGTH: 23
<212> TYPE: DNA
<213> ORGANISM: artificial sequence
<220> FEATURE:
<223> OTHER INFORMATION: ALOX15 gRNA recognition sequence

<400> SEQUENCE: 20
gaccacgggg ctcgcgtgct tgg                                              23

<210> SEQ ID NO 21
<211> LENGTH: 23
<212> TYPE: DNA
<213> ORGANISM: artificial sequence
<220> FEATURE:
<223> OTHER INFORMATION: ALOX15 gRNA recognition sequence

<400> SEQUENCE: 21
acggggctcg cgtgcttggt agg                                              23

<210> SEQ ID NO 22
<211> LENGTH: 23
<212> TYPE: DNA
<213> ORGANISM: artificial sequence
<220> FEATURE:
<223> OTHER INFORMATION: ALOX15 gRNA recognition sequence

<400> SEQUENCE: 22
gcatccttgg tggttggcgg ggg                                              23

<210> SEQ ID NO 23
<211> LENGTH: 23
<212> TYPE: DNA
<213> ORGANISM: artificial sequence
<220> FEATURE:
<223> OTHER INFORMATION: ALOX15 gRNA recognition sequence

<400> SEQUENCE: 23
cgggggcagc cgcatcgtgc agg                                              23

<210> SEQ ID NO 24
<211> LENGTH: 23
<212> TYPE: DNA
<213> ORGANISM: artificial sequence
<220> FEATURE:
<223> OTHER INFORMATION: ALOX15 gRNA recognition sequence

<400> SEQUENCE: 24
ttagctggac tggtactctt ggg                                              23

<210> SEQ ID NO 25
<211> LENGTH: 23
<212> TYPE: DNA
<213> ORGANISM: artificial sequence
<220> FEATURE:
<223> OTHER INFORMATION: ALOX15 gRNA recognition sequence

<400> SEQUENCE: 25
gggggcagcc gcatcgtgca ggg                                              23

<210> SEQ ID NO 26
<211> LENGTH: 23
<212> TYPE: DNA
<213> ORGANISM: artificial sequence
<220> FEATURE:
<223> OTHER INFORMATION: ALOX15 gRNA recognition sequence
```

```
<400> SEQUENCE: 26
cttagctgga ctggtactct tgg                                              23

<210> SEQ ID NO 27
<211> LENGTH: 23
<212> TYPE: DNA
<213> ORGANISM: artificial sequence
<220> FEATURE:
<223> OTHER INFORMATION: ALOX15 gRNA recognition sequence

<400> SEQUENCE: 27
tgcatccttg gtggttggcg ggg                                              23

<210> SEQ ID NO 28
<211> LENGTH: 23
<212> TYPE: DNA
<213> ORGANISM: artificial sequence
<220> FEATURE:
<223> OTHER INFORMATION: ALOX15 gRNA recognition sequence

<400> SEQUENCE: 28
caagagtacc agtccagcta agg                                              23

<210> SEQ ID NO 29
<211> LENGTH: 23
<212> TYPE: DNA
<213> ORGANISM: artificial sequence
<220> FEATURE:
<223> OTHER INFORMATION: ALOX15 gRNA recognition sequence

<400> SEQUENCE: 29
gatgtccatc acttggcagc tgg                                              23

<210> SEQ ID NO 30
<211> LENGTH: 23
<212> TYPE: DNA
<213> ORGANISM: artificial sequence
<220> FEATURE:
<223> OTHER INFORMATION: ALOX15 gRNA recognition sequence

<400> SEQUENCE: 30
gtaccagtcc agctaaggaa ggg                                              23

<210> SEQ ID NO 31
<211> LENGTH: 23
<212> TYPE: DNA
<213> ORGANISM: artificial sequence
<220> FEATURE:
<223> OTHER INFORMATION: ALOX15 gRNA recognition sequence

<400> SEQUENCE: 31
ttgcatcctt ggtggttggc ggg                                              23

<210> SEQ ID NO 32
<211> LENGTH: 23
<212> TYPE: DNA
<213> ORGANISM: artificial sequence
<220> FEATURE:
<223> OTHER INFORMATION: ALOX15 gRNA recognition sequence

<400> SEQUENCE: 32
ctgtgtgcag gtggaccacg ggg                                              23

<210> SEQ ID NO 33
```

-continued

```
<210> SEQ ID NO 33
<211> LENGTH: 23
<212> TYPE: DNA
<213> ORGANISM: artificial sequence
<220> FEATURE:
<223> OTHER INFORMATION: ALOX15 gRNA recognition sequence

<400> SEQUENCE: 33
tctgtgtgca ggtggaccac ggg                                        23

<210> SEQ ID NO 34
<211> LENGTH: 23
<212> TYPE: DNA
<213> ORGANISM: artificial sequence
<220> FEATURE:
<223> OTHER INFORMATION: ALOX15 gRNA recognition sequence

<400> SEQUENCE: 34
tgcttggtag gcactgactc tgg                                        23

<210> SEQ ID NO 35
<211> LENGTH: 23
<212> TYPE: DNA
<213> ORGANISM: artificial sequence
<220> FEATURE:
<223> OTHER INFORMATION: ALOX15 gRNA recognition sequence

<400> SEQUENCE: 35
agtaccagtc cagctaagga agg                                        23

<210> SEQ ID NO 36
<211> LENGTH: 23
<212> TYPE: DNA
<213> ORGANISM: artificial sequence
<220> FEATURE:
<223> OTHER INFORMATION: ALOX15 gRNA recognition sequence

<400> SEQUENCE: 36
ctgcccttcc ttagctggac tgg                                        23

<210> SEQ ID NO 37
<211> LENGTH: 23
<212> TYPE: DNA
<213> ORGANISM: artificial sequence
<220> FEATURE:
<223> OTHER INFORMATION: ALOX15 gRNA recognition sequence

<400> SEQUENCE: 37
gacactgccc aacttccacc agg                                        23

<210> SEQ ID NO 38
<211> LENGTH: 23
<212> TYPE: DNA
<213> ORGANISM: artificial sequence
<220> FEATURE:
<223> OTHER INFORMATION: ALOX15 gRNA recognition sequence

<400> SEQUENCE: 38
agagaagcct ggtggaagtt ggg                                        23

<210> SEQ ID NO 39
<211> LENGTH: 23
<212> TYPE: DNA
<213> ORGANISM: artificial sequence
<220> FEATURE:
<223> OTHER INFORMATION: ALOX15 gRNA recognition sequence

<400> SEQUENCE: 39
```

```
gatccctgcc cttccttagc tgg                                              23

<210> SEQ ID NO 40
<211> LENGTH: 23
<212> TYPE: DNA
<213> ORGANISM: artificial sequence
<220> FEATURE:
<223> OTHER INFORMATION: ALOX15 gRNA recognition sequence

<400> SEQUENCE: 40
gtctgtgtgc aggtggacca cgg                                              23

<210> SEQ ID NO 41
<211> LENGTH: 23
<212> TYPE: DNA
<213> ORGANISM: artificial sequence
<220> FEATURE:
<223> OTHER INFORMATION: ALOX15 gRNA recognition sequence

<400> SEQUENCE: 41
cagtccagct aaggaagggc agg                                              23

<210> SEQ ID NO 42
<211> LENGTH: 23
<212> TYPE: DNA
<213> ORGANISM: artificial sequence
<220> FEATURE:
<223> OTHER INFORMATION: ALOX15 gRNA recognition sequence

<400> SEQUENCE: 42
gctgccaagt gatggacatc tgg                                              23

<210> SEQ ID NO 43
<211> LENGTH: 23
<212> TYPE: DNA
<213> ORGANISM: artificial sequence
<220> FEATURE:
<223> OTHER INFORMATION: ALOX15 gRNA recognition sequence

<400> SEQUENCE: 43
tctgcccagc tgccaagtga tgg                                              23
```

TREATMENT OF RESPIRATORY DISORDERS WITH ARACHIDONATE 15-LIPOXYGENASE (ALOX15) INHIBITORS

REFERENCE TO SEQUENCE LISTING

This application includes a Sequence Listing submitted electronically as a text file named 18923802101SEQ, created on Nov. 24, 2019, with a size of 63 kilobytes. The Sequence Listing is incorporated herein by reference.

FIELD

The present disclosure relates generally to the treatment of patients having a respiratory disorder with an Arachidonate 15-Lipoxygenase (ALOX15) inhibitor, methods of identifying subjects having an increased risk of developing a respiratory disorder, and methods of detecting ALOX15 variant nucleic acid molecules and variant polypeptides.

BACKGROUND

Asthma can result from aeroallergen-induced inflammation driven by T-helper type 2 (Th2) processes and mediated by cytokines including interleukin (IL)-4, IL-5 and IL-13. IL-13 is a pleiotropic Th2 cytokine produced by activated T cells, basophils, eosinophils, and mast cells, and it has been strongly implicated in the pathogenesis of asthma in preclinical models. Elevated levels of IL-13 have been detected in the airways in a subset of human asthma patients. While asthma is often characterized by eosinophilic infiltration of the airways, there is increasing evidence that there are other subtypes of the disease driven by alternative forms of inflammation. For example, studies of the cellular components of airway inflammation in asthma provide evidence for distinct eosinophilic and non-eosinophilic phenotypes of asthma. The identification of and development of biomarkers for asthma would be helpful.

Nasal polyps are often soft, painless, non-cancerous growths on the lining of the nasal passages or sinuses. Nasal polyps can result from chronic inflammation due to asthma, recurring infection, allergies, drug sensitivity, or some immune disorders. Larger growths or groups of nasal polyps can block nasal passages and possibly lead to breathing problems, a lost sense of smell, and frequent infections. Medications can often shrink or eliminate nasal polyps, but surgery is sometimes needed to remove them. Even after successful treatment, nasal polyps often return.

Allergic rhinitis typically causes symptoms in the nose, throat, eyes, ears, skin and/or roof of the mouth. Seasonal allergic rhinitis (e.g., hay fever) is most often caused by pollen carried in the air during different times of the year in different parts of the country. Allergic rhinitis, such as perennial allergic rhinitis, can also be caused by indoor allergens such as dried skin flakes, urine and saliva located on pet dander, mold, products from dust mites, and cockroach particles, with symptoms often occurring year-round. In addition to allergen triggers, symptoms may also result from irritants such as smoke and strong odors, or to changes in the temperature and humidity of the air.

Aspirin-exacerbated respiratory disease (AERD) is characterized by mucosal swelling of the sinuses and nasal membranes, nasal polyps, and asthma coupled with respiratory reactions to aspirin/NSAIDs. AERD is an acquired disease with average onset at 30 years of age. About 50% of patients develop AERD following a respiratory virus. AERD can cause severe asthma and remodeling of airways, and is often diagnosed by a history of respiratory reactions to COX1 inhibitors. The prevalence is estimated at 7.2% in general asthmatics (1.3 million in U.S.), 14.9% in severe asthmatics, 9.7% among patients with nasal polyps, 8.7% among patients with chronic sinusitis. However, about 20-40% of patients with nasal polyps, asthma, and chronic sinusitis are aspirin-sensitive with no prior exposure to COX1 inhibitors.

ALOX15 (also known as 15-LO and 15-LOX) is a non-heme iron-containing dioxygenase that catalyzes the stereo-specific peroxidation of free and esterified polyunsaturated fatty acids generating a spectrum of bioactive lipid mediators. Additionally, ALOX15 converts arachidonic acid into 12-hydroperoxyeicosatetraenoic acid/12-HPETE and 15-hydroperoxyeicosatetraenoic acid/15-HPETE. ALOX15 also converts linoleic acid to 13-hydroperoxyoctadecadienoic acid. ALOX15 may also act on (12S)-hydroperoxyeicosatetraenoic acid/(12S)-HPETE to produce hepoxilin A3.

SUMMARY

The present disclosure provides methods of treating a patient having a respiratory disorder, the method comprising administering an ALOX15 inhibitor to the patient. In some embodiments, the patient has a nasal polyp, allergic rhinitis, asthma, and/or AERD.

The present disclosure also provides methods of treating a patient with a therapeutic agent that treats or inhibits a respiratory disorder, wherein the patient is suffering from a respiratory disorder, the method comprising the steps of: determining whether the patient has an ALOX15 predicted loss-of-function variant nucleic acid molecule encoding a human ALOX15 polypeptide by: obtaining or having obtained a biological sample from the patient; and performing or having performed a genotyping assay on the biological sample to determine if the patient has a genotype comprising the ALOX15 predicted loss-of-function variant nucleic acid molecule; and when the patient is ALOX15 reference, then administering or continuing to administer to the patient the therapeutic agent that treats or inhibits a respiratory disorder in a standard dosage amount, and administering to the patient an ALOX15 inhibitor; and when the patient is heterozygous for an ALOX15 predicted loss-of-function variant, then administering or continuing to administer to the patient the therapeutic agent that treats or inhibits a respiratory disorder in an amount that is the same as or lower than a standard dosage amount, and administering to the patient an ALOX15 inhibitor; wherein the presence of a genotype having the ALOX15 predicted loss-of-function variant nucleic acid molecule encoding the human ALOX15 polypeptide indicates the patient has a reduced risk of developing a respiratory disorder.

The present disclosure also provides methods of identifying a human subject having an increased risk for developing a respiratory disorder, wherein the method comprises: determining or having determined the presence or absence of an ALOX15 predicted loss-of-function variant nucleic acid molecule encoding a human ALOX15 polypeptide in a biological sample obtained from the subject; wherein: when the human subject is ALOX15 reference, then the human subject has an increased risk for developing a respiratory disorder; and when the human subject is heterozygous for an ALOX15 predicted loss-of-function variant or homozygous for an ALOX15 predicted loss-of-function variant, then the human subject has a decreased risk for developing a respiratory disorder.

The present disclosure also provides methods of detecting an ALOX15 variant nucleic acid molecule in a human subject comprising assaying a sample obtained from the human subject to determine whether a nucleic acid molecule in the sample is: a genomic nucleic acid molecule comprising a nucleotide sequence comprising a thymine at a position corresponding to position 9,917 according to SEQ ID NO:2, or the complement thereof; an mRNA molecule comprising a nucleotide sequence comprising a uracil at a position corresponding to position 1,693 according to SEQ ID NO:4, or the complement thereof; or a cDNA molecule comprising a nucleotide sequence comprising a thymine at a position corresponding to position 1,693 according to SEQ ID NO:6, or the complement thereof.

The present disclosure also provides methods of detecting the presence of a human ALOX15 Thr560Met variant polypeptide, comprising performing an assay on a sample obtained from a human subject to determine whether an ALOX15 protein in the sample comprises a methionine at a position corresponding to position 560 according to SEQ ID NO:8.

The present disclosure also provides therapeutic agents that treat or inhibit a respiratory disorder for use in the treatment of a respiratory disorder in a human subject having: a genomic nucleic acid molecule having a nucleotide sequence encoding a human ALOX15 polypeptide, wherein the nucleotide sequence comprises a thymine at a position corresponding to position 9,917 according to SEQ ID NO:2, or the complement thereof; an mRNA molecule having a nucleotide sequence encoding a human ALOX15 polypeptide, wherein the nucleotide sequence comprises a uracil at a position corresponding to position 1,693 according to SEQ ID NO:4, or the complement thereof; or a cDNA molecule having a nucleotide sequence encoding a human ALOX15 polypeptide, wherein the nucleotide sequence comprises a thymine at a position corresponding to position 1,693 according to SEQ ID NO:6, or the complement thereof.

The present disclosure also provides ALOX15 inhibitors for use in the treatment of a respiratory disorder in a human subject having: a genomic nucleic acid molecule having a nucleotide sequence encoding a human ALOX15 polypeptide, wherein the nucleotide sequence comprises a thymine at a position corresponding to position 9,917 according to SEQ ID NO:2, or the complement thereof; an mRNA molecule having a nucleotide sequence encoding a human ALOX15 polypeptide, wherein the nucleotide sequence comprises a uracil at a position corresponding to position 1,693 according to SEQ ID NO:4, or the complement thereof; or a cDNA molecule having a nucleotide sequence encoding a human ALOX15 polypeptide, wherein the nucleotide sequence comprises a thymine at a position corresponding to position 1,693 according to SEQ ID NO:6, or the complement thereof.

BRIEF DESCRIPTION OF THE DRAWINGS

The accompanying figures, which are incorporated in and constitute a part of this specification, illustrate several features of the present disclosure.

FIG. 1 shows a table that indicates that rs34210653 significantly associates with reduced eosinophils in UK Biobank 50K exomes.

FIG. 2 shows a table that indicates that rs34210653 significantly associates with reduced eosinophils in UK Biobank 500K genotyping.

FIG. 3 shows a table that indicates that rs34210653 significantly associates with decreased odds of nasal polyp and allergic rhinitis and associates with doctor diagnosed asthma in UK Biobank 500K genotyping.

FIG. 4 shows a table that indicates that rs34210653 significantly associates with decreased eosinophils in GHS 90K exomes.

FIG. 5 shows a table that indicates that ALOX15 associates with decreased odds of nasal polyp in GHS 90K exomes.

DESCRIPTION

Figure 6:
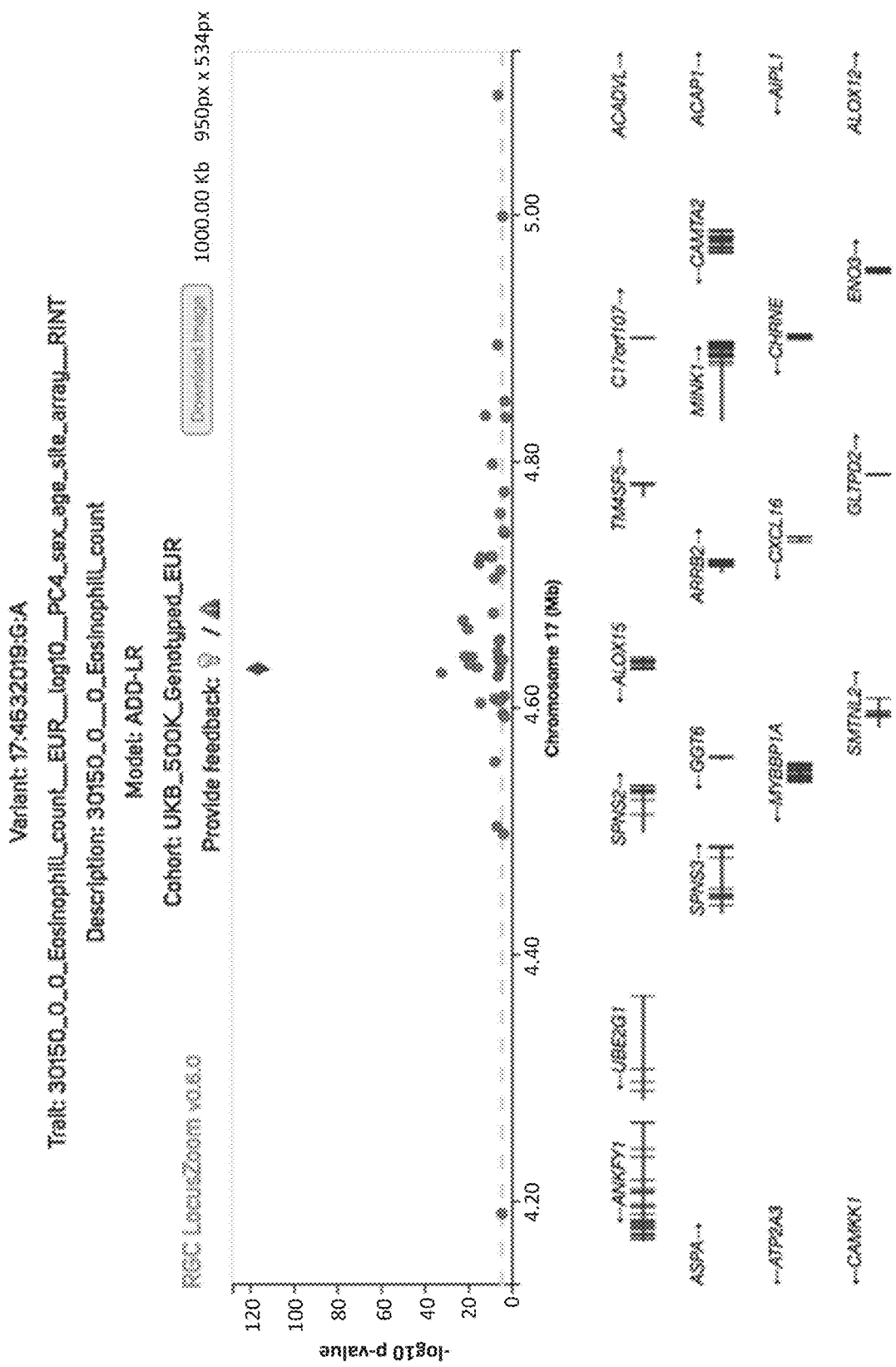
FIG. 6 shows a locus zoom plot for the significant association between rs34210653 and eosinophils in UKB 500K genotyped data.

Various terms relating to aspects of the present disclosure are used throughout the specification and claims. Such terms are to be given their ordinary meaning in the art, unless otherwise indicated. Other specifically defined terms are to be construed in a manner consistent with the definitions provided herein.

Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is in no way intended that an order be inferred, in any respect. This holds for any possible non-expressed basis for interpretation, including matters of logic with respect to arrangement of steps or operational flow, plain meaning derived from grammatical organization or punctuation, or the number or type of aspects described in the specification.

As used herein, the singular forms "a," "an" and "the" include plural referents unless the context clearly dictates otherwise.

As used herein, the term "about" means that the recited numerical value is approximate and small variations would not significantly affect the practice of the disclosed embodiments. Where a numerical value is used, unless indicated otherwise by the context, the term "about" means the numerical value can vary by ±10% and remain within the scope of the disclosed embodiments.

As used herein, the term "comprising" may be replaced with "consisting" or "consisting essentially of" in particular embodiments as desired.

As used herein, the term "isolated", in regard to a nucleic acid molecule or a polypeptide, means that the nucleic acid molecule or polypeptide is in a condition other than its native environment, such as apart from blood and/or animal tissue. In some embodiments, an isolated nucleic acid molecule or polypeptide is substantially free of other nucleic acid molecules or other polypeptides, particularly other nucleic acid molecules or polypeptides of animal origin. In some embodiments, the nucleic acid molecule or polypeptide can be in a highly purified form, i.e., greater than 95% pure or greater than 99% pure. When used in this context, the term "isolated" does not exclude the presence of the same nucleic acid molecule or polypeptide in alternative physical forms, such as dimers or alternatively phosphorylated or derivatized forms.

As used herein, the terms "nucleic acid", "nucleic acid molecule", "nucleic acid sequence", "polynucleotide", or "oligonucleotide" can comprise a polymeric form of nucleotides of any length, can comprise DNA and/or RNA, and can be single-stranded, double-stranded, or multiple stranded. One strand of a nucleic acid also refers to its complement.

As used herein, the terms "subject" and "patient" are used interchangeably. A subject may include any animal, including mammals. Mammals include, but are not limited to, farm animals (such as, for example, horse, cow, pig), companion animals (such as, for example, dog, cat), laboratory animals (such as, for example, mouse, rat, rabbits), and non-human primates. In some embodiments, the subject is a human.

A rare variant in the ALOX15 gene associated with a decreased risk of developing a respiratory disorder, such as nasal polyps, allergic rhinitis, asthma, and AERD, in human subjects has been identified in accordance with the present disclosure. For example, a genetic alteration (rs34210653) that changes the cytosine nucleotide at position 9,917 in the human ALOX15 reference (see, SEQ ID NO:1) to thymine has been observed to indicate that the human having such an alteration may have a decreased risk of developing a respiratory disorder, such as nasal polyps, allergic rhinitis, asthma, and AERD. It is believed that no variants of the ALOX15 gene or protein have any known association with a respiratory disorder, such as nasal polyps, allergic rhinitis, asthma, and AERD. Altogether, the genetic analyses described herein surprisingly indicate that the ALOX15 gene and, in particular, a variant in the ALOX15 gene, associates with a decreased risk of developing a respiratory disorder, such as nasal polyps, allergic rhinitis, asthma, and AERD. Therefore, human subjects that are ALOX15 reference that have an increased risk of developing a respiratory disorder, such as nasal polyps, allergic rhinitis, asthma, and/or AERD, may be treated such that a respiratory disorder is prevented, the symptoms thereof are reduced, and/or development of symptoms is repressed. Accordingly, the present disclosure provides methods of leveraging the identification of such variants in subjects to identify or stratify risk in such subjects of developing a respiratory disorder, such as nasal polyps, allergic rhinitis, asthma, and/or AERD, or to diagnose subjects as having an increased risk of developing a respiratory disorder, such as nasal polyps, allergic rhinitis, asthma, and/or AERD, such that subjects at risk or subjects with active disease may be treated accordingly.

For purposes of the present disclosure, any particular human can be categorized as having one of three ALOX15 genotypes: i) ALOX15 reference; ii) heterozygous for an ALOX15 predicted loss-of-function variant; or iii) homozygous for an ALOX15 predicted loss-of-function variant. A human is ALOX15 reference when the human does not have a copy of an ALOX15 predicted loss-of-function variant nucleic acid molecule. A human is heterozygous for an ALOX15 predicted loss-of-function variant when the human has a single copy of an ALOX15 predicted loss-of-function variant nucleic acid molecule. An ALOX15 predicted loss-of-function variant nucleic acid molecule is any ALOX15 nucleic acid molecule (such as, a genomic nucleic acid molecule, an mRNA molecule, or a cDNA molecule) encoding an ALOX15 polypeptide having a partial loss-of-function, a complete loss-of-function, a predicted partial loss-of-function, or a predicted complete loss-of-function. A human who has an ALOX15 polypeptide having a partial loss-of-function (or predicted partial loss-of-function) is hypomorphic for ALOX15. The ALOX15 predicted loss-of-function variant nucleic acid molecule can be any nucleic acid molecule encoding ALOX15 Thr560Met, Tyr139Cys, Leu651fs, Pro565Leu, Asn658Lys, Gly283Arg, Val474Ala, Gly422Arg, or Leu106fs. In some embodiments, the ALOX15 predicted loss-of-function variant nucleic acid molecule encodes ALOX15 Thr560Met. A human is homozygous for an ALOX15 predicted loss-of-function variant when the human has two copies of an ALOX15 predicted loss-of-function variant nucleic acid molecule.

For human subjects or patients that are genotyped or determined to be ALOX15 reference, such human subjects or patients have an increased risk of developing a respiratory disorder, such as nasal polyps, allergic rhinitis, asthma, and/or AERD. For human subjects or patients that are genotyped or determined to be either ALOX15 reference or heterozygous for an ALOX15 predicted loss-of-function variant, such human subjects or patients can be treated with an ALOX15 inhibitor.

In any of the embodiments described herein, the ALOX15 predicted loss-of-function variant nucleic acid molecule can be any ALOX15 nucleic acid molecule (such as, for example, genomic nucleic acid molecule, mRNA molecule, or cDNA molecule) encoding an ALOX15 polypeptide having a partial loss-of-function, a complete loss-of-function, a predicted partial loss-of-function, or a predicted complete loss-of-function. For example, the ALOX15 predicted loss-of-function variant nucleic acid molecule can be any nucleic acid molecule encoding ALOX15 Thr560Met, Tyr139Cys, Leu651fs, Pro565Leu, Asn658Lys, Gly283Arg, Val474Ala, Gly422Arg, or Leu106fs. In some embodiments, the ALOX15 predicted loss-of-function variant nucleic acid molecule encodes ALOX15 Thr560Met.

In any of the embodiments described herein, the ALOX15 predicted loss-of-function polypeptide can be any ALOX15 polypeptide having a partial loss-of-function, a complete loss-of-function, a predicted partial loss-of-function, or a predicted complete loss-of-function. In any of the embodiments described herein, the ALOX15 predicted loss-of-function polypeptide can be any of the ALOX15 polypeptides described herein including, for example, ALOX15 Thr560Met, Tyr139Cys, Leu651fs, Pro565Leu, Asn658Lys, Gly283Arg, Val474Ala, Gly422Arg, or Leu106fs. In some embodiments, the ALOX15 predicted loss-of-function polypeptide is ALOX15 Thr560Met.

In any of the embodiments described herein, the respiratory disorder is a nasal polyp, allergic rhinitis, asthma, and/or AERD. In any of the embodiments described herein, the respiratory disorder is a nasal polyp. In any of the embodiments described herein, the respiratory disorder is allergic rhinitis. In any of the embodiments described herein, the respiratory disorder is asthma. In any of the embodiments described herein, the respiratory disorder is AERD.

The present disclosure provides methods of treating a patient having a respiratory disorder, the methods comprising administering an ALOX15 inhibitor to the patient.

The present disclosure also provides methods of treating a patient having a nasal polyp, the methods comprising administering an ALOX15 Inhibitor to the patient.

The present disclosure also provides methods of treating a patient having allergic rhinitis, the methods comprising administering an ALOX15 inhibitor to the patient. In some embodiments, the allergic rhinitis is high-eosinophil allergic rhinitis.

The present disclosure also provides methods of treating a patient having asthma, the methods comprising administering an ALOX15 inhibitor to the patient. In some embodiments, the asthma is allergic asthma, moderate-to-severe asthma, oral corticosteroid dependent asthma, eosinophilic asthma, or high-eosinophil eosinophilic asthma. In some embodiments, the asthma is allergic asthma. In some embodiments, the asthma is moderate-to-severe asthma. In some embodiments, the asthma is oral corticosteroid dependent asthma. In some embodiments, the asthma is eosinophilic asthma. In some embodiments, the asthma is high-eosinophil eosinophilic asthma. In some embodiments, the asthma is eosinophilic asthma-Chronic Obstructive Pulmonary Disease overlap syndrome (ACOS). In some embodiments, the ACOS is high-eosinophil eosinophilic ACOS.

The present disclosure also provides methods of treating a patient having AERD, the methods comprising administering an ALOX15 inhibitor to the patient.

The present disclosure also provides methods of treating a patient having atopy, the methods comprising administering an ALOX1S inhibitor to the patient. In some embodiments, the atopy is allergic rhinitis, asthma, and/or atopic dermatitis.

In some embodiments, the respiratory disorder is chronic obstructive pulmonary disease (COPD), chronic bronchitis, emphysema, allergic pneumonia, and/or an allergic airway disease.

In some embodiments, the ALOX15 inhibitor comprises an antisense molecule. Examples of antisense molecules include, but are not limited to, antisense nucleic acid molecules, small interfering RNAs (siRNAs), and short hairpin RNAs (shRNAs). Such antisense molecules can be designed to target any region of an ALOX15 mRNA. In some embodiments, the antisense RNA, siRNA, or shRNA hybridizes to a sequence within an ALOX15 genomic nucleic acid molecule or mRNA molecule and decreases expression of the ALOX15 polypeptide in a cell in the subject. In some embodiments, the ALOX15 inhibitor comprises an antisense RNA that hybridizes to an ALOX15 genomic nucleic acid molecule or mRNA molecule and decreases expression of the ALOX15 polypeptide in a cell in the subject. In some embodiments, the ALOX15 inhibitor comprises an siRNA that hybridizes to an ALOX15 genomic nucleic acid molecule or mRNA molecule and decreases expression of the ALOX15 polypeptide in a cell in the subject. In some embodiments, the ALOX15 inhibitor comprises an shRNA that hybridizes to an ALOX15 genomic nucleic acid molecule or mRNA molecule and decreases expression of the ALOX15 polypeptide in a cell in the subject. In some embodiments, the shRNA comprises:

a)
(SEQ ID NO: 9)
CCGGGAAACTGGAAGGACGGGTTAACTCGAGTTAACCCGTCCTTCCAGTT
TCTTTTTTG;

b)
(SEQ ID NO: 10)
CCGGGCTATCAAAGACTCTCTAAATCTCGAGATTTAGAGAGT
CTTTGATAGCTTTTTG;

c)
(SEQ ID NO: 11)
CCGGTGGGAAATCATCTATCGGTATCTCGAGATACCGATAGATGATTTCC
CATTTTTG;

d)
(SEQ ID NO: 12)
CCGGCCTGGAAGGAAGATGCCTTATCTCGAGATAAGGCATCTTCCTTCCA
GGTTTTTG;

e)
(SEQ ID NO: 13)
CCGGCCAGTTTCTTAATGGCGCCAACTCGAGTTGGCGCCATTAAGAAACT
GGTTTTTG;

f)
(SEQ ID NO: 14)
CCGGGCCGTCGATACATCCTATCTTCTCGAGAAGATAGGATGTAT
CGACGGCTTTTTG;

g)
(SEQ ID NO: 15)
CCGGTAGATGACTTCAACCGGATTTCTCGAGA
AATCCGGTTGAAGTCATCTATTTTTTG;
or h)
(SEQ ID NO: 16)
CCGGTGGTACTCTTGGGTGCCTAATCTCGAGATTAGGCACCCAAGAGTAC
CATTTTTTG.

In some embodiments, the ALOX15 inhibitor comprises a nuclease agent that induces one or more nicks or double-strand breaks at a recognition sequence(s) or a DNA-binding protein that binds to a recognition sequence within an ALOX15 genomic nucleic acid molecule. The recognition sequence can be located within a coding region of the ALOX15 gene, or within regulatory regions that influence the expression of the gene. A recognition sequence of the DNA-binding protein or nuclease agent can be located in an intron, an exon, a promoter, an enhancer, a regulatory region, or any non-protein coding region. The recognition sequence can include or be proximate to the start codon of the ALOX15 gene. For example, the recognition sequence can be located about 10, about 20, about 30, about 40, about 50, about 100, about 200, about 300, about 400, about 500, or about 1,000 nucleotides from the start codon. As another example, two or more nuclease agents can be used, each targeting a nuclease recognition sequence including or proximate to the start codon. As another example, two nuclease agents can be used, one targeting a nuclease recognition sequence including or proximate to the start codon, and one targeting a nuclease recognition sequence including or proximate to the stop codon, wherein cleavage by the nuclease agents can result in deletion of the coding region between the two nuclease recognition sequences. Any nuclease agent that induces a nick or double-strand break into a desired recognition sequence can be used in the methods and compositions disclosed herein. Any DNA-binding protein that binds to a desired recognition sequence can be used in the methods and compositions disclosed herein.

Suitable nuclease agents and DNA-binding proteins for use herein include, but are not limited to, zinc finger protein or zinc finger nuclease (ZFN) pair, Transcription Activator-Like Effector (TALE) protein or Transcription Activator-Like Effector Nuclease (TALEN), or Clustered Regularly Interspersed Short Palindromic Repeats (CRISPR)/CRISPR-associated (Cas) systems. The length of the recognition sequence can vary, and includes, for example, recognition sequences that are about 30-36 bp for a zinc finger protein or ZFN pair, about 15-18 bp for each ZFN, about 36 bp for a TALE protein or TALEN, and about 20 bp for a CRISPR/Cas guide RNA.

In some embodiments, CRISPR/Cas systems can be used to modify an ALOX15 genomic nucleic acid molecule within a cell. The methods and compositions disclosed herein can employ CRISPR-Cas systems by utilizing CRISPR complexes (comprising a guide RNA (gRNA)

complexed with a Cas protein) for site-directed cleavage of ALOX15 nucleic acid molecules.

Cas proteins generally comprise at least one RNA recognition or binding domain that can interact with gRNAs. Cas proteins can also comprise nuclease domains (such as, for example, DNase or RNase domains), DNA binding domains, helicase domains, protein-protein interaction domains, dimerization domains, and other domains. Suitable Cas proteins include, for example, a wild type Cas9 protein and a wild type Cpf1 protein (such as, for example, FnCpf1). A Cas protein can have full cleavage activity to create a double-strand break in an ALOX15 genomic nucleic acid molecule or it can be a nickase that creates a single-strand break in an ALOX15 genomic nucleic acid molecule. Additional examples of Cas proteins include, but are not limited to, Cas1, Cas1B, Cas2, Cas3, Cas4, Cas5, Cas5e (CasD), Cas6, Cas6e, Cas6f, Cas7, Cas8a1, Cas8a2, Cas8b, Cas8c, Cas9 (Csn1 or Csx12), Cas10, Cas10d, CasF, CasG, CasH, Csy1, Csy2, Csy3, Cse1 (CasA), Cse2 (CasB), Cse3 (CasE), Cse4 (CasC), Csc1, Csc2, Csa5, Csn2, Csm2, Csm3, Csm4, Csm5, Csm6, Cmr1, Cmr3, Cmr4, Cmr5, Cmr6, Csb1, Csb2, Csb3, Csx17, Csx14, Csx10, Csx16, CsaX, Csx3, Csx1, Csx15, Csf1, Csf2, Csf3, Csf4, and Cu1966, and homologs or modified versions thereof. Cas proteins can also be operably linked to heterologous polypeptides as fusion proteins. For example, a Cas protein can be fused to a cleavage domain, an epigenetic modification domain, a transcriptional activation domain, or a transcriptional repressor domain. Cas proteins can be provided in any form. For example, a Cas protein can be provided in the form of a protein, such as a Cas protein complexed with a gRNA. Alternately, a Cas protein can be provided in the form of a nucleic acid molecule encoding the Cas protein, such as an RNA or DNA.

In some embodiments, targeted genetic modifications of ALOX15 genomic nucleic acid molecules can be generated by contacting a cell with a Cas protein and one or more gRNAs that hybridize to one or more gRNA recognition sequences within a target genomic locus in the ALOX15 genomic nucleic acid molecule. For example, a gRNA recognition sequence can be located within a region of SEQ ID NO:1. The gRNA recognition sequence can also include or be proximate to a position corresponding to position 9,917 according to SEQ ID NO:1. For example, the gRNA recognition sequence can be located from about 1000, from about 500, from about 400, from about 300, from about 200, from about 100, from about 50, from about 45, from about 40, from about 35, from about 30, from about 25, from about 20, from about 15, from about 10, or from about 5 nucleotides of a position corresponding to position 9,917 according to SEQ ID NO:1. The gRNA recognition sequence can include or be proximate to the start codon of an ALOX15 genomic nucleic acid molecule or the stop codon of an ALOX15 genomic nucleic acid molecule. For example, the gRNA recognition sequence can be located from about 10, from about 20, from about 30, from about 40, from about 50, from about 100, from about 200, from about 300, from about 400, from about 500, or from about 1,000 nucleotides of the start codon or the stop codon.

The gRNA recognition sequences within a target genomic locus in an ALOX15 genomic nucleic acid molecule are located near a Protospacer Adjacent Motif (PAM) sequence, which is a 2-6 base pair DNA sequence immediately following the DNA sequence targeted by the Cas9 nuclease. The canonical PAM is the sequence 5'-NGG-3' where "N" is any nucleobase followed by two guanine ("G") nucleobases. gRNAs can transport Cas9 to anywhere in the genome for gene editing, but no editing can occur at any site other than one at which Cas9 recognizes PAM. In addition, 5'-NGA-3' can be a highly efficient non-canonical PAM for human cells. Generally, the PAM is about 2-6 nucleotides downstream of the DNA sequence targeted by the gRNA. The PAM can flank the gRNA recognition sequence. In some embodiments, the gRNA recognition sequence can be flanked on the 3' end by the PAM. In some embodiments, the gRNA recognition sequence can be flanked on the 5' end by the PAM. For example, the cleavage site of Cas proteins can be about 1 to about 10, about 2 to about 5 base pairs, or three base pairs upstream or downstream of the PAM sequence. In some embodiments (such as when Cas9 from *S. pyogenes* or a closely related Cas9 is used), the PAM sequence of the non-complementary strand can be 5'-NGG-3', where N is any DNA nucleotide and is immediately 3' of the gRNA recognition sequence of the non-complementary strand of the target DNA. As such, the PAM sequence of the complementary strand would be 5'-CCN-3', where N is any DNA nucleotide and is immediately 5' of the gRNA recognition sequence of the complementary strand of the target DNA.

A gRNA is an RNA molecule that binds to a Cas protein and targets the Cas protein to a specific location within an ALOX15 genomic nucleic acid molecule. An exemplary gRNA is a gRNA effective to direct a Cas enzyme to bind to or cleave an ALOX15 genomic nucleic acid molecule, wherein the gRNA comprises a DNA-targeting segment that hybridizes to a gRNA recognition sequence within the ALOX15 genomic nucleic acid molecule that includes or is proximate to a position corresponding to position 9,917. For example, a gRNA can be selected such that it hybridizes to a gRNA recognition sequence that is located from about 5, from about 10, from about 15, from about 20, from about 25, from about 30, from about 35, from about 40, from about 45, from about 50, from about 100, from about 200, from about 300, from about 400, from about 500, or from about 1,000 nucleotides of a position corresponding to position 9,917 according to SEQ ID NO:1. Other exemplary gRNAs comprise a DNA-targeting segment that hybridizes to a gRNA recognition sequence present within an ALOX15 genomic nucleic acid molecule that includes or is proximate to the start codon or the stop codon. For example, a gRNA can be selected such that it hybridizes to a gRNA recognition sequence that is located from about 5, from about 10, from about 15, from about 20, from about 25, from about 30, from about 35, from about 40, from about 45, from about 50, from about 100, from about 200, from about 300, from about 400, from about 500, or from about 1,000 nucleotides of the start codon or located from about 5, from about 10, from about 15, from about 20, from about 25, from about 30, from about 35, from about 40, from about 45, from about 50, from about 100, from about 200, from about 300, from about 400, from about 500, or from about 1,000 nucleotides of the stop codon. Suitable gRNAs can comprise from about 17 to about 25 nucleotides, from about 17 to about 23 nucleotides, from about 18 to about 22 nucleotides, or from about 19 to about 21 nucleotides. In some embodiments, the gRNAs can comprise 20 nucleotides.

Examples of suitable gRNA recognition sequences located within the human ALOX15 reference gene are set forth in Table 1 as SEQ ID NOS:19-43.

TABLE 1

Guide RNA Recognition Sequences Near ALOX15 Variation(s)

| Strand | Guide RNA Recognition Sequence | SEQ ID NO: |
|---|---|---|
| − | TACCAAGCACGCGAGCCCGTGG | 19 |
| + | GACCACGGGCTCGCGTGCTTGG | 20 |
| + | ACGGGCTCGCGTGCTTGGTAGG | 21 |
| − | GCATCCTTGGTGGTTGGCGGGG | 22 |
| − | CGGGGGCAGCCGCATCGTGCAGG | 23 |
| + | TTAGCTGGACTGGTACTCTTGGG | 24 |
| − | GGGGGCAGCCGCATCGTGCAGGG | 25 |
| + | CTTAGCTGGACTGGTACTCTTGG | 26 |
| − | TGCATCCTTGGTGGTTGGCGGGG | 27 |
| − | CAAGAGTACCAGTCCAGCTAAGG | 28 |
| + | GATGTCCATCACTTGGCAGCTGG | 29 |
| − | GTACCAGTCCAGCTAAGGAAGGG | 30 |
| − | TTGCATCCTTGGTGGTTGGCGGG | 31 |
| + | CTGTGTGCAGGTGGACCACGGGG | 32 |
| + | TCTGTGTGCAGGTGGACCACGGG | 33 |
| + | TGCTTGGTAGGCACTGACTCTGG | 34 |
| − | AGTACCAGTCCAGCTAAGGAAGG | 35 |
| + | CTGCCCTTCCTTAGCTGGACTGG | 36 |
| + | GACACTGCCCAACTTCCACCAGG | 37 |
| − | AGAGAAGCCTGGTGGAAGTTGGG | 38 |
| + | GATCCCTGCCCTTCCTTAGCTGG | 39 |
| + | GTCTGTGTGCAGGTGGACCACG | 40 |
| − | CAGTCCAGCTAAGGAAGGGCAGG | 41 |
| − | GCTGCCAAGTGATGGACATCTGG | 42 |
| − | TCTGCCCAGCTGCCAAGTGATGG | 43 |

The Cas protein and the gRNA form a complex, and the Cas protein cleaves the target ALOX15 genomic nucleic acid molecule. The Cas protein can cleave the nucleic acid molecule at a site within or outside of the nucleic acid sequence present in the target ALOX15 genomic nucleic acid molecule to which the DNA-targeting segment of a gRNA will bind. For example, formation of a CRISPR complex (comprising a gRNA hybridized to a gRNA recognition sequence and complexed with a Cas protein) can result in cleavage of one or both strands in or near (such as, for example, within 1, 2, 3, 4, 5, 6, 7, 8, 9, 10, 20, 50, or more base pairs from) the nucleic acid sequence present in the ALOX15 genomic nucleic acid molecule to which a DNA-targeting segment of a gRNA will bind.

Such methods can result, for example, in an ALOX15 genomic nucleic acid molecule in which a region of SEQ ID NO:1 is disrupted, the start codon is disrupted, the stop codon is disrupted, or the coding sequence is disrupted or deleted. Optionally, the cell can be further contacted with one or more additional gRNAs that hybridize to additional gRNA recognition sequences within the target genomic locus in the ALOX15 genomic nucleic acid molecule. By contacting the cell with one or more additional gRNAs (such as, for example, a second gRNA that hybridizes to a second gRNA recognition sequence), cleavage by the Cas protein can create two or more double-strand breaks or two or more single-strand breaks.

In some embodiments, the ALOX15 inhibitor comprises a small molecule. In some embodiments, the ALOX15 inhibitor is 6,11-dihydro[1]benzothiopyrano[4,3-b]indole (PD146176), 2-bromophenol, 2,4-dibromophenol, 2-(1-thienyl)ethyl-3,4-dihydroxybenzylidenecyanoacetate (TEDC), 4,4'-(2,3-dimethyl-1,4-butanediyl)bis-1,2-benzenediol (nordihydroguaiaretic acid), or cinnamyl-3,4-dihydroxy-a-cyanocinnamate (CDC). In some embodiments, the ALOX15 inhibitor is 2-bromophenol, 2,4-dibromophenol, 2-(1-thienyl)ethyl-3,4-dihydroxybenzylidenecyanoacetate (TEDC), or 4,4'-(2,3-dimethyl-1,4-butanediyl)bis-1,2-benzenediol (nordihydroguaiaretic acid).

In some embodiments, the methods of treatment further comprise detecting the presence or absence of an ALOX15 predicted loss-of-function variant nucleic acid molecule encoding a human ALOX15 polypeptide in a biological sample from the patient. As used throughout the present disclosure, a "ALOX15 predicted loss-of-function variant nucleic acid molecule" is any ALOX15 nucleic acid molecule (such as, for example, genomic nucleic acid molecule, mRNA molecule, or cDNA molecule) encoding an ALOX15 polypeptide having a partial loss-of-function, a complete loss-of-function, a predicted partial loss-of-function, or a predicted complete loss-of-function.

The present disclosure also provides methods of treating a patient with a therapeutic agent that treats or inhibits a respiratory disorder, wherein the patient is suffering from a respiratory disorder. In some embodiments, the methods comprise determining whether the patient has an ALOX15 predicted loss-of-function variant nucleic acid molecule encoding a human ALOX15 polypeptide by obtaining or having obtained a biological sample from the patient, and performing or having performed a genotyping assay on the biological sample to determine if the patient has a genotype comprising the ALOX15 predicted loss-of-function variant nucleic acid molecule. When the patient is ALOX15 reference, the therapeutic agent that treats or inhibits a respiratory disorder is administered or continued to be administered to the patient in a standard dosage amount, and an ALOX15 inhibitor is administered to the patient. When the patient is heterozygous for an ALOX15 predicted loss-of-function variant, the therapeutic agent that treats or inhibits a respiratory disorder is administered or continued to be administered to the patient in an amount that is the same as or lower than a standard dosage amount, and an ALOX15 Inhibitor is administered to the patient. The presence of a genotype having the ALOX15 predicted loss-of-function variant nucleic acid molecule encoding the human ALOX15 polypeptide indicates the patient has a reduced risk of developing a respiratory disorder. In some embodiments, the patient is ALOX15 reference. In some embodiments, the patient is heterozygous for an ALOX15 predicted loss-of-function variant.

For human subjects or patients that are genotyped or determined to be either ALOX15 reference or heterozygous for an ALOX15 predicted loss-of-function variant, such human subjects or patients can be treated with an ALOX15 inhibitor, as described herein.

Detecting the presence or absence of an ALOX15 predicted loss-of-function variant nucleic acid molecule in a biological sample from a patient and/or determining whether a patient has an ALOX15 predicted loss-of-function variant nucleic acid molecule can be carried out by any of the methods described herein. In some embodiments, these methods can be carried out in vitro. In some embodiments, these methods can be carried out in situ. In some embodiments, these methods can be carried out in vivo. In any of these embodiments, the nucleic acid molecule can be present within a cell obtained from the human subject.

In some embodiments, when the patient is ALOX15 reference, the patient is also administered a therapeutic agent that treats or inhibits a respiratory disorder in a standard dosage amount. In some embodiments, when the patient is heterozygous for an ALOX15 predicted loss-of-function variant, the patient is also administered a therapeutic agent that treats or inhibits a respiratory disorder in a dosage amount that is the same as or lower than a standard dosage amount.

In some embodiments, the treatment methods further comprise detecting the presence or absence of an ALOX15 predicted loss-of-function polypeptide in a biological sample from the patient. In some embodiments, when the patient does not have an ALOX15 predicted loss-of-function polypeptide, the patient is also administered a therapeutic agent that treats or inhibits a respiratory disorder in a standard dosage amount. In some embodiments, when the patient has an ALOX15 predicted loss-of-function polypeptide, the patient is also administered a therapeutic agent that treats or inhibits a respiratory disorder in a dosage amount that is the same as or lower than a standard dosage amount.

The present disclosure also provides methods of treating a patient with a therapeutic agent that treats or inhibits a respiratory disorder, wherein the patient is suffering from a respiratory disorder. In some embodiments, the method comprises determining whether the patient has an ALOX15 predicted loss-of-function polypeptide by obtaining or having obtained a biological sample from the patient, and performing or having performed an assay on the biological sample to determine if the patient has an ALOX15 predicted loss-of-function polypeptide. When the patient does not have an ALOX15 predicted loss-of-function polypeptide, the therapeutic agent that treats or inhibits a respiratory disorder is administered or continued to be administered to the patient in a standard dosage amount, and an ALOX15 inhibitor is administered to the patient. When the patient has an ALOX15 predicted loss-of-function polypeptide, the therapeutic agent that treats or inhibits a respiratory disorder is administered or continued to be administered to the patient in an amount that is the same as or lower than a standard dosage amount, and an ALOX15 Inhibitor is administered to the patient. The presence of an ALOX15 predicted loss-of-function polypeptide indicates the patient has a reduced risk of developing a respiratory disorder. In some embodiments, the patient has an ALOX15 predicted loss-of-function polypeptide. In some embodiments, the patient does not have an ALOX15 predicted loss-of-function polypeptide.

Detecting the presence or absence of an ALOX15 predicted loss-of-function polypeptide in a biological sample from a patient and/or determining whether a patient has an ALOX15 predicted loss-of-function polypeptide can be carried out by any of the methods described herein. In some embodiments, these methods can be carried out in vitro. In some embodiments, these methods can be carried out in situ. In some embodiments, these methods can be carried out in vivo. In any of these embodiments, the polypeptide can be present within a cell obtained from the human subject.

Examples of therapeutic agents that treat or inhibit a respiratory disorder include, but are not limited to: steroidal anti-inflammatory agents, non-steroidal anti-inflammatory agents, anti-proliferative agents, anti-macrophage agents, muscle relaxants, narcotic analgesics, non-narcotic analgesics, local anesthetic agents, and miscellaneous agents. An additional example of a therapeutic agent that treats or inhibits the respiratory disorder is an interleukin-4 receptor (IL-4Rα) antagonist such as, for example, DUPIXENT® (dupilumab).

Examples of steroidal anti-inflammatory agents include, but are not limited to, glucocorticoids and corticosteroids such as, for example, 21-acetoxypregnenolone, alclometasone, algestone, amcinonide, beclomethasone, betamethasone, budesonide, chloroprednisone, clobetasol, clobetasone, clocortolone, cloprednol, corticosterone, cortisone, cortivazol, deflazacort, desonide, desoximetasone, dexamethesone, diflorasone, diflucortolone, difluprednate, enoxolone, fluazacort, flucloronide, flumehtesone, flunisolide, fluocinolone acetonide, fluocinonide, fluocortin butyl, fluocortolone, fluorometholone, fluperolone acetate, fluprednidene acetate, fluprednisolone, flurandrenolide, fluticasone, formocortal, halcinonide, halobetasol priopionate, halometasone, halopredone acetate, hydrocortamate, hydrocortisone, loteprednol etabonate, mazipredone, medrysone, meprednisone, methyolprednisolone, mometasone furoate, paramethasone, prednicarbate, prednisolone, prednisolone 25-diethylaminoacetate, prednisone sodium phosphate, prednisone, prednival, prednylidene, rimexolone, tixocortal, triamcinolone, triamcinolone acetonide, triamcinolone benetonide, and triamcinolone hexacetonide.

Examples of non-steroidal anti-inflammatory agents include, but are not limited to, aminoarylcarboxylic acid derivatives such as, for example, enfenamic acid, etofenamate, flufenamic acid, isonixin, meclofenamic acid, mefanamic acid, niflumic acid, talniflumate, terofenamate, and tolfenamic acid; arylacetic acid derivatives such as, for example, acemetacin, alclofenac, amfenac, bufexamac, cinmetacin, clopirac, diclofenac, etodolac, felbinac, fenclofenac, fenclorac, fendozic acid, fentiazac, glucametacin, ibufenac, indomethacin, isofezolac, isoxepac, lonazolac, metlazinic acid, oxametacine, proglumetacin, sulindac, tiaramide, tolmetin, and zomepirac; arylbutyric acid derivatives such as, for example, bumadizon, butibufen, fenbufen, and xenbucin; arylcarboxylic acids such as, for example, clidanac, ketorolac, and tinoridine; arylpropionic acid derivatives such as, for example, alminoprofen, benoxaprofen, bucloxic acid, carprofen, fenoprofen, flunoxaprofen, flurbiprofen, ibuprofen, ibuproxam, indoprofen, ketoprofen, loxoprofen, miroprofen, naproxen, oxaprozin, piketoprofen, pirprofen, pranoprofen, protizinic acid, suprofen, and tiaprofenic acid; pyrazoles such as, for example, difenamizole and epirizole; pyrazolones such as, for example, apazone, benzpiperylon, feprazone, mofebutazone, morazone, oxyphenbutazone, phenybutazone, pipebuzone, propyphenazone, ramifenazone, suxibuzone, and thiazolinobutazone; salicylic acid and its derivatives such as, for example, acetaminosalol, aspirin, benorylate, bromosaligenin, calcium acetylsalicylate, diflunisal, etersalate, fendosal, gentisic acid, glycol salicylate, imidazole salicylate, lysine acetylsalicylate, mesalamine, morpholine salicylate, 1-naphthyl salicylate, olsalazine, parsalmide, phenyl acetylsalicylate, phenyl salicylate, salacetamide, salicylamine o-acetic acid, salicylsulfuric acid, salsalate, and sulfasalazine; thiazinecarboxamides such as, for example, droxicam, isoxicam, piroxicam, and tenoxicam; and other agents such as, for example, ε-acetamidocaproic acid, s-adenosylmethionine, 3-amino-4- hydroxybutyric acid, amixetrine, bendazac, benzydamine, bucolome, difenpiramide, ditazol, emorfazone, guaiazulene, nabumetone, nimesulide, orgotein, oxaceprol, paranyline, perisoxal, pifoxime, proquazone, proxazole, and tenidap.

Examples of anti-proliferative agents include, but are not limited to, anthracyclines, alkyl sulfonates, agents affecting microtubule dynamics, agents affecting various growth factors including IGF pathway agents such as somatostatin analogs, angiotensin converting enzyme inhibitors, antimetabolites (e.g., purine analogs), cytotoxic agents, cytostatic agents, cell proliferation affectors, caspase activators, proteasome inhibitors, angiogenesis inhibitors, ethylenimines, intercalating agents, metal coordination complexes, nitrogen mustards, nitrosoureas, nucleic acid damaging agents such as alkylating agents, purine analogs, pyrimidine analogs, inhibitors of pyrimidine biosynthesis, vinca alkaloids. Additional examples include, but are not limited to, adriamycin, alitretinoin (9-cis-retinoic acid), amifostine, anglopeptin, anglostatin, arabinosyl 5-azacytosine, arabinosyl cytosine, 5-aza-2'-deoxycytidine, 6-azacytidine, 6-azauridine, azaribine, bexarotene (4-[1-(5,6,7,8-tetrahydro-3,5,5,8,8-pentamethyl-2-naphthalenyl)ethenyl]benzoic acid), bleomycin, BCNU, CCNU, captopril, capecitabine (5'-deoxy-5-fluorocytidine), chlorambucil, coichicine, cilazapril, cisplatin, cladribine (a chlorinated purine nucleoside analog), cytarabine, cyclocytidine, cyclophosphamide, daunorubicin, 3-deazauridine, 2'-deoxy-5-fluorouridine, 5'-deoxy-5-fluorouridine, docetaxel, doxorubicin, endostatin, epirubicin, epothilone, estramustine, etoposide, exemestane, flutamide, fludarabine, fludarabin phosphate, fluorocytosine, 5-fluorouracil, 5-fluorouridine, 5-fluoro-2'-deoxyuridine, gemcitabine, hydroxyurea, darubicin, irinotecan, LHRH analogs, lisinopril, melphalan, methotrexate, 6-mercaptopurine, mitoxantrone, ocreotide, paclitaxel, pentostatin, N-phosphonoacetyl-L-aspartic acid, prednimustine, pyrazofurin, squalamine, streptozocin, tamoxifen, temozolomide, teniposide, 6-thioguanine, tomudex, thiotepa, topotecan, 5-trifluoromethyl-2'-deoxyuridine, valrubicin, vincristine, vinblastine, and vinarelbine.

Examples of anti-macrophage agents include, but are not limited to, bisphosphonates and chlodronate compounds such as, for example, dichloromethylene diphosphonate (CL2MDP).

Examples of muscle relaxants include, but are not limited to, anticholinergics (for example, adiphenine, alverine, ambutonomium, aminopentamide, amixetrine, amprotropine phosphate, anisotropine methylbromide, apoatropine, atropine, atropine n-oxide, benactyzine, benapryzine, benzetimide, benzilonium, benztropine mesylate, bevonium methyl sulfate, biperiden, butropium, n-butylscopolammonium bromide, buzepide, camylofine, caramiphen, chlorbenzoxamine, chlorphenoxamine, cimetropium, clidinium, cyctodrine, cyclonium, cycrimine, deptropine, dexetimide, dibutoline sulfate, dicyclomine, diethazine, difemerine, dihexyverine, diphemanil methylsulfate, n-(1,2-diphenylethyl)nicotinamide, dipiproverine, diponium, emepronium, endobenzyline, ethopropazine, ethybenztropine, ethylbenzhydramine, etomidoline, eucatropine, fenpiverinium, fentonium, flutropium, glycopyrrolate, heteronium, hexocyclium methyl sulfate, homatropine, hyoscyamine, ipratropium, isopropamide, levomepate, mecloxamine, mepenzolate, metcaraphen, methantheline, methixene, methscopolamine, octamylamine, oxybutyntn, oxyphencyclimine, oxyphenonium, pentapiperide, penthienate, phencarbamide, phenglutarimide, pipenzolate, piperidolate, piperilate, poldine methysulfate, pridinol, prifinium, procyclidine, propantheline, propenzolate, propiverine, propyromazine, scopolamine, scopolamine n-oxide, stramonium, sultroponium, thiphenamil, tiemonium, timepidium, tiquizium, tridihexethyl iodide, trihexyphenidyl hydrochloride, trimebutine, tropacine, tropenzile, tropicamide, trospium, valethamate, vamicamide, and xenytropium); alcuronium, atracurium, baciofen, benzodiazepines (for example, clozapine or diazepam), botulinum toxin (BOTOX), 4-amino-3-(4-chlorophenyl)-butanoic acid, carbolonium, carisoprodol, chlorphenesin, chlorzoxazone, cyclobenzaprine, cyclandelate, dantrolene, decamethonium bromide, diazepam hydralazine, fazadinium, gallamine, guaifenesin, hexafluorenium, isoxsuprine, meladrazine, mephensin, metaxalone, methocarbamol nylidrin, metocurine iodide, orphenadrine, pancuronium, papaverine, pridinol, styramate, suxamethonium, suxethonium, thiocolchicoside, tizanidine, suxamethonium, tolperisone, and tubocurarine; brochodilators (ephedrine derivatives such as, for example, albuterol, bambuterol, bitolterol, carbuterol, clenbuterol, clorprenaline, dioxethedrine, ephedrine, epiniphrine, eprozinol, etafedrine, ethylnorepinephrine, fenoterol, hexoprenaline, isoetharine, isoproterenol, mabuterol, metaproterenol, n-methylephedrine, pirbuterol, procaterol, protokylol, reproterol, rimiterol, salmeterol, soterenol, terbutaline, and tulobuterol; quaternary ammonium compounds such as, for example, bevonium methyl sulfate, clutropium bromide, ipratropium bromide; and oxitropium bromide; xanthine derivatives such as, for example, acefylline, acefylline piperazine, ambuphylline, aminophylline, bamifylline, choline theophyllinate, doxofylline, dyphylline, enprofylline, etamiphyllin, etofylline, guaithylline, proxyphylline, theobromine, 1-theobromineacetic acid, and theophylline; and other bronchodilators such as, for example, fenspiride, medibazine, montekulast, methoxyphenanime, tretoquinol, zafirkulast, and cathcholamine analogs such as formoterol); antispasmodics (for example, alibendol, ambucetamide, aminopromazine, apoatropine, bevonium methyl sulfate, bletamiverine, butaverine, butropium bromide, n-butylscopolammonium bromide, caroverine, cimetropium bromide, cinnamedrine, clebopride, coniine hydrobromide, conine hydrochloride, cyclonium iodide, difemerine, diisopromine, dioxaphetyl butyrate, diponium bromide, drofenine, emepronium bromide, ethaverine, fecleminе, fenalamide, fenoverine, fenpiprane, fenpiverinium bromide, fentonlum bromide, flavoxate, flopropione, gluconic acid, guaiactamine, hydramitrazine, hymecromone, leiopyrrole, mebeverine, moxaverine, nafiverine, octamylamine, octaverine, oxybutynin chloride, pentapiperide, phenamacide hydrochloride, phloroglucinol, pinaverium bromide, piperilate, pipoxolan hydrochloride, pramiverin, prifinium bromide, properidine, propivane, propyromazine, prozapine, racefemine, rociverine, spasmolytol, stilonium iodide, sultroponium, tiemonium iodide, tiquizium bromide, tiropramide, trepibutone, tricromyl, trifolium, trimebutine, n,n-1trimethyl-3,3-diphenyl-propylamine, tropenzile, trospium chloride, and xenytropium bromide); and anticholinergics (for example, adiphenine, alverine, ambutonomium, aminopentamide, amixetrine, amprotropine phosphate, anisotropine methylbromide, apoatropine, atropine, atropine n-oxide, benactyzine, benapryzine, benzetimide, benzilonium, benztropine mesylate, bevonium methyl sulfate, biperiden, butropium, n-butylscopolammonium bromide, buzepide, camylofine, caramiphen, chlorbenzoxamine, chlorphenoxamine, cimetropium, clidinium, cyclodrine, cyclonium, cycrimine, deptropine, dexetimide, dibutoline sulfate, dicyclomine, diethazine, difemerine, dihexyverine, diphemanil methylsulfate, n-(1,2-diphenylethyl)nicotinamide, dipiproverine, diponium, emepronium, endobenzyline, ethopropazine, ethybenztropine, ethylbenzhydramine, etomidoline, eucatropine, fenpiverinium, fentonium, flutropium, glycopyrrolate, heteronium, hexocyclium methyl sulfate, homatropine, hyoscyamine, ipratropium, isopropamide, levomepate, mecloxamine, mepenzolate, metcaraphen, methantheline, methixene, methscopolamine, octamylamine, oxybutynin, oxyphencyclimine, oxyphenonium, pentapiperide, penthienate, phencarbamide, phenglutarimide, pipenzolate, piperidolate, piperilate, poldine methysulfate, pridinol, prifinium, procyclidine, propantheline, propenzolate, propiverine, propyromazine, scopolamine, scopolamine n-oxide, stramonium, sultroponium, thiphenamil, tiemonium, timepidium, tiquizium, tridihexethyl iodide, trihexyphenidyl hydrochloride, trimebutine, tropacine, tropenzile, tropicamide, trospium, valethamate, vamicamide, and xenytropium).

Examples of narcotic analgesics include, but are not limited to, alfentanil, allylprodine, alphaprodine, anileridine, benzylmorphine, bezitramide, buprenorphine, butorphanol, clonitazene, codeine, codeine methyl bromide, codeine phosphate, codeine sulfate, desomorphine, dextromoramide, dezocine, diampromide, dihydrocodeine, dihydrocodeinone enol acetate, dihydromorphine, dimenoxadol, dimepheptanol, dimethylthiambutene, dioxaphetyl butyrate, dipipanone, eptazocine, ethoheptazine, ethylmethylthiambutene, ethylmorphine, etonitazene, fentanyl, hydrocodone, hydromorphone, hydroxypethidine, isomethadone, ketobemidone, levorphanol, lofentanil, meperidine, meptazinol, metazocine, methadone hydrochloride, metopon, morphine, myrophine, nalbuphine, narceine, nicomorphine, norlevorphanol, normethadone, normorphine, norpipanone, opium, oxycodone, oxymorphone, papaveretum, pentazocine, phenadoxone, phenazocine, pheoperidine, piminodine, piritramide, proheptazine, promedol, properidine, propiram, propoxyphene, rumifentanil, sufentanil, and tilidine.

Examples of non-narcotic analgesics include, but are not limited to, aceclofenac, acetaminophen, acetaminosalol, acetanilide, acetylsalicylsalicylic acid, alclofenac, alminoprofen, aloxiprin, aluminum bis(acetylsalicylate), aminochlorthenoxazin, 2-amino-4-picoline, aminopropylon, aminopyrine, ammonium salicylate, amtolmetin guacil, antipyrine, antipyrine salicylate, antrafenine, apazone, aspirin, benorylate, benoxaprofen, benzpiperylon, benzydamine, bermoprofen, brofenac, p-bromoacetanilide, 5-bromosalicylic acid acetate, bucetin, bufexamac, bumadizon, butacetin, calcium acetylsalicylate, carbamazepine, carbiphene, carsalam, chloralantipyrine, chlorthenoxazin(e), choline salicylate, cinchophen, ciramadol, clometacin, cropropamide, crotethamide, dexoxadrol, difenamizole, diflunisal, dihydroxyaluminum acetyisalicylate, dipyrocetyl, dipyrone, emorfazone, enfenamic acid, epirizole, etersalate, ethenzamide, ethoxazene, etodolac, felbinac, fenoprofen, floctafenine, flufenamic acid, fluoresone, flupirtine, fluproquazone, flurbiprofen, fosfosal, gentisic acid, glafenine, ibufenac, imidazole salicylate, indomethacin, indoprofen, isofezolac, isoladol, isonixin, ketoprofen, ketorolac, p-lactophenetide, lefetamine, loxoprofen, lysine acetylsalicylate, magnesium acetylsalicylate, methotrimeprazine, metofoline, miroprofen, morazone, morpholine salicylate, naproxen, nefopam, nifenazone, 5'nitro-2'propoxyacetanilide, parsalmide, perisoxal, phenacetin, phenazopyridine hydrochloride, phenocoll, phenopyrazone, phenyl acetylsalicylate, phenyl salicylate, phenyramidol, pipebuzone, piperylone, prodilidine, propacetamol, propyphenazone, proxazole, quinine salicylate, ramifenazone, rimazolium metilsulfate, salacetamide, salicin, salicylamide, salicylamide o-acetic acid, salicyisuifuric acid, salsalte, salverine, simetride, sodium salicylate, sulfamipyrine, suprofen, tainflumate, tenoxicam, terofenamate, tetradrine, tinoridine, tolfenamic acid, tolpronine, tramadol, viminol, xenbucin, and zomepirac.

Examples of local anesthetic agents include, but are not limited to, amucaine, amolanone, amylocaine hydrochloride, benoxinate, benzocaine, betoxycaine, biphenamine, bupivacaine, butacaine, butaben, butanilicaine, butethamine, butoxycaine, carticaine, chloroprocaine hydrochloride, cocaethylene, cocaine, cyclomethycaine, dibucaine hydrochloride, dimethisoquin, dimethocaine, diperadon hydrochloride, dyclonine, ecgonidine, ecgonine, ethyl chloride, beta-eucaine, euprocin, fenalcomine, fomocaine, hexylcaine hydrochloride, hydroxytetracaine, isobutyl p-aminobenzoate, leucinocaine mesylate, levoxadrol, lidocaine, mepivacaine, meprylcaine, metabutoxycaine, methyl chloride, myrtecaine, naepaine, octacaine, orthocaine, oxethazaine, parethoxycaine, phenacaine hydrochloride, phenol, piperocaine, piridocaine, polidocanol, pramoxine, prilocaine, procaine, propanocaine, proparacaine, propipocaine, propoxycaine hydrochloride, pseudococaine, pyrrocaine, ropavacaine, salicyl alcohol, tetracaine hydrochloride, tolycaine, trimecaine, and zolamine.

Examples of miscellaneous agents include, but are not limited to, amlexanox, aminophylline, azelastine, beclometaason dipropionate, cromolyn, dexamethasone, ephedrine, fenoterol, flutropium, hydrocortisone, ibudilast, ipratropium, isoprenaline, ZAJITEN™ (ketotifen), leukotriene modifiers such as montelukast, zafirlukast and zileuton, ZESURAN™ (mequitazine), nedocromil, orciprenaline, oxitomide, oxitropium, pranlukast hydrate, prednisolone, procaterol, repirinast, salbutamol, seratrodast, sodium cromoglicate, suplatast tosylate, terbutaline, terfenadine, theophylline, tiaramide, tranilast, traxanox, trimetoquinol, and tubobuterol.

Examples of therapeutic agents that treats or inhibits the respiratory disorder that are suitable for use in treating nasal polyps include, but are not limited to: periostin antagonists, PP1 antagonists, MET antagonists, PIP agonists, and AZGP1 agonists.

Examples of periostin antagonists include, but are not limited to, polyclonal antibodies against human periostin (BioVendor Laboratory Medicine, Inc, Modrice, Czech Republic, Cat. No.: RD-181045050) and anti-periostin monoclonal antibody (see, Tai et al., Carcinogenesis, 2005, 26, 908-15), and valsartan.

Examples of PP1 antagonists (such as, for example, PP1c antagonists, PPP1R9B antagonists, and PPP1R6 antagonists) include, but are not limited to, polyclonal antibodies against human neurabin 2 (also known as PPP1R9B) (Abcam, Inc, Cambridge, Mass., Cat. No.: AB18561), anti-PPP1R9B antibody (Novus Biological, Inc., Littleton, Co; Cat. No. H00084687-A01), inhibitory peptides specific for PP1 (such as, for example, a peptide having the amino acid sequence of MEPDNSPRKIQFTVPLLEPHLDPEAAEQIRRRRPTPATLVLTSDQSSPEI DEDRIPNSLLKSTLSMSPRQRKKMTRTTPTMKELQTMVEHHL GQQKQGEEPEGATESTGNQESCPPGI PDTGSASRPDTPGTAQKSAESNPKTQEQCGVEPRTEDSSAHMLPLDSQGASLV) (SEQ ID NO:17) and a peptide having the amino acid sequence of MAASTASHRPIKGILKNKTSSTSSRVASAEQPRGSV DEELSKKSQKWDEMNILATYHPADKDYGLMKIDEPSTPYHSMIGDDDDAYSDTETTEAMTPDTLAKKLA AAEGSEPKYRIREQESSGEEDSDLSPEEREKKRQFEMKRKLHYNEGLNIKLARQLISKDLHDDEEDEEM SETADGESMNTEESNQGSTPSDQRQNKSQSS (SEQ ID NO:18)); and dopamineand cyclic AMP-regulated phosphoprotein (DARPP-32) (EMD Calbiochem, Inc., Gibbstown, N.J.; Cat. No. 251755); protein phosphatase inhibitors such as, for example, okadaic acid and Calyculin A.

Examples of MET antagonists include, but are not limited to, polyclonal antibodies against human MET (Santa Cruz Biotechnology, Inc, Santa Cruz, Calif., Cat. No.: SC-10) and anti-MET antibody (Sigma-Aldrich, St. Louis, Mo., Cat. No.: C7115); tyrosine kinase inhibitors such as, for example, (3Z)—N-(3-Chlorophenyl)-3-((3,5-dimethyl-4-((4-methylpiperazin-1-yl)carbonyl)-1H-pyrrol-2-yl)methylene)-N-methyl-2-oxo-2,3-dihydro-1H-indole-5-sulfonamide (SU11274) and 1,3-Dihydro-3-((3,5-dimethyl-1H-pyrrol-2-yl)methylene)-2H-indol-2-one (SU5416).

Examples of PIP agonists include, but are not limited to, PIP protein, recombinant PIP protein (Abnova, Taipei City, Taiwan, Cat. No.: H00005304-P01), and stimulators of PIP expression such as, for example, interleukin-4 and interleukin-13; and tamoxifen.

Examples of AZGP1 agonists include, but are not limited to, AZGP1 protein, recombinant AZGP1 protein (Abnova, Taipei City, Taiwan, Cat. No.: 1100000563-P01); rosiglitazone, dexamethasone, and (RR+SS)-(±)-4-(2-(2-(3-chlorophenyl)-2-hydroxyethyl)amino)propyl)phenoxyacetate (BRL 37344).

Examples of therapeutic agents that treats or inhibits the respiratory disorder that are suitable for use in treating allergic rhinitis include, but are not limited to: corticosteroids, H1 antagonist/antiallergic agents, histamine receptor antagonists, chemical mediator release inhibitors, thromboxane A2 receptor antagonists, thromboxane A2 synthesis inhibitors, leukotriene antagonists, Th2 cytokine inhibitors, TNF alpha antagonists, PDE4 inhibitors, JAK3 Inhibitors, and p38 Kinase Inhibitors.

Examples of corticosteroids include, but are not limited to, beclomethasone esters (KONAZE™, ARUDESHIN™, RHINOCORT™, SARUKOTO™ (17-propionate ester or the 17,21-dipropionate ester), Furunaze™ (fluticasone propionate), budesonide, flunisolide, mometasone esters (for example, furoate ester), triamcinolone acetonide, rofleponide, and ciclesonide.

Examples of H1 antagonist/antiallergic agents (antihistamines) include, but are not limited to, first generation H1 antihistamines such as, for example, piperoxam, ethylenediamine (for example, mepyramine (pyrilamine), antazoline), ethanolamines (for example, diphenhydramine, carbinoxamine, doxylamine, clemastine, and dimenhydrinate), alkylamines (for example, pheniramine, Kurorenamin (chlorpheniramine), dextrose cycloalkyl naphthoylmethyl Na Min, brompheniramine, and triprolidine), piperazines (for example, cyclizine, hydroxyzine, and meclizine), and tricyclics (for example, promethazine, alimemazine (trimeprazine), cyproheptadine, and azatadine); second-generation antihistamines such as, for example, systemic drugs (for example, acrivastine, astemizole, cetirizine, loratadine, mizolastine, and terfenadine), and local drugs (for example, azelastine, levocabastine, and olopatadine (Olopatidine); and third generation antihistamines such as, for example, (levocetirizine, desloratadine (desloratidin) and ALLEGRA® (fexofenadine).

Examples of histamine receptor antagonists include, but are not limited to, ZAJITEN™ (ketotifen), ZESURAN™ (mequitazine), ALLEGRA™ (fexofenadine), EBASUTERU™ (ebastine), TALION™ (bepotastine), ALLELOCK™ (olopatadine), and CLARITIN™ (loratadine).

Examples of chemical mediator release inhibitors include, but are not limited to, INTAL™ (cromoglycate) and RIZABEN™ (tranilast).

Examples of thromboxane A2 receptor antagonists include, but are not limited to, BRONICA™ (seratrodast) and BAINASU™ (ramatroban).

Examples of thromboxane A2 synthesis inhibitors include, but are not limited to, DOMENAN™ (ozagrel).

Examples of leukotriene antagonists include, but are not limited to, SINGULAIR™ and KIPRES™ (montelukast) and ONON™ (pranlukast).

Examples of Th2 cytokine inhibitors include, but are not limited to, IPD™ (suplatast).

Examples of TNF alpha antagonists include, but are not limited to, ENBREL® (etanercept), REMICADE® (infliximab), and HUMIRA® (adalimumab).

Examples of PDE4 inhibitors include, but are not limited to, rolipram, piclamilast, CDP-840, ariflo, pentoxifylline, denbufylline, theophylline, substituted 8-arylquinoline phosphodiesterase-4 inhibitors (see, U.S. Pat. No. 6,740,666), alkyne-aryl phosphodiesterase-4 inhibitors (see, U.S. Pat. No. 6,743,802), 1-aryl-1,8-naphthyridin-4-one phosphodiesterase inhibitors (see, U.S. Pat. Nos. 6,677,351 and 6,541,480), hydroxyindoles (see, U.S. Pat. Nos. RE38,624, 6,613,794 and 6,602,890), phthalazine derivatives (see, U.S. Pat. No. 6,589,951), tricyclic phthalazine derivatives (see, U.S. Pat. No. 6,525,055), benzazine derivatives (see, U.S. Pat. No. 6,358,973), benzamides with tetrahydrofuranyloxy substituents (see, U.S. Pat. No. 6,303,789), diazepinoindolones (see, U.S. Pat. No. 6,239,130), 1-oxo-1-3-substituted phenyl-1,4-dihydro-1,8-naphthyridine-3-carboxamide phosphodiesterase-4 inhibitors (see, U.S. Patent App. Pub. No. 2006/0058316), N-substituted diarylamines (see, U.S. Patent App. Pub. No. 2005-0222207), allyne-aryl phosphodiesterase-4 inhibitors (see, U.S. Patent App. Pub. No. 2005-0070569), and naphthyridine derivatives (see, U.S. Patent App. Pub. No. 2004-0254212).

Examples of JAK3 Inhibitors include, but are not limited to, tacrolimus, CP-690550, WHI-P131, WHIP-97, WHIP-154, AG490, PS-608504, and PNU156804. Additional examples include, but are not limited to, 2-(1H-Benzimidazol-1-yl)-9-[1(R)-(3-pyridyl)ethyl]-8,9-dihydro-7H-purin-8-one; 2-(1H-Benzimidazol-1-yl)-9-[4-oxo-1,2,3,4-tetrahydronaphthalen-1(R)-yl]-8,9-dihydro-7H-purin-8-one; 1-[9-[6-Fluoro-3,4-dihydro-2H-1-benzopyran-4(R)-yl]-8-oxo-8,9-dihydro-7H-purin-2-yl]-1H-benzimidazole-6-carbonitrile; 1-[9-[7-Fluoro-3,4-dihydro-2H-1-benzopyran-4(R)-yl]-8-oxo-8,9-dihydro-7H-purin-2-yl]-1H-benzimidazole-6-carbonitrile; and 2-(1H-Benzimidazol-1-yl)-9-[5,8-difluoro-3,4-dihydro-2H-1-benzopyran-4(R)-yl]-8,9-dihydro-7H-purin-8-one)

Examples of p38 Kinase inhibitors include, but are not limited to, 3(5)-heteroaryl substituted pyrazoles (see, U.S. Pat. No. 5,932,425). Additional p38 kinase inhibitors include, but are not limited to, 1-(5-tert-butyl-2-p-tolyl-2H-pyrazol-3-yl)-3-[4-(2-morpholin-4-yl-ethoxy)naphthalen-1-yl]urea (BIR 796); 58202190; SB203580; VX-745; and VX-702.

Examples of therapeutic agents that treats or inhibits the respiratory disorder that are suitable for use in treating AERD include, but are not limited to: high-dose aspirin therapy, P2Y12 inhibitors, leukotriene receptor antagonists, thromboxane receptor antagonists, and 5-lipoxygenase inhibitors.

Examples of P2Y12 inhibitors include, but are not limited to, PLAVIX™ (clopidogrel), cangrelor, ticagrelor, TICLID™ (ticlopidine), EFFIENT™ (prasugrel), and elinogrel (PRT060128 and PRT128).

Examples of leukotriene receptor antagonists include, but are not limited to, SINGULAIR™ (montelukast) and ACCOLATE™ (zafirlukast).

Examples of thromboxane receptor antagonists include, but are not limited to, HEPATOREN™ (iretroban), SERATRODAST™ (AA-2414), S18886 (terutroban), PTA2, 13-APA, GR-32191, BM-13177 (sulotroban), SQ-29,548, SQ-28,668, ONO-3708, Bay U3405, EP-045, BMS-180, 291, S-145, I-BOP ([1S-[1alpha,2alpha(Z),3beta(1E,3S*), 4alpha]]-7-[3-[3-hydroxy-4-(4-iodophenoxy)-1-butenyl]-7-oxabi-cyclo[2.2.1]hept-2-yl]5-heptenoic acid), U46619 (9,11-dideoxy-9alpha11alpha-methanoepoxy-prosta-5Z, 13E-dien-1-oic acid), PBT-3 [10(S)-hydroxy-11,12-cyclopropyl-eicosa-5Z,8Z,14Z-trienoic acid methyl ester], hepoxilin cyclopropane, BM-531 (N-tert-butyl-N'-[(2-cyclohexylamino-5-nitrobenzene)sulfonyl]urea), EV-077, L0655, and ICI 192,605.

Examples of 5-lipoxygenase inhibitors include, but are not limited to, ASTELIN™ and ASTELPRO™ (azelastine), diethylcarbamazine, nordihydroguaiaretic acid, and ZYFLO™ (zileuton).

In some embodiments, the dose of the therapeutic agents that treat or inhibit a respiratory disorder can be reduced by about 10%, by about 20%, by about 30%, by about 40%, by about 50%, by about 60%, by about 70%, by about 80%, or by about 90% for patients or human subjects that are heterozygous for an ALOX15 predicted loss-of-function variant (i.e., a lower than the standard dosage amount) compared to patients or human subjects that are ALOX15 reference (who may receive a standard dosage amount). In some embodiments, the dose of the therapeutic agents that treat or inhibit a respiratory disorder can be reduced by about 10%, by about 20%, by about 30%, by about 40%, or by about 50%. In addition, the dose of therapeutic agents that treat or inhibit a respiratory disorder in patients or human subjects that are heterozygous for an ALOX15 predicted loss-of-function variant can be administered less frequently compared to patients or human subjects that are ALOX15 reference.

Administration of the therapeutic agents that treat or inhibit a respiratory disorder and/or ALOX15 inhibitors can be repeated, for example, after one day, two days, three days, five days, one week, two weeks, three weeks, one month, five weeks, six weeks, seven weeks, eight weeks, two months, or three months. The repeated administration can be at the same dose or at a different dose. The administration can be repeated once, twice, three times, four times, five times, six times, seven times, eight times, nine times, ten times, or more. For example, according to certain dosage regimens a patient can receive therapy for a prolonged period of time such as, for example, 6 months, 1 year, or more.

Administration of the therapeutic agents that treat or inhibit a respiratory disorder and/or ALOX15 inhibitors can occur by any suitable route including, but not limited to, parenteral, intravenous, oral, subcutaneous, intra-arterial, intracranial, intrathecal, intraperitoneal, topical, intranasal, or intramuscular. Pharmaceutical compositions for administration are desirably sterile and substantially isotonic and manufactured under GMP conditions. Pharmaceutical compositions can be provided in unit dosage form (i.e., the dosage for a single administration). Pharmaceutical compositions can be formulated using one or more physiologically and pharmaceutically acceptable carriers, diluents, excipients or auxiliaries. The formulation depends on the route of administration chosen. The term "pharmaceutically acceptable" means that the carrier, diluent, excipient, or auxiliary is compatible with the other ingredients of the formulation and not substantially deleterious to the recipient thereof.

The terms "treat", "treating", and "treatment" and "prevent", "preventing", and "prevention" as used herein, refer to eliciting the desired biological response, such as a therapeutic and prophylactic effect, respectively. In some embodiments, a therapeutic effect comprises one or more of a decrease/reduction in a respiratory disorder, a decrease/reduction in the severity of a respiratory disorder (such as, for example, a reduction or inhibition of development of a respiratory disorder), a decrease/reduction in symptoms and respiratory disorder-related effects, delaying the onset of symptoms and respiratory disorder-related effects, reducing the severity of symptoms of respiratory disorder-related effects, reducing the severity of an acute episode, reducing the number of symptoms and respiratory disorder-related effects, reducing the latency of symptoms and respiratory disorder-related effects, an amelioration of symptoms and respiratory disorder-related effects, reducing secondary symptoms, reducing secondary infections, preventing relapse to a respiratory disorder, decreasing the number or frequency of relapse episodes, increasing latency between symptomatic episodes, increasing time to sustained progression, expediting remission, inducing remission, augmenting remission, speeding recovery, or increasing efficacy of or decreasing resistance to alternative therapeutics, and/or an increased survival time of the affected host animal, following administration of the agent or composition comprising the agent. A prophylactic effect may comprise a complete or partial avoidance/inhibition or a delay of respiratory disorder development/progression (such as, for example, a complete or partial avoidance/inhibition or a delay), and an increased survival time of the affected host animal, following administration of a therapeutic protocol. Treatment of a respiratory disorder encompasses the treatment of patients already diagnosed as having any form of a respiratory disorder at any clinical stage or manifestation, the delay of the onset or evolution or aggravation or deterioration of the symptoms or signs of a respiratory disorder, and/or preventing and/or reducing the severity of a respiratory disorder.

The present disclosure also provides methods of identifying a human subject having an increased risk for developing a respiratory disorder. In some embodiments, the method comprises determining or having determined in a biological sample obtained from the subject the presence or absence of an ALOX15 predicted loss-of-function variant nucleic acid molecule (such as a genomic nucleic acid molecule, mRNA molecule, and/or cDNA molecule) encoding a human ALOX15 polypeptide. When the human subject lacks an ALOX15 predicted loss-of-function variant nucleic acid molecule (i.e., the human subject is genotypically categorized as an ALOX15 reference), then the human subject has an increased risk for developing a respiratory disorder. When the human subject has an ALOX15 predicted loss-of-function variant nucleic acid molecule (i.e., the human subject is heterozygous for an ALOX15 predicted loss-of-function variant or homozygous for an ALOX15 predicted loss-of-function variant), then the human subject has a decreased risk for developing a respiratory disorder.

Having a single copy of an ALOX15 predicted loss-of-function variant nucleic acid molecule is more protective of a human subject from developing a respiratory disorder than having no copies of an ALOX15 predicted loss-of-function variant nucleic acid molecule. Without intending to be limited to any particular theory or mechanism of action, it is believed that a single copy of an ALOX15 predicted loss-of-function variant nucleic acid molecule (i.e., heterozygous for an ALOX15 predicted loss-of-function variant) is protective of a human subject from developing a respiratory disorder, and it is also believed that having two copies of an ALOX15 predicted loss-of-function variant nucleic acid molecule (i.e., homozygous for an ALOX15 predicted loss-of-function variant) may be more protective of a human subject from developing a respiratory disorder, relative to a human subject with a single copy. Thus, in some embodiments, a single copy of an ALOX15 predicted loss-of-function variant nucleic acid molecule may not be completely protective, but instead, may be partially or incompletely protective of a human subject from developing a respiratory disorder. While not desiring to be bound by any particular theory, there may be additional factors or molecules involved in the development of a respiratory disorder that are still present in a human subject having a single copy of an ALOX15 predicted loss-of-function variant nucleic acid molecule, thus resulting in less than complete protection from the development of a respiratory disorder.

Determining whether a human subject has an ALOX15 predicted loss-of-function variant nucleic acid molecule in a biological sample from a patient and/or determining whether a patient has an ALOX15 predicted loss-of-function variant nucleic acid molecule can be carried out by any of the methods described herein. In some embodiments, these methods can be carried out in vitro. In some embodiments, these methods can be carried out in situ. In some embodiments, these methods can be carried out in vivo. In any of these embodiments, the nucleic acid molecule can be present within a cell obtained from the human subject.

In some embodiments, when a human subject is identified as having an increased risk of developing a respiratory disorder, the human subject is further treated with a therapeutic agent that treats or inhibits a respiratory disorder and/or an ALOX15 inhibitor, as described herein. For example, when the human subject is ALOX15 reference, and therefore has an increased risk for developing a respiratory disorder, the human subject is administered an ALOX15 inhibitor. In some embodiments, such a patient is also administered a therapeutic agent that treats or inhibits a respiratory disorder. In some embodiments, when the patient is heterozygous for an ALOX15 predicted loss-of-function variant, the patient is administered the therapeutic agent that treats or inhibits a respiratory disorder in a dosage amount that is the same as or lower than a standard dosage amount, and is also administered an ALOX15 inhibitor. In some embodiments, the patient is ALOX15 reference. In some embodiments, the patient is heterozygous for an ALOX15 predicted loss-of-function variant.

The present disclosure also provides methods of detecting the presence or absence of an ALOX15 predicted loss-of-function variant genomic nucleic acid molecule in a biological sample from a human subject, and/or an ALOX15 predicted loss-of-function variant mRNA molecule in a biological sample from a human subject, and/or an ALOX15 predicted loss-of-function variant cDNA molecule produced from an mRNA molecule in a biological sample from a human subject. It is understood that gene sequences within a population and mRNA molecules encoded by such genes can vary due to polymorphisms such as single-nucleotide polymorphisms. The sequences provided herein for the ALOX15 variant genomic nucleic acid molecule, ALOX15 variant mRNA molecule, and ALOX15 variant cDNA molecule are only exemplary sequences. Other sequences for the ALOX15 variant genomic nucleic acid molecule, variant mRNA molecule, and variant cDNA molecule are also possible.

The biological sample can be derived from any cell, tissue, or biological fluid from the subject. The sample may comprise any clinically relevant tissue, such as a bone marrow sample, a tumor biopsy, a fine needle aspirate, or a sample of bodily fluid, such as blood, gingival crevicular fluid, plasma, serum, lymph, ascitic fluid, cystic fluid, or urine. In some cases, the sample comprises a buccal swab. The sample used in the methods disclosed herein will vary based on the assay format, nature of the detection method, and the tissues, cells, or extracts that are used as the sample. A biological sample can be processed differently depending on the assay being employed. For example, when detecting any ALOX15 variant nucleic acid molecule, preliminary processing designed to isolate or enrich the sample for the genomic DNA can be employed. A variety of techniques may be used for this purpose. When detecting the level of any ALOX15 variant mRNA, different techniques can be used enrich the biological sample with mRNA. Various methods to detect the presence or level of an mRNA or the presence of a particular variant genomic DNA locus can be used.

In some embodiments, detecting a human ALOX15 predicted loss-of-function variant nucleic acid molecule in a human subject comprises assaying or genotyping a biological sample obtained from the human subject to determine whether an ALOX15 genomic nucleic acid molecule in the biological sample, and/or an ALOX15 mRNA molecule in the biological sample, and/or an ALOX15 cDNA molecule produced from an mRNA molecule in the biological sample, comprises one or more variations that cause a loss-of-function (partial or complete) or are predicted to cause a loss-of-function (partial or complete).

In some embodiments, the methods of detecting the presence or absence of an ALOX15 predicted loss-of-function variant nucleic acid molecule (such as, for example, a genomic nucleic acid molecule, an mRNA molecule, and/or a cDNA molecule produced from an mRNA molecule) in a human subject, comprise performing an assay on a biological sample obtained from the human subject. The assay determines whether a nucleic acid molecule in the biological sample comprises a particular nucleotide sequence.

In some embodiments, the nucleotide sequence comprises: a thymine at a position corresponding to position 9,917 according to SEQ ID NO:2 (for genomic nucleic acid molecules); a uracil at a position corresponding to position 1,693 according to SEQ ID NO:4 (for mRNA molecules); or a thymine at a position corresponding to position 1,693 according to SEQ ID NO:6 (for cDNA molecules obtained from mRNA molecules). In some embodiments, the nucleotide sequence comprises a thymine at a position corresponding to position 9,917 according to SEQ ID NO:2, or the complement thereof. In some embodiments, the nucleotide sequence comprises a uracil at a position corresponding to position 1,693 according to SEQ ID NO:4, or the complement thereof. In some embodiments, the nucleotide sequence comprises a thymine at a position corresponding to position 1,693 according to SEQ ID NO:6, or the complement thereof.

In some embodiments, the biological sample comprises a cell or cell lysate. Such methods can further comprise, for example, obtaining a biological sample from the subject comprising an ALOX15 genomic nucleic acid molecule or mRNA molecule, and if mRNA, optionally reverse transcribing the mRNA into cDNA. Such assays can comprise, for example determining the identity of these positions of the particular ALOX15 nucleic acid molecule. In some embodiments, the method is an in vitro method.

In some embodiments, the determining step, detecting step, or genotyping assay comprises sequencing at least a portion of the nucleotide sequence of the ALOX15 genomic nucleic acid molecule, the ALOX15 mRNA molecule, or the ALOX15 cDNA molecule in the biological sample, wherein the sequenced portion comprises one or more variations that cause a loss-of-function (partial or complete) or are predicted to cause a loss-of-function (partial or complete).

In some embodiments, the determining step, detecting step, or genotyping assay comprises sequencing at least a portion of: the nucleotide sequence of the ALOX15 genomic nucleic acid molecule in the biological sample, wherein the sequenced portion comprises a position corresponding to position 9,917 according to SEQ ID NO:2, or the complement thereof; the nucleotide sequence of the ALOX15 mRNA molecule in the biological sample, wherein the sequenced portion comprises a position corresponding to position 1,693 according to SEQ ID NO:4, or the complement thereof; and/or the nucleotide sequence of the ALOX15 cDNA molecule produced from the mRNA in the biological sample, wherein the sequenced portion comprises a position corresponding to position 1,693 according to SEQ ID NO:6, or the complement thereof. When the sequenced portion of the ALOX15 nucleic acid molecule in the biological sample comprises a thymine at a position corresponding to position 9,917 according to SEQ ID NO:2, a uracil at a position corresponding to position 1,693 according to SEQ ID NO:4, or a thymine at a position corresponding to position 1,693 according to SEQ ID NO:6, then the ALOX15 nucleic acid molecule in the biological sample is an ALOX15 predicted loss-of-function variant nucleic acid molecule.

In some embodiments, the determining step, detecting step, or genotyping assay comprises sequencing at least a portion of the nucleotide sequence of the ALOX15 genomic nucleic acid molecule in the biological sample, wherein the sequenced portion comprises a position corresponding to position 9,917 according to SEQ ID NO:2, or the complement thereof. When the sequenced portion of the ALOX5S nucleic acid molecule in the biological sample comprises a thymine at a position corresponding to position 9,917 according to SEQ ID NO:2, then the ALOX15 nucleic acid molecule in the biological sample is an ALOX15 predicted loss-of-function variant nucleic acid molecule.

In some embodiments, the determining step, detecting step, or genotyping assay comprises sequencing at least a portion of the nucleotide sequence of the ALOX15 mRNA molecule in the biological sample, wherein the sequenced portion comprises a position corresponding to position 1,693 according to SEQ ID NO:4, or the complement thereof. When the sequenced portion of the ALOX15 nucleic acid molecule in the biological sample comprises a uracil at a position corresponding to position 1,693 according to SEQ ID NO:4, then the ALOX15 nucleic acid molecule in the biological sample is an ALOX15 predicted loss-of-function variant nucleic acid molecule.

In some embodiments, the determining step, detecting step, or genotyping assay comprises sequencing at least a portion of the nucleotide sequence of the ALOX15 cDNA molecule in the biological sample, wherein the sequenced portion comprises a position corresponding to position 1,693 according to SEQ ID NO:6, or the complement thereof. When the sequenced portion of the ALOX15 nucleic acid molecule in the biological sample comprises a thymine at a position corresponding to position 1,693 according to SEQ ID NO:6, then the ALOX15 nucleic acid molecule in the biological sample is an ALOX15 predicted loss-of-function variant nucleic acid molecule.

In some embodiments, the determining step, detecting step, or genotyping assay comprises: a) contacting the biological sample with a primer hybridizing to a portion of the nucleotide sequence of the ALOX15: genomic nucleic acid molecule that is proximate to a position corresponding to position 9,917 according to SEQ ID NO:2; mRNA molecule that is proximate to a position corresponding to position 1,693 according to SEQ ID NO:4; and/or cDNA molecule that is proximate to a position corresponding to position 1,693 according to SEQ ID NO:6; b) extending the primer at least through the position of the nucleotide sequence of the ALOX15: genomic nucleic acid molecule corresponding to position 9,917 according to SEQ ID NO:2; mRNA molecule corresponding to position 1,693 according to SEQ ID NO:4; and/or cDNA molecule corresponding to position 1,693 according to SEQ ID NO:6; and c) determining whether the extension product of the primer comprises: a thymine at a position corresponding to position 9,917 according to SEQ ID NO:2; a uracil at a position corresponding to position 1,693 according to SEQ ID NO:4; and/or a thymine at a position corresponding to position 1,693 according to SEQ ID NO:6.

In some embodiments, the determining step, detecting step, or genotyping assay comprises: a) contacting the biological sample with a primer hybridizing to a portion of the nucleotide sequence of the ALOX15 genomic nucleic acid molecule that is proximate to a position corresponding to position 9,917 according to SEQ ID NO:2; b) extending the primer at least through the position of the nucleotide sequence of the ALOX15 genomic nucleic acid molecule corresponding to position 9,917 according to SEQ ID NO:2; and c) determining whether the extension product of the primer comprises a thymine at a position corresponding to position 9,917 according to SEQ ID NO:2.

In some embodiments, the determining step, detecting step, or genotyping assay comprises: a) contacting the biological sample with a primer hybridizing to a portion of the nucleotide sequence of the ALOX15 mRNA molecule that is proximate to a position corresponding to position 1,693 according to SEQ ID NO:4; b) extending the primer at least through the position of the nucleotide sequence of the ALOX15 mRNA molecule corresponding to position 1,693 according to SEQ ID NO:4; and c) determining whether the extension product of the primer comprises a uracil at a position corresponding to position 1,693 according to SEQ ID NO:4.

In some embodiments, the determining step, detecting step, or genotyping assay comprises: a) contacting the biological sample with a primer hybridizing to a portion of the nucleotide sequence of the ALOX15 cDNA molecule that is proximate to a position corresponding to position 1,693 according to SEQ ID NO:6; b) extending the primer at least through the position of the nucleotide sequence of the ALOX15S cDNA molecule corresponding to position 1,693 according to SEQ ID NO:6; and c) determining whether the extension product of the primer comprises a thymine at a position corresponding to position 1,693 according to SEQ ID NO:6.

In some embodiments, the assay comprises sequencing the entire nucleic acid molecule. In some embodiments, only an ALOX15 genomic nucleic acid molecule is analyzed. In some embodiments, only an ALOX15 mRNA is analyzed. In some embodiments, only an ALOX15 cDNA obtained from ALOX15 mRNA is analyzed.

In some embodiments, the determining step, detecting step, or genotyping assay comprises: a) amplifying at least a portion of the nucleic acid molecule that encodes the human ALOX15 polypeptide, wherein the amplified portion comprises: i) a thymine at a position corresponding to position 9,917 according to SEQ ID NO:2, or the complement thereof; ii) a uracil at a position corresponding to position 1,693 according to SEQ ID NO:4, or the complement thereof; and/or iii) a thymine at a position corresponding to position 1,693 according to SEQ ID NO:6, or the complement thereof; b) labeling the amplified nucleic acid molecule with a detectable label; c) contacting the labeled nucleic acid molecule with a support comprising an alteration-specific probe, wherein the alteration-specific probe comprises a nucleotide sequence which hybridizes under stringent conditions to the nucleic acid sequence of the amplified nucleic acid molecule comprising: i) a thymine at a position corresponding to position 9,917 according to SEQ ID NO:2, or the complement thereof; ii) a uracil at a position corresponding to position 1,693 according to SEQ ID NO:4, or the complement thereof; and/or iii) a thymine at a position corresponding to position 1,693 according to SEQ ID NO:6, or the complement thereof; and d) detecting the detectable label.

In some embodiments, the determining step, detecting step, or genotyping assay comprises: a) amplifying at least a portion of the nucleic acid molecule that encodes the human ALOX15 polypeptide, wherein the amplified portion comprises a thymine at a position corresponding to position 9,917 according to SEQ ID NO:2, or the complement thereof; b) labeling the amplified nucleic acid molecule with a detectable label; c) contacting the labeled nucleic acid molecule with a support comprising an alteration-specific probe, wherein the alteration-specific probe comprises a nucleotide sequence which hybridizes under stringent conditions to the nucleic acid sequence of the amplified nucleic acid molecule comprising a thymine at a position corresponding to position 9,917 according to SEQ ID NO:2, or the complement thereof; and d) detecting the detectable label.

In some embodiments, the determining step, detecting step, or genotyping assay comprises: a) amplifying at least a portion of the nucleic acid molecule that encodes the human ALOX15 polypeptide, wherein the amplified portion comprises a uracil at a position corresponding to position 1,693 according to SEQ ID NO:4, or the complement thereof; b) labeling the amplified nucleic acid molecule with a detectable label; c) contacting the labeled nucleic acid molecule with a support comprising an alteration-specific probe, wherein the alteration-specific probe comprises a nucleotide sequence which hybridizes under stringent conditions to the nucleic acid sequence of the amplified nucleic acid molecule comprising a uracil at a position corresponding to position 1,693 according to SEQ ID NO:4, or the complement thereof; and d) detecting the detectable label.

In some embodiments, the determining step, detecting step, or genotyping assay comprises: a) amplifying at least a portion of the nucleic acid molecule that encodes the human ALOX15 polypeptide, wherein the amplified portion comprises a thymine at a position corresponding to position 1,693 according to SEQ ID NO:6, or the complement thereof; b) labeling the amplified nucleic acid molecule with a detectable label; c) contacting the labeled nucleic acid molecule with a support comprising an alteration-specific probe, wherein the alteration-specific probe comprises a nucleotide sequence which hybridizes under stringent conditions to the nucleic acid sequence of the amplified nucleic acid molecule comprising a thymine at a position corresponding to position 1,693 according to SEQ ID NO:6, or the complement thereof; and d) detecting the detectable label.

In some embodiments, the nucleic acid molecule is mRNA and the determining step further comprises reverse-transcribing the mRNA into a cDNA prior to the amplifying step.

In some embodiments, the determining step, detecting step, or genotyping assay comprises: contacting the nucleic acid molecule in the biological sample with an alteration-specific probe comprising a detectable label, wherein the alteration-specific probe comprises a nucleotide sequence which hybridizes under stringent conditions to the nucleotide sequence of the amplified nucleic acid molecule comprising: a thymine at a position corresponding to position 9,917 according to SEQ ID NO:2, or the complement thereof; a uracil at a position corresponding to position 1,693 according to SEQ ID NO:4, or the complement thereof; and/or a thymine at a position corresponding to position 1,693 according to SEQ ID NO:6, or the complement thereof; and detecting the detectable label.

In some embodiments, the determining step, detecting step, or genotyping assay comprises: contacting the nucleic acid molecule in the biological sample with an alteration-specific probe comprising a detectable label, wherein the alteration-specific probe comprises a nucleotide sequence which hybridizes under stringent conditions to the nucleotide sequence of the amplified nucleic acid molecule comprising a thymine at a position corresponding to position 9,917 according to SEQ ID NO:2, or the complement thereof; and detecting the detectable label.

In some embodiments, the determining step, detecting step, or genotyping assay comprises: contacting the nucleic acid molecule in the biological sample with an alteration-specific probe comprising a detectable label, wherein the alteration-specific probe comprises a nucleotide sequence which hybridizes under stringent conditions to the nucleotide sequence of the amplified nucleic acid molecule comprising a uracil at a position corresponding to position 1,693 according to SEQ ID NO:4, or the complement thereof; and detecting the detectable label.

In some embodiments, the determining step, detecting step, or genotyping assay comprises: contacting the nucleic acid molecule in the biological sample with an alteration-specific probe comprising a detectable label, wherein the alteration-specific probe comprises a nucleotide sequence which hybridizes under stringent conditions to the nucleotide sequence of the amplified nucleic acid molecule comprising a thymine at a position corresponding to position 1,693 according to SEQ ID NO:6, or the complement thereof; and detecting the detectable label.

Alteration-specific polymerase chain reaction techniques can be used to detect mutations such as SNPs in a nucleic acid sequence. Alteration-specific primers can be used because the DNA polymerase will not extend when a mismatch with the template is present.

In some embodiments, the nucleic acid molecule in the sample is mRNA and the mRNA is reverse-transcribed into a cDNA prior to the amplifying step. In some embodiments, the nucleic acid molecule is present within a cell obtained from the human subject.

In some embodiments, the assay comprises contacting the biological sample with a primer or probe, such as an alteration-specific primer or alteration-specific probe, that specifically hybridizes to an ALOX15 variant genomic sequence, variant mRNA sequence, or variant cDNA sequence and not the corresponding ALOX15 reference sequence under stringent conditions, and determining whether hybridization has occurred.

In some embodiments, the assay comprises RNA sequencing (RNA-Seq). In some embodiments, the assays also comprise reverse transcribing mRNA into cDNA, such as by the reverse transcriptase polymerase chain reaction (RT-PCR).

In some embodiments, the methods utilize probes and primers of sufficient nucleotide length to bind to the target nucleotide sequence and specifically detect and/or identify a polynucleotide comprising an ALOX15 variant genomic nucleic acid molecule, variant mRNA molecule, or variant cDNA molecule. The hybridization conditions or reaction conditions can be determined by the operator to achieve this result. The nucleotide length may be any length that is sufficient for use in a detection method of choice, including any assay described or exemplified herein. Such probes and primers can hybridize specifically to a target nucleotide sequence under high stringency hybridization conditions. Probes and primers may have complete nucleotide sequence identity of contiguous nucleotides within the target nucleotide sequence, although probes differing from the target nucleotide sequence and that retain the ability to specifically detect and/or identify a target nucleotide sequence may be designed by conventional methods. Probes and primers can have about 80%, about 85%, about 90%, about 91%, about 92%, about 93%, about 94%, about 95%, about 96%, about 97%, about 98%, about 99%, or 100% sequence identity or complementarity with the nucleotide sequence of the target nucleic acid molecule.

In some embodiments, to determine whether an ALOX15 nucleic acid molecule (genomic nucleic acid molecule, mRNA molecule, or cDNA molecule), or complement thereof, within a biological sample comprises a nucleotide sequence comprising a thymine at a position corresponding to position 9,917 according to SEQ ID NO:2 (genomic nucleic acid molecule), or a uracil at a position corresponding to position 1,693 according to SEQ ID NO:4 (mRNA molecule), or a thymine at a position corresponding to position 1,693 according to SEQ ID NO:6 (cDNA molecule), the biological sample can be subjected to an amplification method using a primer pair that includes a first primer derived from the 5' flanking sequence adjacent to a thymine at a position corresponding to position 9,917 according to SEQ ID NO:2, or a uracil at a position corresponding to position 1,693 according to SEQ ID NO:4, or a thymine at a position corresponding to position 1,693 according to SEQ ID NO:6, and a second primer derived from the 3' flanking sequence adjacent to a thymine at a position corresponding to position 9,917 according to SEQ ID NO:2, or a uracil at a position corresponding to position 1,693 according to SEQ ID NO:4, or a thymine at a position corresponding to position 1,693 according to SEQ ID NO:6 to produce an amplicon that is indicative of the presence of the SNP at positions encoding a thymine at a position corresponding to position 9,917 according to SEQ ID NO:2, or a uracil at a position corresponding to position 1,693 according to SEQ ID NO:4, or a thymine at a position corresponding to position 1,693 according to SEQ ID NO:6. In some embodiments, the amplicon may range in length from the combined length of the primer pairs plus one nucleotide base pair to any length of amplicon producible by a DNA amplification protocol. This distance can range from one nucleotide base pair up to the limits of the amplification reaction, or about twenty thousand nucleotide base pairs. Optionally, the primer pair flanks a region including positions comprising a thymine at a position corresponding to position 9,917 according to SEQ ID NO:2, or a uracil at a position corresponding to position 1,693 according to SEQ ID NO:4, or a thymine at a position corresponding to position 1,693 according to SEQ ID NO:6, and at least 1, 2, 3, 4, 5, 6, 7, 8, 9, 10, or more nucleotides on each side of positions comprising a thymine at a position corresponding to position 9,917 according to SEQ ID NO:2, or a uracil at a position corresponding to position 1,693 according to SEQ ID NO:4, or a thymine at a position corresponding to position 1,693 according to SEQ ID NO:6.

Similar amplicons can be generated from the mRNA and/or cDNA sequences. PCR primer pairs can be derived from a known sequence, for example, by using computer programs intended for that purpose, such as the PCR primer analysis tool in Vector NTI version 10 (Informax Inc., Bethesda Md.); PrimerSelect (DNASTAR Inc., Madison, Wis.); and Primer3 (Version 0.4.0.COPYRGT., 1991, Whitehead Institute for Biomedical Research, Cambridge, Mass.). Additionally, the sequence can be visually scanned and primers manually identified using known guidelines.

Illustrative examples of nucleic acid sequencing techniques include, but are not limited to, chain terminator (Sanger) sequencing and dye terminator sequencing. Other methods involve nucleic acid hybridization methods other than sequencing, including using labeled primers or probes directed against purified DNA, amplified DNA, and fixed cell preparations (fluorescence in situ hybridization (FISH)). In some methods, a target nucleic acid molecule may be amplified prior to or simultaneous with detection. Illustrative examples of nucleic acid amplification techniques include, but are not limited to, polymerase chain reaction (PCR), ligase chain reaction (LCR), strand displacement amplification (SDA), and nucleic acid sequence based amplification (NASBA). Other methods include, but are not limited to, ligase chain reaction, strand displacement amplification, and thermophilic SDA (tSDA).

In hybridization techniques, stringent conditions can be employed such that a probe or primer will specifically hybridize to its target. In some embodiments, a polynucleotide primer or probe under stringent conditions will hybridize to its target sequence to a detectably greater degree than to other non-target sequences, such as, at least 2-fold, at least 3-fold, at least 4-fold, or more over background, including over 10-fold over background. In some embodiments, a polynucleotide primer or probe under stringent conditions will hybridize to its target nucleotide sequence to a detectably greater degree than to other nucleotide sequences by at least 2-fold. In some embodiments, a polynucleotide primer or probe under stringent conditions will hybridize to its target nucleotide sequence to a detectably greater degree than to other nucleotide sequences by at least 3-fold. In some embodiments, a polynucleotide primer or probe under stringent conditions will hybridize to its target nucleotide sequence to a detectably greater degree than to other nucleotide sequences by at least 4-fold. In some embodiments, a polynucleotide primer or probe under stringent conditions will hybridize to its target nucleotide sequence to a detectably greater degree than to other nucleotide sequences by over 10-fold over background. Stringent conditions are sequence-dependent and will be different in different circumstances.

Appropriate stringency conditions which promote DNA hybridization, for example, 6× sodium chloride/sodium citrate (SSC) at about 45° C., followed by a wash of 2×SSC at 50° C., are known or can be found in *Current Protocols in Molecular Biology*, John Wiley & Sons, N.Y. (1989), 6.3.1-6.3.6. Typically, stringent conditions for hybridization and detection will be those in which the salt concentration is less than about 1.5 M Na$^+$ ion, typically about 0.01 to 1.0 M Na$^+$ ion concentration (or other salts) at pH 7.0 to 8.3 and the temperature is at least about 30° C. for short probes (such as, for example, 10 to 50 nucleotides) and at least about 60° C. for longer probes (such as, for example, greater than 50 nucleotides). Stringent conditions may also be achieved with the addition of destabilizing agents such as formamide. Optionally, wash buffers may comprise about 0.1% to about 1% SDS. Duration of hybridization is generally less than about 24 hours, usually about 4 to about 12 hours. The duration of the wash time will be at least a length of time sufficient to reach equilibrium.

The present disclosure also provides methods of detecting the presence of a human ALOX15 predicted loss-of-function polypeptide comprising performing an assay on a sample obtained from a human subject to determine whether an ALOX15 polypeptide in the subject contains one or more variations that causes the polypeptide to have a loss-of-function (partial or complete) or predicted loss-of-function (partial or complete). The ALOX15 predicted loss-of-function polypeptide can be any of the ALOX15 variant polypeptides described herein. In some embodiments, the methods detect the presence of ALOX15 Thr560Met, Tyr139Cys, Leu651fs, Pro565Leu, Asn658Lys, Gly283Arg, Val474Ala, Gly422Arg, or Leu106fs. In some embodiments, the methods detect the presence of ALOX15 Thr560Met.

In some embodiments, the methods comprise performing an assay on a sample obtained from a human subject to determine whether an ALOX15 polypeptide in the sample comprises a methionine at a position corresponding to position 560 according to SEQ ID NO:8.

In some embodiments, the detecting step comprises sequencing at least a portion of the polypeptide that comprises a position corresponding to position 560 according to SEQ ID NO:8 or SEQ ID NO:7.

In some embodiments, the detecting step comprises an immunoassay for detecting the presence of a polypeptide that comprises a position corresponding to position 560 according to SEQ ID NO:8 or SEQ ID NO:7.

In some embodiments, when the human subject does not have an ALOX15 predicted loss-of-function polypeptide, then the human subject has an increased risk for developing a respiratory disorder, such as a nasal polyp, allergic rhinitis, asthma, and/or AERD. In some embodiments, when the human subject has an ALOX15 predicted loss-of-function polypeptide, then the human subject has a decreased risk for developing a respiratory disorder, such as a nasal polyp, allergic rhinitis, asthma, and/or AERD, and/or atopy.

The present disclosure also provides isolated nucleic acid molecules that hybridize to ALOX15 variant genomic nucleic acid molecules, ALOX15 variant mRNA molecules, and/or ALOX15 variant cDNA molecules (such as any of the genomic variant nucleic acid molecules, mRNA variant molecules, and cDNA variant molecules disclosed herein). In some embodiments, the isolated nucleic acid molecules hybridize to a portion of the ALOX15 nucleic acid molecule that includes a position corresponding to position 9,917 according to SEQ ID NO:2, position 1,693 according to SEQ ID NO:4, or position 1,693 according to SEQ ID NO:6.

In some embodiments, such isolated nucleic acid molecules comprise or consist of at least about 5, at least about 8, at least about 10, at least about 11, at least about 12, at least about 13, at least about 14, at least about 15, at least about 16, at least about 17, at least about 18, at least about 19, at least about 20, at least about 21, at least about 22, at least about 23, at least about 24, at least about 25, at least about 30, at least about 35, at least about 40, at least about 45, at least about 50, at least about 55, at least about 60, at least about 65, at least about 70, at least about 75, at least about 80, at least about 85, at least about 90, at least about 95, at least about 100, at least about 200, at least about 300, at least about 400, at least about 500, at least about 600, at least about 700, at least about 800, at least about 900, at least about 1000, at least about 2000, at least about 3000, at least about 4000, or at least about 5000 nucleotides. In some embodiments, such isolated nucleic acid molecules comprise or consist of at least about 5, at least about 8, at least about 10, at least about 11, at least about 12, at least about 13, at least about 14, at least about 15, at least about 16, at least about 17, at least about 18, at least about 19, at least about 20, at least about 21, at least about 22, at least about 23, at least about 24, or at least about 25 nucleotides. In some embodiments, the isolated nucleic acid molecules comprise or consist of at least about 18 nucleotides. In some embodiments, the isolated nucleic acid molecules comprise or consists of at least about 15 nucleotides. In some embodiments, the isolated nucleic acid molecules consist of or comprise from about 10 to about 35, from about 10 to about 30, from about 10 to about 25, from about 12 to about 30, from about 12 to about 28, from about 12 to about 24, from about 15 to about 30, from about 15 to about 25, from about 18 to about 30, from about 18 to about 25, from about 18 to about 24, or from about 18 to about 22 nucleotides. In some embodiments, the isolated nucleic acid molecules consist of or comprise from about 18 to about 30 nucleotides. In some embodiments, the isolated nucleic acid molecules comprise or consist of at least about 15 nucleotides to at least about 35 nucleotides.

In some embodiments, such isolated nucleic acid molecules hybridize to ALOX15 variant nucleic acid molecules (such as genomic nucleic acid molecules, mRNA molecules, and/or cDNA molecules) under stringent conditions. Such nucleic acid molecules can be used, for example, as probes, primers, alteration-specific probes, or alteration-specific primers as described or exemplified herein, and include, without limitation primers, probes, antisense RNAs, shRNAs, and siRNAs, each of which is described in more detail elsewhere herein, and can be used in any of the methods described herein.

In some embodiments, the isolated nucleic acid molecules hybridize to at least about 15 contiguous nucleotides of a nucleic acid molecule that is at least about 70%, at least about 75%, at least about 80%, at least about 85%, at least about 90%, at least about 95%, at least about 96%, at least about 97%, at least about 98%, at least about 99%, or 100% identical to ALOX15 variant genomic nucleic acid molecules, ALOX15 variant mRNA molecules, and/or ALOX15 variant cDNA molecules. In some embodiments, the isolated nucleic acid molecules consist of or comprise from about 15 to about 100 nucleotides, or from about 15 to about 35 nucleotides. In some embodiments, the isolated nucleic acid molecules consist of or comprise from about 15 to about 100 nucleotides. In some embodiments, the isolated nucleic acid molecules consist of or comprise from about 15 to about 35 nucleotides.

In some embodiments, the isolated alteration-specific probes or alteration-specific primers comprise at least about 15 nucleotides, wherein the alteration-specific probe or alteration-specific primer comprises a nucleotide sequence which is complementary to a portion of a nucleotide sequence encoding a human ALOX15 polypeptide, wherein the portion comprises a position corresponding to: position 9,917 according to SEQ ID NO:2, or the complement thereof; position 1,693 according to SEQ ID NO:4, or the complement thereof; or position 1,693 according to SEQ ID NO:6, or the complement thereof. In some embodiments, the alteration-specific probe or alteration-specific primer comprises a nucleotide sequence which is complementary to a portion of a nucleotide sequence comprising positions corresponding to: positions 9,916 to 9,918 according to SEQ ID NO:2, or the complement thereof; positions 1,692 to 1,694 according to SEQ ID NO:4, or the complement thereof; and/or positions 1,692 to 1,694 according to SEQ ID NO:6, or the complement thereof.

In some embodiments, the alteration-specific probes and alteration-specific primers comprise DNA. In some embodiments, the alteration-specific probes and alteration-specific primers comprise RNA.

In some embodiments, the probes and primers described herein (including alteration-specific probes and alteration-specific primers) have a nucleotide sequence that specifically hybridizes to any of the nucleic acid molecules disclosed herein, or the complement thereof. In some embodiments, the probes and primers specifically hybridize to any of the nucleic acid molecules disclosed herein under stringent conditions.

In some embodiments, the primers, including alteration-specific primers, can be used in second generation sequencing or high throughput sequencing. In some instances, the primers, including alteration-specific primers, can be modified. In particular, the primers can comprise various modifications that are used at different steps of, for example, Massive Parallel Signature Sequencing (MPSS), Polony sequencing, and 454 Pyrosequencing. Modified primers can be used at several steps of the process, including biotinylated primers in the cloning step and fluorescently labeled primers used at the bead loading step and detection step. Polony sequencing is generally performed using a paired-end tags library wherein each molecule of DNA template is about 135 bp in length. Biotinylated primers are used at the bead loading step and emulsion PCR. Fluorescently labeled degenerate nonamer oligonucleotides are used at the detection step. An adaptor can contain a 5'-biotin tag for immobilization of the DNA library onto streptavidin-coated beads.

The probes and primers described herein can be used to detect a nucleotide variation within any of the ALOX15 variant genomic nucleic acid molecules, ALOX1S variant mRNA molecules, and/or ALOX15 variant cDNA molecules disclosed herein. The primers described herein can be used to amplify ALOX15 variant genomic nucleic acid molecules, ALOX15 variant mRNA molecules, or ALOX15 variant cDNA molecules, or a fragment thereof.

The present disclosure also provides pairs of primers comprising any of the primers described above. For example, if one of the primers' 3'-ends hybridizes to a cytosine at a position corresponding to position 9,917 according to SEQ ID NO:1 (rather than thymine) in a particular ALOX15 nucleic acid molecule, then the presence of the amplified fragment would indicate the presence of an ALOX15 reference genomic nucleic acid molecule. Conversely, if one of the primers' 3'-ends hybridizes to a thymine at a position corresponding to position 9,917 according to SEQ ID NO:2 (rather than cytosine) in a particular ALOX15 nucleic acid molecule, then the presence of the amplified fragment would indicate the presence of the ALOX15 variant genomic nucleic acid molecule. In some embodiments, the nucleotide of the primer complementary to the thymine at a position corresponding to position 9,917 according to SEQ ID NO:2 can be at the 3' end of the primer. In addition, if one of the primers' 3'-ends hybridizes to a cytosine at a position corresponding to position 1,693 according to SEQ ID NO:3 (rather than uracil) in a particular ALOX15 nucleic acid molecule, then the presence of the amplified fragment would indicate the presence of an ALOX15 reference mRNA molecule. Conversely, if one of the primers' 3'-ends hybridizes to a uracil at a position corresponding to position 1,693 according to SEQ ID NO:4 (rather than cytosine) in a particular ALOX15 mRNA molecule, then the presence of the amplified fragment would indicate the presence of the ALOX15 variant mRNA molecule. In some embodiments, the nucleotide of the primer complementary to the uracil at a position corresponding to position 1,693 according to SEQ ID NO:4 can be at the 3' end of the primer. In addition, if one of the primers' 3'-ends hybridizes to a cytosine at a position corresponding to position 1,693 according to SEQ ID NO:5 (rather than thymine) in a particular ALOX15 nucleic acid molecule, then the presence of the amplified fragment would indicate the presence of an ALOX15 reference cDNA molecule. Conversely, if one of the primers' 3'-ends hybridizes to a thymine at a position corresponding to position 1,693 according to SEQ ID NO:6 (rather than cytosine) in a particular ALOX15 cDNA molecule, then the presence of the amplified fragment would indicate the presence of the ALOX15 variant cDNA molecule. In some embodiments, the nucleotide of the primer complementary to the thymine at a position corresponding to position 1,693 according to SEQ ID NO:6 can be at the 3' end of the primer.

In the context of the disclosure "specifically hybridizes" means that the probe or primer (such as, for example, the alteration-specific probe or alteration-specific primer) does not hybridize to a nucleic acid sequence encoding an ALOX15 reference genomic nucleic acid molecule, an ALOX15 reference mRNA molecule, and/or an ALOX15 reference cDNA molecule.

In some embodiments, the probes (such as, for example, an alteration-specific probe) comprise a label. In some embodiments, the label is a fluorescent label, a radiolabel, or biotin.

The present disclosure also provides supports comprising a substrate to which any one or more of the probes disclosed herein is attached. Solid supports are solid-state substrates or supports with which molecules, such as any of the probes disclosed herein, can be associated. A form of solid support is an array. Another form of solid support is an array detector. An array detector is a solid support to which multiple different probes have been coupled in an array, grid, or other organized pattern. A form for a solid-state substrate is a microtiter dish, such as a standard 96-well type. In some embodiments, a multiwell glass slide can be employed that normally contains one array per well.

The present disclosure also provides molecular complexes comprising or consisting of any of the ALOX15 nucleic acid molecules (genomic nucleic acid molecules, mRNA molecules, or cDNA molecules), or complement thereof, described herein and any of the alteration-specific primers or alteration-specific probes described herein. In some embodiments, the ALOX15 nucleic acid molecules (genomic nucleic acid molecules, mRNA molecules, or cDNA molecules), or complement thereof, in the molecular complexes are single-stranded. In some embodiments, the ALOX15 nucleic acid molecule is any of the genomic nucleic acid molecules described herein. In some embodiments, the ALOX15 nucleic acid molecule is any of the mRNA molecules described herein. In some embodiments, the ALOX15 nucleic acid molecule is any of the cDNA molecules described herein. In some embodiments, the molecular complex comprises or consists of any of the ALOX15 nucleic acid molecules (genomic nucleic acid molecules, mRNA molecules, or cDNA molecules), or complement thereof, described herein and any of the alteration-specific primers described herein. In some embodiments, the molecular complex comprises or consists of any of the ALOX15 nucleic acid molecules (genomic nucleic acid molecules, mRNA molecules, or cDNA molecules), or complement thereof, described herein and any of the alteration-specific probes described herein.

In some embodiments, the molecular complex comprises or consists of an alteration-specific primer or an alteration-specific probe hybridized to a genomic nucleic acid molecule comprising a nucleotide sequence encoding a human ALOX15 polypeptide, wherein the alteration-specific primer or the alteration-specific probe is hybridized to a thymine at a position corresponding to position 9,917 according to SEQ ID NO:2, or the complement thereof.

In some embodiments, the molecular complex comprises or consists of an alteration-specific primer or an alteration-specific probe that is hybridized to an ATG codon at positions corresponding to positions 9,916 to 9,918 according to SEQ ID NO:2.

In some embodiments, the molecular complex comprises or consists of a genomic nucleic acid molecule that comprises SEQ ID NO:2.

In some embodiments, the molecular complex comprises or consists of an alteration-specific primer or an alteration-specific probe hybridized to an mRNA molecule comprising a nucleotide sequence encoding a human ALOX15 polypeptide, wherein the alteration-specific primer or the alteration-specific probe is hybridized to a uracil at a position corresponding to position 1,693 according to SEQ ID NO:4, or the complement thereof.

In some embodiments, the molecular complex comprises or consists of an alteration-specific primer or an alteration-specific probe that is hybridized to an AUG codon at positions corresponding to positions 1,692 to 1,694 according to SEQ ID NO:4.

In some embodiments, the molecular complex comprises or consists of an mRNA molecule that comprises SEQ ID NO:4.

In some embodiments, the molecular complex comprises or consists of an alteration-specific primer or an alteration-specific probe hybridized to a cDNA molecule comprising a nucleotide sequence encoding a human ALOX15 polypeptide, wherein the alteration-specific primer or the alteration-specific probe is hybridized to a thymine at a position corresponding to position 1,693 according to SEQ ID NO:6, or the complement thereof.

In some embodiments, the molecular complex comprises or consists of an alteration-specific primer or an alteration-specific probe that is hybridized to an ATG codon at positions corresponding to positions 1,692 to 1,694 according to SEQ ID NO:6.

In some embodiments, the molecular complex comprises or consists of a cDNA molecule that comprises SEQ ID NO:6.

In some embodiments, the molecular complex comprises an alteration-specific probe or an alteration-specific primer comprising a label. In some embodiments, the label is a fluorescent label, a radiolabel, or biotin. In some embodiments, the molecular complex further comprises a non-human polymerase.

The nucleotide sequence of an ALOX15 reference genomic nucleic acid molecule is set forth in SEQ ID NO:1. Referring to SEQ ID NO:1, position 9,917 is a cytosine.

A variant genomic nucleic acid molecule of ALOX15 exists, wherein the cytosine at position 9,917 is replaced with thymine. The nucleotide sequence of this ALOX15 variant genomic nucleic acid molecule is set forth in SEQ ID NO:2.

The nucleotide sequence of an ALOX15 reference mRNA molecule is set forth in SEQ ID NO:3. Referring to SEQ ID NO:3, position 1,693 is a cytosine.

A variant mRNA molecule of ALOX15 exists, wherein the cytosine at position 1,693 is replaced with uracil. The nucleotide sequence of this ALOX15 variant mRNA molecule is set forth in SEQ ID NO:4.

The nucleotide sequence of an ALOX15 reference cDNA molecule is set forth in SEQ ID NO:5. Referring to SEQ ID NO:5, position 1,693 is a cytosine.

A variant cDNA molecule of ALOX15 exists, wherein the cytosine at position 1,693 is replaced with thymine. The nucleotide sequence of this ALOX15 variant cDNA molecule is set forth in SEQ ID NO:6.

Also provided herein are functional polynucleotides that can interact with the disclosed nucleic acid molecules. Examples of functional polynucleotides include, but are not limited to, antisense molecules, aptamers, ribozymes, triplex forming molecules, and external guide sequences. The functional polynucleotides can act as effectors, inhibitors, modulators, and stimulators of a specific activity possessed by a target molecule, or the functional polynucleotides can possess a de novo activity independent of any other molecules.

The isolated nucleic acid molecules disclosed herein can comprise RNA, DNA, or both RNA and DNA. The isolated nucleic acid molecules can also be linked or fused to a heterologous nucleic acid sequence, such as in a vector, or a heterologous label. For example, the isolated nucleic acid molecules disclosed herein can be within a vector or as an exogenous donor sequence comprising the isolated nucleic acid molecule and a heterologous nucleic acid sequence. The isolated nucleic acid molecules can also be linked or fused to a heterologous label. The label can be directly detectable (such as, for example, fluorophore) or indirectly detectable (such as, for example, hapten, enzyme, or fluorophore quencher). Such labels can be detectable by spectroscopic, photochemical, biochemical, immunochemical, or chemical means. Such labels include, for example, radiolabels, pigments, dyes, chromogens, spin labels, and fluorescent labels. The label can also be, for example, a chemiluminescent substance; a metal-containing substance; or an enzyme, where there occurs an enzyme-dependent secondary generation of signal. The term "label" can also refer to a "tag" or hapten that can bind selectively to a conjugated molecule such that the conjugated molecule, when added subsequently along with a substrate, is used to generate a detectable signal. For example, biotin can be used as a tag along with an avidin or streptavidin conjugate of horseradish peroxidate (HRP) to bind to the tag, and examined using a calorimetric substrate (such as, for example, tetramethylbenzidine (TMB)) or a fluorogenic substrate to detect the presence of HRP. Exemplary labels that can be used as tags to facilitate purification include, but are not limited to, myc, HA, FLAG or 3×FLAG, 6×His or polyhistidine, glutathione-S-transferase (GST), maltose binding protein, an epitope tag, or the Fc portion of immunoglobulin. Numerous labels include, for example, particles, fluorophores, haptens, enzymes and their calorimetric, fluorogenic and chemiluminescent substrates and other labels.

The disclosed nucleic acid molecules can comprise, for example, nucleotides or non-natural or modified nucleotides, such as nucleotide analogs or nucleotide substitutes. Such nucleotides include a nucleotide that contains a modified base, sugar, or phosphate group, or that incorporates a non-natural moiety in its structure. Examples of non-natural nucleotides include, but are not limited to, dideoxynucleotides, biotinylated, aminated, deaminated, alkylated, benzylated, and fluorophor-labeled nucleotides.

The nucleic acid molecules disclosed herein can also comprise one or more nucleotide analogs or substitutions. A nucleotide analog is a nucleotide which contains a modification to either the base, sugar, or phosphate moieties. Modifications to the base moiety include, but are not limited to, natural and synthetic modifications of A, C, G, and T/U, as well as different purine or pyrimidine bases such as, for example, pseudouridine, uracil-5-yl, hypoxanthin-9-yl (I), and 2-aminoadenin-9-yl. Modified bases include, but are not limited to, 5-methylcytosine (5-me-C), 5-hydroxymethyl cytosine, xanthine, hypoxanthine, 2-aminoadenine, 6-methyl and other alkyl derivatives of adenine and guanine, 2-propyl and other alkyl derivatives of adenine and guanine, 2-thiouracil, 2-thiothymine and 2-thiocytosine, 5-halouracil and cytosine, 5-propynyl uracil and cytosine, 6-azo uracil, cytosine and thymine, 5-uracil (pseudouracil), 4-thiouracil, 8-halo, 8-amino, 8-thiol, 8-thioalkyl, 8-hydroxyl and other 8-substituted adenines and guanines, 5-halo (such as, for example, 5-bromo), 5-trifluoromethyl and other 5-substituted uracils and cytosines, 7-methylguanine, 7-methyladenine, 8-azaguanine, 8-azaadenine, 7-deazaguanine, 7-deazaadenine, 3-deazaguanine, and 3-deazaadenine.

Nucleotide analogs can also include modifications of the sugar moiety. Modifications to the sugar moiety include, but are not limited to, natural modifications of the ribose and deoxy ribose as well as synthetic modifications. Sugar modifications include, but are not limited to, the following modifications at the 2' position: OH; F; O-, S-, or N-alkyl; O-, S-, or N-alkenyl; O-, S- or N-alkynyl; or O-alkyl-O-alkyl, wherein the alkyl, alkenyl, and alkynyl may be substituted or unsubstituted $C_{1-10}$alkyl or $C_{2-10}$alkenyl, and $C_{2-10}$alkynyl. Exemplary 2' sugar modifications also include, but are not limited to, —O[(CH$_2$)$_n$O]$_m$CH$_3$, —O(CH$_2$)$_n$OCH$_3$, —O(CH$_2$)$_n$NH$_2$, —O(CH$_2$)$_n$CH$_3$, —O(CH$_2$)$_n$—ONH$_2$, and —O(CH$_2$)$_n$ON[(CH$_2$)$_n$CH$_3$)]$_2$, where n and m are from 1 to about 10. Other modifications at the 2' position include, but are not limited to, $C_{1-10}$alkyl, substituted lower alkyl, alkaryl, aralkyl, O-alkaryl or O-aralkyl, SH, SCH$_3$, OCN, Cl, Br, CN, CF$_3$, OCF$_3$, SOCH$_3$, SO$_2$CH$_3$, ONO$_2$, NO$_2$, N$_3$, NH$_2$, heterocycloalkyl, heterocycloalkaryl, aminoalkylamino, polyalkylamino, substituted silyl, an RNA cleaving group, a reporter group, an intercalator, a group for improving the pharmacokinetic properties of an oligonucleotide, or a group for improving the pharmacodynamic properties of an oligonucleotide, and other substituents having similar properties. Similar modifications may also be made at other positions on the sugar, particularly the 3' position of the sugar on the 3' terminal nucleotide or in 2'-5' linked oligonucleotides and the 5' position of 5' terminal nucleotide. Modified sugars can also include those that contain modifications at the bridging ring oxygen, such as CH$_2$ and S. Nucleotide sugar analogs can also have sugar mimetics, such as cyclobutyl moieties in place of the pentofuranosyl sugar.

Nucleotide analogs can also be modified at the phosphate moiety. Modified phosphate moieties include, but are not limited to, those that can be modified so that the linkage between two nucleotides contains a phosphorothioate, chiral phosphorothioate, phosphorodithioate, phosphotriester, aminoalkylphosphotriester, methyl and other alkyl phosphonates including 3'-alkylene phosphonate and chiral phosphonates, phosphinates, phosphoramidates including 3'-amino phosphoramidate and aminoalkylphosphoramidates, thionophosphoramidates, thionoalkylphosphonates, thionoalkylphosphotriesters, and boranophosphates. These phosphate or modified phosphate linkage between two nucleotides can be through a 3'-5' linkage or a 2'-5' linkage, and the linkage can contain inverted polarity such as 3'-5' to 5'-3' or 2'-5' to 5'-2'. Various salts, mixed salts, and free acid forms are also included. Nucleotide substitutes also include peptide nucleic acids (PNAs).

Percent identity (or percent complementarity) between particular stretches of nucleotide sequences within nucleic acid molecules or amino acid sequences within polypeptides can be determined routinely using BLAST programs (basic local alignment search tools) and PowerBLAST programs (Altschul et al., J. Mol. Biol., 1990, 215, 403-410; Zhang and Madden, Genome Res., 1997, 7, 649-656) or by using the Gap program (Wisconsin Sequence Analysis Package, Version 8 for Unix, Genetics Computer Group, University Research Park, Madison Wis.), using default settings, which uses the algorithm of Smith and Waterman (Adv. Appl. Math., 1981, 2, 482-489). Herein, if reference is made to percent sequence identity, the higher percentages of sequence identity are preferred over the lower ones.

The present disclosure also provides compositions comprising any one or more of the isolated nucleic acid molecules, genomic nucleic acid molecules, mRNA molecules, and/or cDNA molecules disclosed herein. In some embodiments, the composition is a pharmaceutical composition. In some embodiments, the compositions comprise a carrier and/or excipient. Examples of carriers include, but are not limited to, poly(lactic acid) (PLA) microspheres, poly(D,L-lactic-coglycolic-acid) (PLGA) microspheres, liposomes, micelles, inverse micelles, lipid cochleates, and lipid microtubules. A carrier may comprise a buffered salt solution such as PBS, HBSS, etc.

As used herein, the phrase "corresponding to" or grammatical variations thereof when used in the context of the numbering of a particular nucleotide or nucleotide sequence or position refers to the numbering of a specified reference sequence when the particular nucleotide or nucleotide sequence is compared to a reference sequence (such as, for example, SEQ ID NO:1, SEQ ID NO:3, or SEQ ID NO:5). In other words, the residue (such as, for example, nucleotide or amino acid) number or residue (such as, for example, nucleotide or amino acid) position of a particular polymer is designated with respect to the reference sequence rather than by the actual numerical position of the residue within the particular nucleotide or nucleotide sequence. For example, a particular nucleotide sequence can be aligned to a reference sequence by introducing gaps to optimize residue matches between the two sequences. In these cases, although the gaps are present, the numbering of the residue in the particular nucleotide or nucleotide sequence is made with respect to the reference sequence to which it has been aligned.

For example, a nucleic acid molecule comprising a nucleotide sequence encoding a human ALOX15 polypeptide, wherein the nucleotide sequence comprises a thymine at a position corresponding to position 9,917 according to SEQ ID NO:2 means that if the nucleotide sequence of the ALOX15 genomic nucleic acid molecule is aligned to the sequence of SEQ ID NO:2, the ALOX15 sequence has a thymine residue at the position that corresponds to position 9,917 of SEQ ID NO:2. The same applies for mRNA molecules comprising a nucleotide sequence encoding a human ALOX15 polypeptide, wherein the nucleotide sequence comprises a uracil at a position corresponding to position 1,693 according to SEQ ID NO:4, and cDNA molecules comprising a nucleotide sequence encoding a human ALOX15 polypeptide, wherein the nucleotide sequence comprises a thymine at a position corresponding to position 1,693 according to SEQ ID NO:6. In other words, these phrases refer to a nucleic acid molecule encoding an ALOX15 polypeptide, wherein the genomic nucleic acid molecule has a nucleotide sequence that comprises a thymine residue that is homologous to the thymine residue at position 9,917 of SEQ ID NO:2 (or wherein the mRNA molecule has a nucleotide sequence that comprises a uracil residue that is homologous to the uracil residue at position 1,693 of SEQ ID NO:4, or wherein the cDNA molecule has a nucleotide sequence that comprises a thymine residue that is homologous to the thymine residue at position 1,693 of SEQ ID NO:6). Herein, such a sequence is also referred to as "ALOX15 sequence with the C9,917T alteration" or "ALOX15 sequence with the C9,917T variation" referring to genomic nucleic acid molecules (or "ALOX15 sequence with the C1,693U alteration" or "ALOX15 sequence with the C1,693U variation" referring to mRNA molecules, and "ALOX15 sequence with the C1,693T alteration" or "ALOX15 sequence with the C1,693T variation" referring to cDNA molecules).

As described herein, a position within an ALOX15 genomic nucleic acid molecule that corresponds to position 9,917 according to SEQ ID NO:2, for example, can be identified by performing a sequence alignment between the nucleotide sequence of a particular ALOX15 nucleic acid molecule and the nucleotide sequence of SEQ ID NO:2. A variety of computational algorithms exist that can be used for performing a sequence alignment to identify a nucleotide position that corresponds to, for example, position 9,917 in SEQ ID NO:2. For example, by using the NCBI BLAST algorithm (Altschul et al., Nucleic Acids Res., 1997, 25, 3389-3402) or CLUSTALW software (Sievers and Higgins, Methods Mol. Biol., 2014, 1079, 105-116) sequence alignments may be performed. However, sequences can also be aligned manually.

The amino acid sequence of an ALOX15 reference polypeptide is set forth in SEQ ID NO:7. Referring to SEQ ID NO:7, the ALOX15 reference polypeptide is 662 amino acids in length. Referring to SEQ ID NO:7, position 560 is threonine.

An ALOX15 variant polypeptide exists (Thr560Met or T560M), the amino acid sequence of which is set forth in SEQ ID NO:8. Referring to SEQ ID NO:8, the ALOX15 variant polypeptide is 662 amino acids in length. Referring to SEQ ID NO:8, position 560 is methionine.

The nucleotide and amino acid sequences listed in the accompanying sequence listing are shown using standard letter abbreviations for nucleotide bases, and three-letter code for amino acids. The nucleotide sequences follow the standard convention of beginning at the 5' end of the sequence and proceeding forward (i.e., from left to right in each line) to the 3' end. Only one strand of each nucleotide sequence is shown, but the complementary strand is understood to be included by any reference to the displayed strand. The amino acid sequence follows the standard convention of beginning at the amino terminus of the sequence and proceeding forward (i.e., from left to right in each line) to the carboxy terminus.

The present disclosure also provides therapeutic agents that treat or inhibit a respiratory disorder for use in the treatment of a respiratory disorder (or for use in the preparation of a medicament for treating a respiratory disorder) in a human subject, wherein the human subject has any of the genomic nucleic acid molecules, mRNA molecules, and/or cDNA molecules encoding a human ALOX15 polypeptide described herein. The therapeutic agents that treat or inhibit a respiratory disorder can be any of the therapeutic agents that treat or inhibit a respiratory disorder described herein.

In some embodiments, the human subject comprises: a genomic nucleic acid molecule having a nucleotide sequence encoding a human ALOX15 polypeptide, wherein the nucleotide sequence comprises a thymine at a position corresponding to position 9,917 according to SEQ ID NO:2, or the complement thereof; an mRNA molecule having a nucleotide sequence encoding a human ALOX15 polypeptide, wherein the nucleotide sequence comprises a uracil at a position corresponding to position 1,693 according to SEQ ID NO:4, or the complement thereof; a cDNA molecule having a nucleotide sequence encoding a human ALOX15 polypeptide, wherein the nucleotide sequence comprises a thymine at a position corresponding to position 1,693 according to SEQ ID NO:6, or the complement thereof; or an ALOX15 polypeptide that comprises a methionine at a position corresponding to position 560 according to SEQ ID NO:8.

The present disclosure also provides ALOX15 inhibitors for use in the treatment of a respiratory disorder (or for use in the preparation of a medicament for treating a respiratory disorder) in a human subject, wherein the human subject has any of the genomic nucleic acid molecules, mRNA molecules, and/or cDNA molecules encoding a human ALOX15 polypeptide described herein. The ALOX15 inhibitors can be any of the ALOX15 inhibitors described herein.

In some embodiments, the human subject comprises: a genomic nucleic acid molecule having a nucleotide sequence encoding a human ALOX15 polypeptide, wherein the nucleotide sequence comprises a thymine at a position corresponding to position 9,917 according to SEQ ID NO:2, or the complement thereof; an mRNA molecule having a nucleotide sequence encoding a human ALOX15 polypeptide, wherein the nucleotide sequence comprises a uracil at a position corresponding to position 1,693 according to SEQ ID NO:4, or the complement thereof; a cDNA molecule having a nucleotide sequence encoding a human ALOX15S polypeptide, wherein the nucleotide sequence comprises a thymine at a position corresponding to position 1,693 according to SEQ ID NO:6, or the complement thereof; or an ALOX15 polypeptide that comprises a methionine at a position corresponding to position 560 according to SEQ ID NO:8. The ALOX15 inhibitors can be any of the ALOX15 inhibitors described herein.

All patent documents, websites, other publications, accession numbers and the like cited above or below are incorporated by reference in their entirety for all purposes to the same extent as if each individual item were specifically and individually indicated to be so incorporated by reference. If different versions of a sequence are associated with an accession number at different times, the version associated with the accession number at the effective filing date of this application is meant. The effective filing date means the earlier of the actual filing date or filing date of a priority application referring to the accession number if applicable. Likewise, if different versions of a publication, website or the like are published at different times, the version most recently published at the effective filing date of the application is meant unless otherwise indicated. Any feature, step, element, embodiment, or aspect of the present disclosure can be used in combination with any other feature, step, element, embodiment, or aspect unless specifically indicated otherwise. Although the present disclosure has been described in some detail by way of illustration and example for purposes of clarity and understanding, it will be apparent that certain changes and modifications may be practiced within the scope of the appended claims.

The following examples are provided to describe the embodiments in greater detail. They are intended to illustrate, not to limit, the claimed embodiments. The following examples provide those of ordinary skill in the art with a disclosure and description of how the compounds, compositions, articles, devices and/or methods described herein are made and evaluated, and are intended to be purely exemplary and are not intended to limit the scope of any claims. Efforts have been made to ensure accuracy with respect to numbers (such as, for example, amounts, temperature, etc.), but some errors and deviations may be accounted for. Unless indicated otherwise, parts are parts by weight, temperature is in ° C. or is at ambient temperature, and pressure is at or near atmospheric.

EXAMPLES

Example 1: Exome Sequencing Analysis

Figure 7:
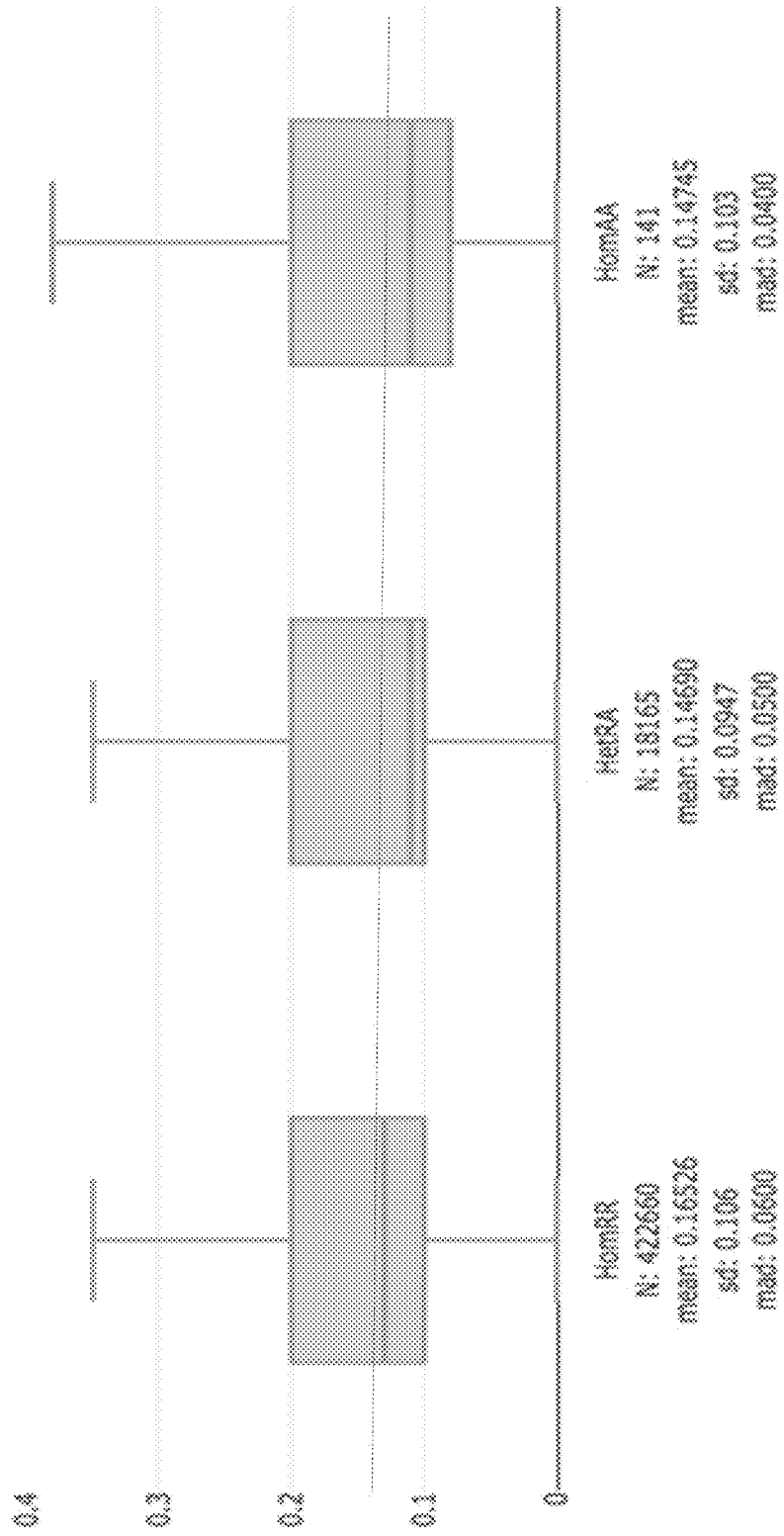
FIG. 7 shows quantitative trait distributions for eosinophil counts in UKB 500K genotyping data showing decreased eosinophils among heterozygous and homozygous rs34210653 variant carriers (dotted line indicates mean eosinophil numbers for ALOX15 reference allele carriers).
Figure 8:
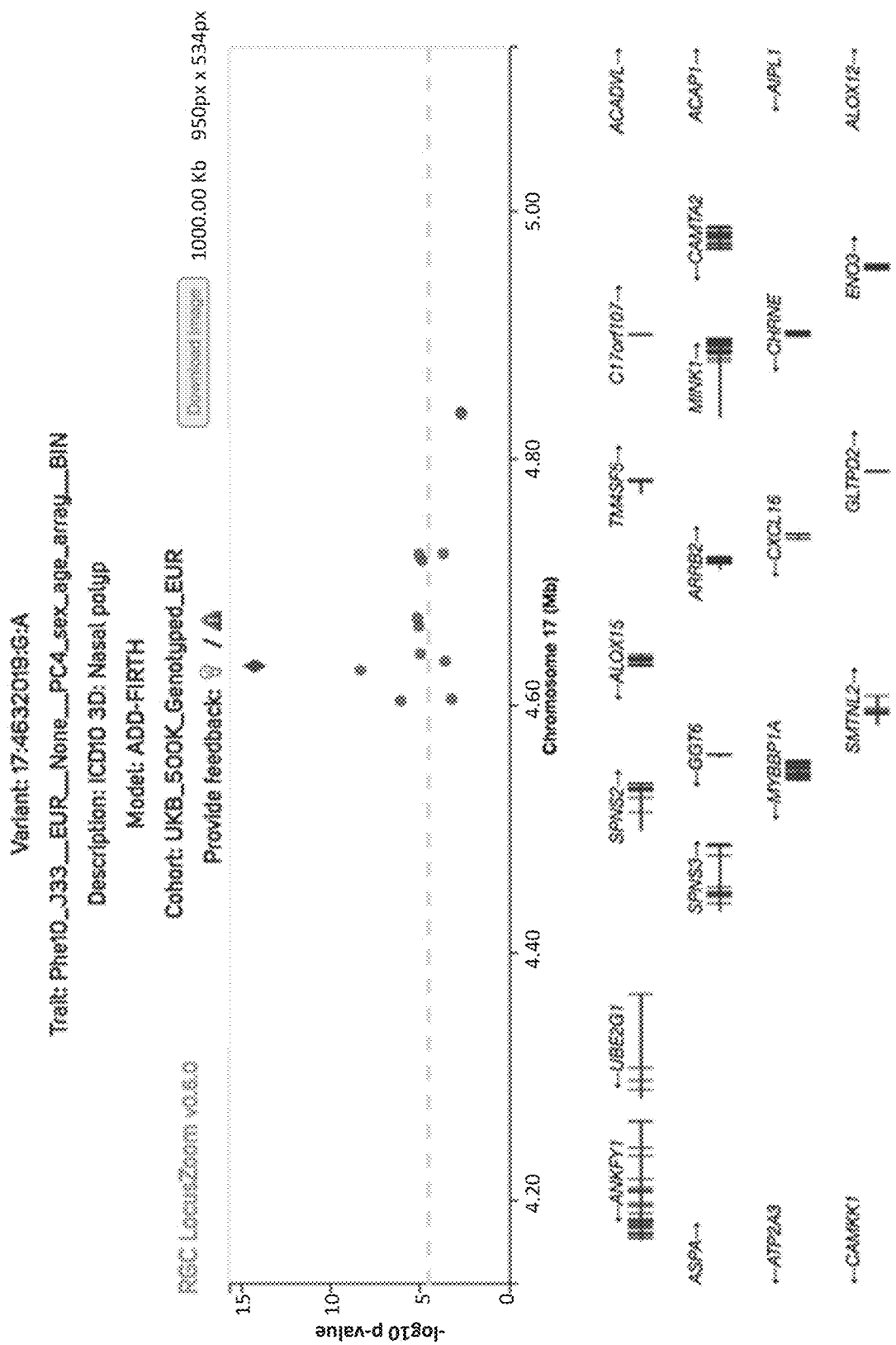
FIG. 8 shows a locus zoom plot for the significant association between rs34210653 and nasal polyps in UKB 500K genotyped data.

Exome sequencing and analysis at the Regeneron Genetics Center identified that rs34210653 significantly associates with decreased circulating blood eosinophils in UK Biobank 50K exome data (see, FIG. 1) and UK Biobank 500K genotyping data (see, FIG. 2) and also associates with decreased circulating blood eosinophils in GHS 90K exome data (see, FIG. 4). The analysis also identified that rs34210653 significantly associates with decreased odds of nasal polyps, allergic rhinitis, and asthma in UK Biobank 500K genotyping data (see, FIG. 3) and with decreased odds of nasal polyps in GHS 90K exomes (see, FIG. 5). A locus zoom plot for the significant association between rs34210653 and eosinophils in UKB 500K genotyped data (see, FIG. 6). Quantitative trait distributions for eosinophil counts in UKB 500K genotyping data showing decreased eosinophils among heterozygous and homozygous rs34210653 variant carriers (dotted line indicates mean eosinophil numbers for wildtype allele carriers) (see, FIG. 7). A locus zoom plot for the significant association between rs34210653 and nasal polyps in UKB 500K genotyped data (see, FIG. 8).

Various modifications of the described subject matter, in addition to those described herein, will be apparent to those skilled in the art from the foregoing description. Such modifications are also intended to fall within the scope of the appended claims. Each reference (including, but not limited to, journal articles, U.S. and non-U.S. patents, patent application publications, international patent application publications, gene bank accession numbers, and the like) cited in the present application is incorporated herein by reference in its entirety and for all purposes.

What is claimed is:

1. A method of treating a patient having a nasal polyp, allergic rhinitis, asthma, and/or aspirin-exacerbated respiratory disease (AERD), the method comprising administering an Arachidonate 15-Lipoxygenase (ALOX15) inhibitor to the patient,
wherein the ALOX15 inhibitor comprises an ALOX15 antisense molecule;
wherein the patient is heterozygous or reference for ALOX15 Thr560Met; and
wherein the patient is reference for ALOX15, Leu651fs, Asn658Lys, Val474Ala, and/or Leu106fs.

2. The method according to claim 1, wherein the ALOX15 antisense molecule comprises an antisense nucleic acid molecule or a small interfering RNA (siRNA) that hybridizes to an ALOX15 mRNA.

3. The method according to claim 1, wherein the patient is also administered a therapeutic agent that treats or inhibits a respiratory disorder.

4. The method according to claim 1, wherein the patient is reference for ALOX15 Leu651fs.

5. The method according to claim 1, wherein the patient is reference for ALOX15 Asn658Lys.

6. The method according to claim 1, wherein the patient is reference for ALOX15 Val474Ala.

7. The method according to claim 1, wherein the patient is reference for ALOX15 Leu106fs.

* * * * *